US012799034B2

(12) United States Patent
Sabatini et al.

(10) Patent No.: US 12,799,034 B2
(45) Date of Patent: Nov. 17, 2026

(54) BUILDING MATERIALS

(71) Applicant: DMAT S.R.L., Udine (IT)

(72) Inventors: Paolo Sabatini, Milan (IT); Michel Di Tommaso, Grancia (CH)

(73) Assignee: DMAT S.R.L., Udine (IT)

(*) Notice: Subject to any disclaimer, the term of this patent is extended or adjusted under 35 U.S.C. 154(b) by 267 days.

(21) Appl. No.: 18/553,954

(22) PCT Filed: Apr. 7, 2022

(86) PCT No.: PCT/IB2022/000353
§ 371 (c)(1),
(2) Date: Oct. 4, 2023

(87) PCT Pub. No.: WO2022/229709
PCT Pub. Date: Nov. 3, 2022

(65) Prior Publication Data

US 2024/0190769 A1 Jun. 13, 2024

Related U.S. Application Data

(60) Provisional application No. 63/171,770, filed on Apr. 7, 2021.

(51) Int. Cl.
*C04B 28/04* (2006.01)
*C04B 28/10* (2006.01)

(52) U.S. Cl.
CPC .............. *C04B 28/04* (2013.01); *C04B 28/10* (2013.01)

(58) Field of Classification Search
CPC ......... C04B 28/04; C04B 28/10; C04B 30/91; C04B 7/02; C04B 22/062; C04B 22/064; C04B 22/066; C04B 2103/0088
See application file for complete search history.

(56) References Cited

U.S. PATENT DOCUMENTS

| | | | | |
|---|---|---|---|---|
| 2,224,780 | A | 12/1940 | Chesny | |
| 3,623,898 | A * | 11/1971 | Limberis | C04B 28/18 106/737 |
| 4,840,672 | A * | 6/1989 | Baes | C04B 28/10 524/436 |
| 5,624,491 | A | 4/1997 | Liskowitz et al. | |
| 5,681,384 | A | 10/1997 | Liskowitz et al. | |
| 5,772,752 | A | 6/1998 | Liskowitz et al. | |
| 5,853,475 | A | 12/1998 | Liskowitz et al. | |
| 6,802,898 | B1 | 10/2004 | Liskowitz et al. | |
| 7,799,128 | B2 | 9/2010 | Guynn et al. | |
| 7,972,432 | B2 | 7/2011 | Guynn et al. | |
| 8,323,399 | B2 | 12/2012 | Guynn et al. | |
| 8,377,201 | B2 | 2/2013 | Guynn et al. | |
| 8,414,700 | B2 | 4/2013 | Guynn et al. | |
| 8,551,245 | B2 | 10/2013 | Guynn et al. | |
| 8,974,593 | B2 | 3/2015 | Guynn et al. | |
| 9,067,824 | B1 | 6/2015 | Hansen et al. | |
| 9,102,567 | B1 | 8/2015 | Hansen et al. | |
| 9,156,736 | B2 * | 10/2015 | Laudet | C04B 26/02 |
| 9,238,591 | B2 | 1/2016 | Guynn et al. | |
| 9,272,953 | B2 | 3/2016 | Guynn et al. | |
| 9,957,196 | B1 | 5/2018 | Guynn | |
| 10,131,575 | B2 | 11/2018 | Guynn | |
| 10,233,116 | B1 | 3/2019 | Guynn | |
| 10,494,298 | B1 | 12/2019 | Guynn | |
| 10,526,248 | B2 | 1/2020 | Guynn | |
| 10,730,805 | B2 | 8/2020 | Guynn | |
| 10,737,980 | B2 | 8/2020 | Guynn | |
| 10,968,137 | B1 | 4/2021 | Guynn | |
| 11,168,029 | B2 | 11/2021 | Guynn | |
| 11,174,648 | B2 | 11/2021 | Huss | |
| 11,472,737 | B1 | 10/2022 | Guynn | |
| RE49,415 | E | 2/2023 | Guynn et al. | |
| 11,655,186 | B2 | 5/2023 | Guynn | |
| 2013/0078159 | A1 | 3/2013 | Fan et al. | |
| 2017/0204010 | A1 * | 7/2017 | Atakan | C04B 7/243 |
| 2018/0194679 | A1 | 7/2018 | Guynn | |
| 2019/0071354 | A1 | 3/2019 | Guynn | |
| 2021/0094879 | A1 | 4/2021 | Masic et al. | |

FOREIGN PATENT DOCUMENTS

| | | | | | |
|---|---|---|---|---|---|
| CN | 103626443 | A | * | 3/2014 | C04B 28/04 |
| CN | 108751873 | A | * | 11/2018 | C04B 28/04 |
| CN | 110304859 | A | * | 10/2019 | C04B 40/0039 |
| CN | 111960755 | A | * | 11/2020 | C04B 28/04 |
| CN | 112456907 | A | * | 3/2021 | C04B 28/04 |
| DE | 3928020 | A1 | | 2/1991 | |
| EP | 2337769 | B1 | * | 12/2019 | C04B 18/08 |
| ID | 202001753 | U1 | * | 10/2020 | C04B 18/06 |
| IN | 201921014198 | A | * | 12/2020 | C04B 14/06 |
| JP | 2001181013 | A | * | 7/2001 | C04B 28/04 |
| JP | 2001-261390 | A | | 9/2001 | |
| JP | 2002-308661 | A | | 10/2002 | |
| JP | 2007-269562 | A | | 10/2007 | |

(Continued)

OTHER PUBLICATIONS

The National Lime Association—Frequently Asked Questions—Teminology and Specifications—Lime (Year: 2024).*
International Search Report & Written Opinion PCT Application No. PCT/IB2022/000353, dated Sep. 16, 2022, 11 pages.
Antiohos, et al., "Activation of fly ash cementitious systems in the presence of quicklime Part I. Compressive strength and pozzolanic reaction rate", Cement and Concrete Research 34 (2004) 769-779.
Antiohos, et al., "Influence of quicklime addition on the mechanical properties and hydration degree of blended cements containing different fly ashes", Construction and Building Materials 22 (2008) 1191-1200.

(Continued)

*Primary Examiner* — Anthony J Green
(74) *Attorney, Agent, or Firm* — Morgan, Lewis & Bockius LLP

(57) ABSTRACT

Disclosed herein are mixtures for cementitious building materials, methods of preparing same, and methods of cementing using same.

22 Claims, 33 Drawing Sheets

(56) References Cited

FOREIGN PATENT DOCUMENTS

| | | | | | |
|---|---|---|---|---|---|
| JP | 2011-236073 | A | | 11/2011 | |
| JP | 2020093951 | A | * | 6/2020 | ............. C04B 28/04 |
| KR | 101613900 | B1 | * | 4/2016 | ........... C04B 28/146 |
| KR | 1020200058640 | A | * | 5/2020 | ........... C04B 18/141 |
| KR | 102229203 | B1 | * | 3/2021 | ......... C04B 41/4922 |
| RU | 2304127 | C1 | * | 8/2007 | ............. C04B 28/04 |
| RU | 2687816 | C1 | * | 5/2019 | ............. C04B 38/08 |
| RU | 2707837 | C1 | * | 11/2019 | ............. C04B 18/14 |
| TR | 202016580 | A2 | * | 11/2020 | ............. C04B 28/06 |
| WO | WO 2019/204776 | A1 | | 10/2019 | |

OTHER PUBLICATIONS

Bertrand, et al.,"Paleo-inspired systems: Durability, Sustainability, and Remarkable Properties", Angew. Chem. Int. Ed. Engl. 57, 7288-7295 (2018).

Faber, et al., "Looking back, looking forward: Materials science in art, archaeology, and art conservation", Annu. Rev. Mat. Res. 51, 435-460 (2021).

Manikanta, D., et al., "Effect of Limestone Aggregate on High Strength Concrete in Both Fresh and Hardened States", Global Research and Development Journal for Engineering; vol. 1; Issue 12; Nov. 2016; pp. 97-102.

Mira, et al., "Effect of lime putty addition on structural and durability properties of concrete". Cement and Concrete Research 32 (2002) 683-689.

Oswaldo Burciaga-Diaz, "Parameters affecting the properties and microstructure of quiclime (CaO)—Activated slag cement pastes", Cement and Concrete Composites 103 (2019) 104-111.

Palkovic, et al., "Roadmap across the mesoscale for durable and sustainable cement paste-A bioinspired approach", Construction and Building Materials 115 (2016): 13-31.

Palomo, et al., "Hybrid binders: A journey from the past to a sustainable future (opus caementicium futurum)", Cem. Concr. Res. 124, 105829 (2019).

Seymour, et al., "Reactive ceramic aggregates in mortars from ancient water infrastructure serving Rome and Pompeii", Cell Reports Physical Science 3 (2022) (9).

Shi, "Studies on several factors affecting hydration and properties of lime-pozzolan cements", J. Mater. Civ. Eng., 2001, 13(6): 441-445.

* cited by examiner

FIGURE 16A

SUMMARY OF TEST RESULTS - NEW MIXES FOR HEAT OF HYDRATION TEST (kg/m$^3$)

| ID | MIX | CEM | FLY ASH | CaO (mm) (0.5-1.5) | CaO (mm) (1.5-2.5) | CaO (mm) (2.5-3.5) | WATER | SUPER-PLASTICIZER | SAND | VISUAL INSPECTION | Flow (mm) | Initial temperature after mixing | Measured peak temperature | Remarks |
|---|---|---|---|---|---|---|---|---|---|---|---|---|---|---|
| 13 | L | 280 | 120 | 0 | 0 | 90 | 180 | 20 | 1683 | 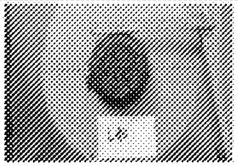 | 110 | | 49.4 | Fairly workable mix. Good surface hardness after hardening. |
| 14 | M | 280 | 120 | 0 | 0 | 120 | 180 | 20 | 1663 | 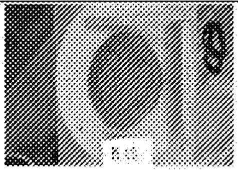 | 160 | 43 | 62.0 | Workable mix. Good surface hardness after hardening. |
| 15 | N | 280 | 120 | 0 | 0 | 150 | 180 | 20 | 1623 | 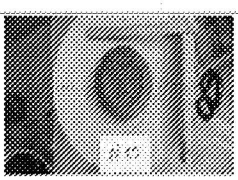 | 125 | 50 | 71.0 | Workable mix. Good surface hardness after hardening. |
| 16 | O | 280 | 120 | 0 | 0 | 340 | 180 | 20 | 1433 | 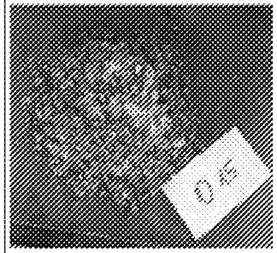 | 110 | 61 | -- | Fairly workable mix. Poor cohesion after hardening. |

FIGURE 16B

SUMMARY OF TEST RESULTS - NEW MIXES FOR HEAT OF HYDRATION TEST (kg/m$^3$)

| ID | MIX | CEM | FLY ASH | CaO (mm) (0.5-1.5) | CaO (mm) (1.5-2.5) | CaO (mm) (2.5-3.5) | WATER | SUPER-PLASTICIZER | SAND | VISUAL INSPECTION | Flow (mm) | Initial temperature after mixing (C) | Measured peak temperature (C) | Remarks |
|---|---|---|---|---|---|---|---|---|---|---|---|---|---|---|
| 17 | P | 280 | 120 | 0 | 0 | 540 | 180 | 20 | 1233 | 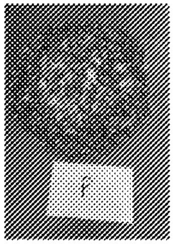 | NO FLOW | 99.3 | -- | Not workable mix. Low surface hardness after hardening |
| 18 | Q | 460 | 80 | 0 | 0 | 340 | 269 | 0 | 1000 | -- | NO FLOW | 63 | -- | Not workable mix. Low surface hardness after hardening. |
| 19 | R | 460 | 80 | 0 | 0 | 340 | 269 | 20 | 1000 |  | NO FLOW | 63 | -- | Not workable mix. Low surface hardness after hardening. |
| 20 | S | 280 | 120 | 0 | 0 | 200 | 180 | 20 | 1600 | 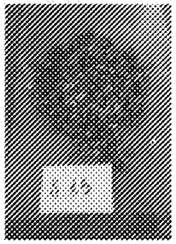 | 130 | 57.5 | 85.0 | Fairly workable mix. Low surface hardness after hardening |

FIGURE 29

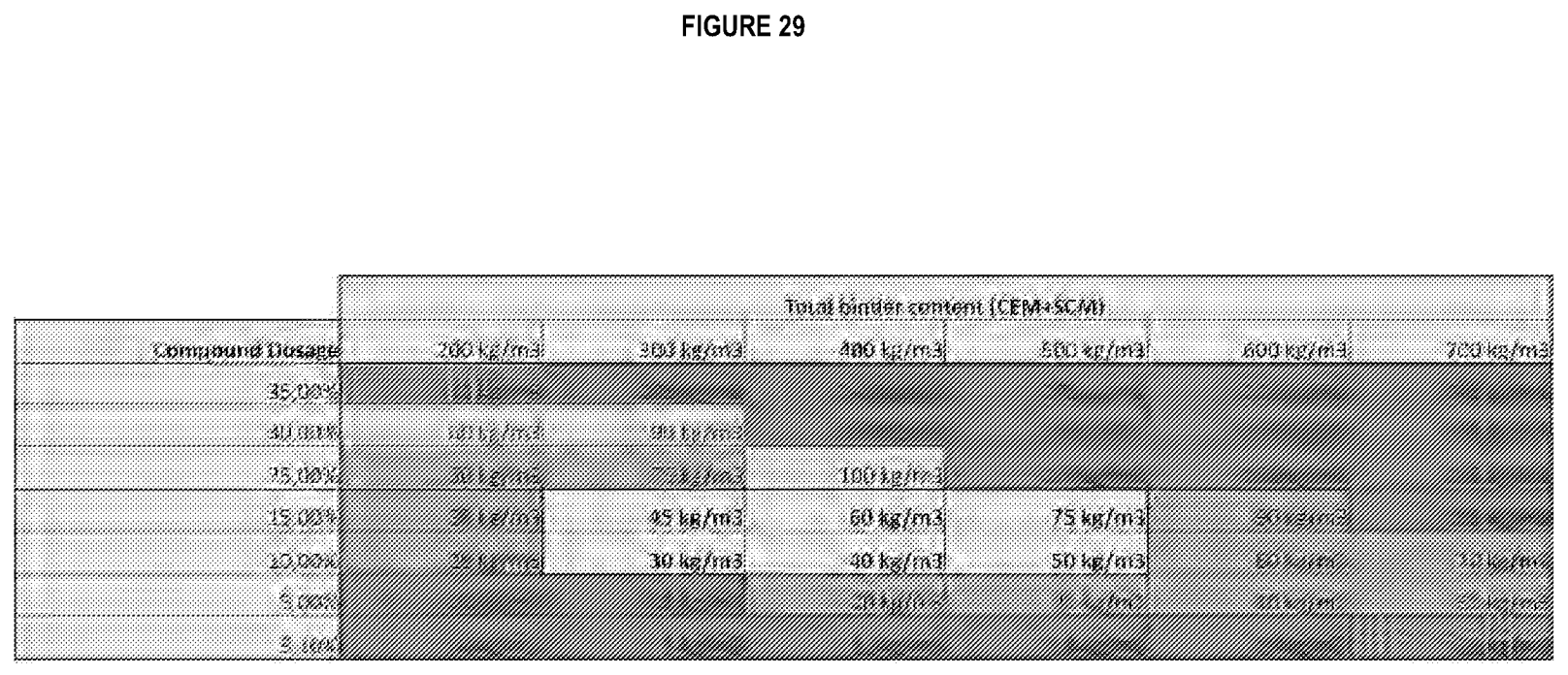

| | Total binder content (CEM+SCM) | | | | | |
|---|---|---|---|---|---|---|
| Compound Dosage | 200 kg/m3 | 300 kg/m3 | 400 kg/m3 | 500 kg/m3 | 600 kg/m3 | 700 kg/m3 |
| 35.00% | [illegible] | | | | | |
| 30.00% | [illegible] | 90 kg/m3 | | | | |
| 25.00% | [illegible] | 75 kg/m3 | 100 kg/m3 | | | |
| 15.00% | 30 kg/m3 | 45 kg/m3 | 60 kg/m3 | 75 kg/m3 | 90 kg/m3 | [illegible] |
| 10.00% | 20 kg/m3 | 30 kg/m3 | 40 kg/m3 | 50 kg/m3 | 60 kg/m3 | 70 kg/m3 |
| 5.00% | | [illegible] | 20 kg/m3 | [illegible] | 30 kg/m3 | [illegible] |
| 3.00% | | [illegible] | | | | [illegible] |

cap abs = capillary water absorption, SIA 262-1/A, average of 5 samples
rck= compressive strength at 28 days, SN EN 12390-3, average of 3 samples
grain size = average of size limits of compound grain size, in mm
Kg/m3 = dosage of compound in kg per m3 of concrete cap abs = capillary water absorption, SIA 262-1/A, average of 5 samples
rck= compressive strength at 28 days, SN EN 12390-3, average of 3 samples
type of compound = as described in the Example
Kg/m3 = dosage of compound in kg per m3 of concrete rck= compressive strength at 28 days, SN EN 12390-3, average of 3 samples
grain size = average of size limits of compound grain size, in mm
Kg/m3 = dosage of compound in kg per m3 of concrete shrinkage = drying shrinkage at 91 days, SIA 262-1/F, average of 2 samples
grain size = average of size limits of compound grain size, in mm
Kg/m3 = dosage of compound in kg per m3 of concrete shrinkage = drying shrinkage, SIA 262-1/F, average of 2 samples
day= days of test observation calculated from test start (day 0= 23 hours from specimen preparation)

BUILDING MATERIALS

CROSS-REFERENCE TO RELATED APPLICATIONS

The present application is a 371 National Phase application of PCT/IB2022/000353, filed Apr. 7, 2022, which claims priority to U.S. Provisional Patent Application No. 63/171,770, filed Apr. 7, 2021, each of which is incorporated by reference herein in its entirety.

FIELD

This disclosure relates, in part, to methods of making mixtures for cementitious building materials and compositions prepared using same.

BACKGROUND

Concrete is one of the most widely used materials in the world for construction. Since concrete deteriorates and ages after a certain period of time after casting or molding, concrete structures need to be regularly maintained through repair or reinforcement to avoid deterioration, such as cracking. If cracks occur in concrete, harmful air, moisture, and chemicals penetrate the concrete, thereby further degrading concrete performance. This can lead to the collapse of the structure.

There is a need for new and improved building materials which provide concrete that is self-healing and exhibits shrinkage compensation and anti-corrosive properties.

SUMMARY

The present disclosure provides a method of making a cementitious mixture for building materials. The method includes (a) obtaining a cementitious mixture comprising a calcium compound and ordinary Portland cement (OPC) and optionally supplementary cementitious material (SCM), wherein the dosage of the calcium compound is about 3.1% to about 35% of the total binder content of the cementitious mixture; and (b) adding water to the cementitious mixture. In some embodiments, the dosage of the calcium compound is about 6.5% to about 15% of the total binder content of the cementitious mixture.

The present disclosure also provides a method of making a dry cementitious mixture for building materials. The method includes obtaining a cementitious mixture comprising a calcium compound and ordinary Portland cement (OPC) and optionally supplementary cementitious material (SCM), wherein the dosage of the calcium compound is about 3.1% to about 35% of the total binder content of the cementitious mixture. In some embodiments, the method includes mixing the cementitious mixture. In some embodiments, the dosage of the calcium compound is about 6.5% to about 15% of the total binder content of the cementitious mixture.

The present disclosure also provides a method of making a concrete mixture for building materials. The method includes (a) obtaining a cementitious mixture comprising a calcium compound, ordinary Portland cement (OPC), fine aggregates, and coarse aggregates, and optionally supplementary cementitious material (SCM), wherein the dosage of the calcium compound is about 6.5% to about 15% of the total binder content of the cementitious mixture, and (b) adding water to the cementitious mixture. In some embodiments, the dosage of the calcium compound is about 6.5% to about 15% of the total binder content of the cementitious mixture.

The present disclosure also provides a method of making a concrete mixture for building materials. The method includes obtaining a cementitious mixture comprising a calcium compound, ordinary Portland cement (OPC), fine aggregates, and coarse aggregates, and optionally supplementary cementitious material (SCM), wherein the dosage of the calcium compound is about 6.5% to about 15% of the total binder content of the cementitious mixture. In some embodiments, the method includes mixing the cementitious mixture.

In some embodiments, the total binder content of the cementitious mixture comprises about 20% to about 100% OPC and about 0% to about 80% SCM; about 80% to about 99% OPC and about 1% to about 20% SCM; about 60% to about 79% OPC and about 21% to about 40% SCM; or about 20% to about 59% OPC and about 41% to about 80% SCM.

In some embodiments, the dosage of the calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, about 8% to about 10%, about 3.1% to about 35%, about 25% to about 35%, about 25% to about 30%, about 15% to about 25%, about 10% to about 35%, about 10% to about 30%, about 10% to about 15%, about 3.1% to about 25%, about 3.1% to about 20%, about 3.1% to about 15%, or about 3.1% to about 10%, 3.1% to about 8%, about 3.1% to about 6.5%, about 5% to about 25%, about 5% to about 20%, about 5% to about 15%, about 5% to about 10%, about 10% to about 20%, about 20% to about 30%, or about 20% to about 25% of the total binder content of the cementitious mixture.

In some embodiments, the dosage of the calcium compound is about 8%, about 9%, about 10%, about 11%, about 12%, about 35%, about 30%, about 25%, about 20%, about 15%, about 10%, about 5%, or about 3.1% of the total binder content of the cementitious mixture.

In some embodiments, the cementitious mixture has a total binder content of about 100 $kg/m^3$ to about 200 $kg/m^3$.

In some embodiments, the cementitious mixture has a total binder content of about 100 $kg/m^3$ to about 700 $kg/m^3$, about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$. In some embodiments, the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$.

In some embodiments, the cementitious mixture has a total binder content of about 700 $kg/m^3$ to about 1300 $kg/m^3$, about 800 $kg/m^3$ to about 1300 $kg/m^3$, about 900 $kg/m^3$ to about 1300 $kg/m^3$, about 800 $kg/m^3$ to about 1200 $kg/m^3$, about 900 $kg/m^3$ to about 1200 $kg/m^3$, about 900 $kg/m^3$ to about 1200 $kg/m^3$, about 1000 $kg/m^3$ to about 1100 $kg/m^3$, or about 1100 $kg/m^3$ to about 1300 $kg/m^3$.

In some embodiments, the cementitious mixture has a total binder content of about 100 $kg/m^3$, about 200 $kg/m^3$, about 300 kg/m$^3$, about 400 kg/m$^3$, about 500 kg/m$^3$, about 600 kg/m$^3$, or about 700 kg/m$^3$.

In some embodiments, the cementitious mixture has a total binder content of about 800 kg/m$^3$, about 900 kg/m$^3$, about 1000 kg/m$^3$, about 1100 kg/m$^3$, about 1200 kg/m$^3$, or about 1300 kg/m$^3$.

In some embodiments, the calcium compound has a particle size greater than about 0 mm to about 0.2 mm, greater than about 0 mm to about 0.75 mm, about 0.002 mm to about 0.75 mm, from about 0.075 mm to about 1 mm, 0.075 mm to about 1.5 mm, 0.075 mm to about 5 mm, about 0.075 mm to about 0.5 mm, about 0.5 mm to about 5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

In some embodiments, the calcium compound has a particle size from about 0.075 mm to about 1.5 mm. In some embodiments, the calcium compound has a particle size from about 1 mm to about 2.5 mm. In some embodiments, the calcium compound has a particle size from about 1.5 mm to about 2.5 mm. In some embodiments, the calcium compound has a particle size from about 2.5 mm to about 10 mm.

In some embodiments, the calcium compound has a particle size from about 6.35 mm to about 63 mm. In some embodiments, the calcium compound has a particle size from about 63 mm to about 204 mm.

In some embodiments, the calcium compound comprises one or more of calcium oxide (CaO) and calcium hydroxide ($Ca(OH)_2$). In some embodiments, the calcium compound comprises, consists of, or consists essentially of calcium oxide. In some embodiments, the calcium oxide is not slaked prior to step (a). In some embodiments, the calcium oxide is slaked prior to step (a). In some embodiments, the calcium comprises, consists of, or consists essentially of calcium hydroxide. In some embodiments, the calcium compound comprises calcium oxide and calcium hydroxide.

In some embodiments, the calcium compound comprises about 67 wt % to about 100 wt % calcium oxide and about 0 wt % to about 33 wt % calcium hydroxide. In some embodiments, the calcium compound comprises about 33 wt % to about 66 wt % calcium oxide and about 34 wt % to about 67 wt % calcium hydroxide. In some embodiments, the calcium compound comprises about 0 wt % to about 32 wt % calcium oxide and about 68 wt % to about 100 wt % calcium hydroxide. In some embodiments, the calcium compound is dry. In some embodiments, the calcium compound is not slaked. In some embodiments, the calcium compound is slaked.

In some embodiments, the calcium compound comprises one or more of high calcium quicklime, dolomitic quicklime, calcium hydrated lime, or dolomitic hydrated lime.

In some embodiments, the SCM comprises one or more materials selected from fly ash, ground granulated blast-furnace slag, metakaolin, microsilica, natural pozzolana, rice husks, palm oil ash (POA), and glass powder (GP).

In some embodiments, step b) occurs after step a). In some embodiments, step a) and step b) occur simultaneously.

In some embodiments, the cementitious mixture further comprises fine aggregates. In some embodiments, the fine aggregates comprise one or more of sand, crushed stone, silt, stone dust, and clay.

In some embodiments, the cementitious mixture further comprises coarse aggregates.

In some embodiments, the method further comprises adding one or more plasticizers to the cementitious mixture. In some embodiments, the method further comprises adding one or more retarders to the cementitious mixture.

The present disclosure also provides a ceramic material prepared by any one of the methods of the present disclosure. In some embodiments, the ceramic material is selected from cement paste, grout, mortar, and concrete. In some embodiments, the ceramic material is grout. In some embodiments, the ceramic material is a mortar. In some embodiments, the ceramic material is concrete. In some embodiments, the ceramic material comprises sand. In some embodiments, the ceramic material comprises gravel. In some embodiments, the ceramic material further comprises one or more plasticizers. In some embodiments, the ceramic material further comprises one or more retarders. In some embodiments, the ceramic material has one or more of the following properties: self-healing; waterproof, shrinkage compensation; volumetric expansion; anti-corrosion, and enhanced compressive strength. In some embodiments, the ceramic material is for underwater use.

The present disclosure also provides a composition prepared by any one of the methods of the present disclosure. In some embodiments, the composition has one or more of the following properties: self-healing; waterproof, shrinkage compensation; volumetric expansion; anti-corrosion, and enhanced compressive strength. In some embodiments, the composition is for underwater use.

The present disclosure also provides a building material comprising a ceramic material or a composition of the present disclosure.

In some embodiments, the building material comprises reinforced concrete.

In some embodiments, the building material comprises Opus signinum (Cocciopesto).

The present disclosure also provides a concrete admixture prepared by any one of the methods of the present disclosure.

The present disclosure also provides a blended cement prepared by any one of the methods of the present disclosure.

The present disclosure also provides a cementitious mixture prepared by any one of the methods of the present disclosure.

The present disclosure also provides a concrete prepared by any one of the methods of the present disclosure.

In one aspect, the present disclosure provides a concrete for building materials comprising a cementitious mixture comprising a calcium compound, ordinary Portland cement (OPC), optionally supplementary cementitious material (SCM), fine aggregates, coarse aggregates, and water, optionally wherein the fine aggregates comprises one or more of one or more of sand, crushed stone, silt, stone dust, and clay, wherein the dosage of the calcium compound is about 3.1% to about 35% of the total binder content of the cementitious mixture. In some embodiments, the concrete comprises a reinforcement. In some embodiments, the dosage of the calcium compound is about 6.5% to about 15% of the total binder content of the cementitious mixture. In some embodiments, the concrete further comprises supplementary cementitious material (SCM), optionally wherein the SCM comprises one or more materials selected from fly ash, ground granulated blast-furnace slag, metakaolin, microsilica, natural pozzolana, rice husks, palm oil ash (POA), and glass powder (GP). In some embodiments, the SCM comprises fly ash.

The present disclosure also provides a concrete for building materials comprising obtaining a cementitious mixture comprising a calcium compound and ordinary Portland cement (OPC) and optionally supplementary cementitious material (SCM), and one or more of fine aggregates and coarse aggregates, optionally wherein the fine aggregates comprises one or more of one or more of sand, crushed stone, silt, stone dust, and clay, wherein the dosage of the calcium compound is about 3.1% to about 35% of the total binder content of the cementitious mixture. In some embodiments, the method includes mixing the cementitious mixture. In some embodiments, the dosage of the calcium compound is about 6.5% to about 15% of the total binder content of the cementitious mixture.

The present disclosure also provides a method of preparing a hardened cementicious material. The method includes (a) pouring a cementitious mixture comprising a calcium compound, water, ordinary Portland cement (OPC), and optionally further comprising fine aggregate, coarse aggregates and supplementary cementitious material (SCM) onto a surface or into a concrete form, wherein the dosage of the calcium compound is about 3.1% to about 35% of the total binder content of the cementitious materials; and (b) allowing the cementitious mixture to set by reaction of the cementitious mixture with the water to form a hardened mass.

In some embodiments, the total binder content of the cementitious mixture comprises about 20% to about 100% OPC and about 0% to about 80% SCM; about 80% to about 99% OPC and about 1% to about 20% SCM; about 60% to about 79% OPC and about 21% to about 40% SCM; or about 20% to about 59% OPC and about 41% to about 80% SCM.

In some embodiments, the dosage of the calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, about 8% to about 10%, about 3.1% to about 35%, about 25% to about 35%, about 25% to about 30%, about 15% to about 25%, about 10% to about 35%, about 10% to about 30%, about 10% to about 15%, about 3.1% to about 25%, about 3.1% to about 20%, about 3.1% to about 15%, or about 3.1% to about 10%, 3.1% to about 8%, about 3.1% to about 6.5%, about 5% to about 25%, about 5% to about 20%, about 5% to about 15%, about 5% to about 10%, about 10% to about 20%, about 20% to about 30%, or about 20% to about 25% of the total binder content of the cementitious mixture.

In some embodiments, the dosage of the calcium compound is about 8%, about 9%, about 10%, about 11%, about 12%, about 35%, about 30%, about 25%, about 20%, about 15%, about 10%, about 5%, or about 3.1% of the total binder content of the cementitious mixture.

In some embodiments, the cementitious mixture has a total binder content of about 100 $kg/m^3$ to about 700 $kg/m^3$, about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$.

In some embodiments, the cementitious mixture has a total binder content of about 700 $kg/m^3$ to about 1300 $kg/m^3$, about 800 $kg/m^3$ to about 1300 $kg/m^3$, about 900 $kg/m^3$ to about 1300 $kg/m^3$, about 800 $kg/m^3$ to about 1200 $kg/m^3$, about 900 $kg/m^3$ to about 1200 $kg/m^3$, about 900 $kg/m^3$ to about 1200 $kg/m^3$, about 1000 $kg/m^3$ to about 1100 $kg/m^3$, or about 1100 $kg/m^3$ to about 1300 $kg/m^3$.

In some embodiments, the cementitious mixture has a total binder content of about 100 $kg/m^3$, about 200 $kg/m^3$, about 300 $kg/m^3$, about 400 $kg/m^3$, about 500 $kg/m^3$, about 600 $kg/m^3$, or about 700 $kg/m^3$.

In some embodiments, the cementitious mixture has a total binder content of about 800 $kg/m^3$, about 900 $kg/m^3$, about 1000 $kg/m^3$, about 1100 $kg/m^3$, about 1200 $kg/m^3$, or about 1300 $kg/m^3$.

In some embodiments, the calcium compound has a particle size from greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

In some embodiments, the calcium compound has a particle size from about 0.075 mm to about 1.5 mm. In some embodiments, the calcium compound has a particle size from about 1 mm to about 2.5 mm. In some embodiments, the calcium compound has a particle size from about 1.5 mm to about 2.5 mm. In some embodiments, the calcium compound has a particle size from about 2.5 mm to about 10 mm.

In some embodiments, the calcium compound has a particle size from about 6.35 mm to about 63 mm. In some embodiments, the calcium compound has a particle size from about 63 mm to about 204 mm.

In some embodiments, the calcium compound comprises one or more of calcium oxide (CaO) and calcium hydroxide ($Ca(OH)_2$). In some embodiments, the calcium compound comprises, consists of, or consists essentially of calcium oxide. In some embodiments, the calcium oxide is not slaked prior to step (a). In some embodiments, the calcium oxide is slaked prior to step (a). In some embodiments, the calcium compound comprises, consists of, or consists essentially of calcium hydroxide. In some embodiments, the calcium compound comprises calcium oxide and calcium hydroxide.

In some embodiments, the calcium compound comprises about 67 wt % to about 100 wt % calcium oxide and about 0 wt % to about 33 wt % calcium hydroxide. In some embodiments, the calcium compound comprises about 33 wt % to about 66 wt % calcium oxide and about 34 wt % to about 67 wt % calcium hydroxide. In some embodiments, the calcium compound comprises about 0 wt % to about 32 wt % calcium oxide and about 68 wt % to about 100 wt % calcium hydroxide.

In some embodiments, the calcium compound comprises about 0 wt % to about 5 wt % magnesium oxide and about 95 wt % to about 100 wt % calcium oxide, about 6 wt % to about 35 wt % magnesium oxide and about 65 wt % to about 94 wt % calcium oxide, about 36 wt % to about 46 wt % magnesium oxide and about 64 wt % to about 54 wt % calcium oxide, about 47 wt % to about 50 wt % magnesium oxide and about 53 wt % to about 50 wt % calcium oxide, about 51 wt % to about 75 wt % magnesium oxide and about 50 wt % to about 25 wt % calcium oxide, or about 76 wt % to about 100 wt % magnesium oxide and about 24 wt % to about 0 wt % calcium oxide.

In some embodiments, the calcium compound comprises about 0 wt % to about 5 wt % magnesium oxide and about 95 wt % to about 100 wt % calcium hydroxide, about 6 wt % to about 35 wt % magnesium oxide and about 65 wt % to about 94 wt % calcium hydroxide, about 36 wt % to about 46 wt % magnesium oxide and about 64 wt % to about 54 wt % calcium hydroxide, about 47 wt % to about 50 wt % magnesium oxide and about 53 wt % to about 50 wt % calcium hydroxide, about 51 wt % to about 75 wt % magnesium oxide and about 50 wt % to about 25 wt % calcium hydroxide, or about 76 wt % to about 100 wt % magnesium oxide and about 24 wt % to about 0 wt % calcium hydroxide.

In some embodiments, the calcium compound is dry. In some embodiments, the calcium compound is not slaked. In some embodiments, the calcium compound is slaked.

In some embodiments, the water is present in an amount between about 20% and about 40% of the cement composition.

In some embodiments, the SCM comprises one or more materials selected from fly ash, ground granulated blast-furnace slag, metakaolin, microsilica, natural pozzolana, rice husks, palm oil ash (POA), and glass powder (GP).

In some embodiments, the cementitious mixture further comprises fine aggregate. In some embodiments, the fine aggregate comprises one or more of one or more of sand, crushed stone, silt, stone dust, and clay.

In some embodiments, the cementitious mixture further comprises coarse aggregates.

In some embodiments, the method further comprises adding one or more plasticizers to the cementitious mixture. In some embodiments, the method further comprises adding one or more retarders to the cementitious mixture. In some embodiments, the method further comprises adding one or more reinforcements to form a reinforced concrete. In some embodiments, the reinforcement comprises one or more materials selected from steel, polymers, fibers, and/or alternate composite material. In some embodiments, the method comprises pouring the cementitious mixture onto a surface. In some embodiments, the method comprises preparing a cement-based surface. In some embodiments, the method comprises pouring the cementitious mixture into a concrete form.

The present disclosure also provides a method of preparing an admixture comprising calcium oxide for a cementitious mixture, the method comprising reducing the calcium oxide to a desired particle size and/or a range of particle sizes.

The present disclosure also provides a method of preparing an admixture for a cementitious mixture comprising calcium oxide, wherein the admixture conforms to ASTM C494 and/or EN 934, the method comprising reducing the calcium oxide to a desired particle size and/or a range of particle sizes.

The present disclosure also provides a method of preparing an admixture for a cementitious mixture comprising calcium oxide, the method comprising reducing the calcium oxide to a desired particle size and/or a range of particle sizes and mixing the calcium oxide with calcium hydroxide.

The present disclosure also provides a method of preparing a admixture for a cementitious mixture comprising calcium oxide, the method comprising reducing the calcium oxide to a desired particle size and/or a range of particle sizes and mixing the calcium oxide with any admixture listed by ASTM C494 and/or EN 934.

The present disclosure also provides a method of preparing an admixture for a cementitious mixture comprising calcium oxide, the method comprising reducing the calcium oxide to a desired particle size and/or a range of particle sizes and mixing the calcium oxide with SCM.

The present disclosure also provides a method of preparing an admixture for a cementitious mixture comprising calcium oxide, the method comprising reducing the calcium oxide to a desired particle size and/or a range of particle sizes and adding water to the calcium oxide to form a slurry.

The present disclosure also provides a method of preparing an admixture for a cementitious mixture comprising calcium oxide, the method comprising reducing the calcium oxide to a desired particle size and/or a range of particle sizes and mixing the calcium oxide with sand.

The present disclosure also provides a method of preparing a cement addition comprising calcium oxide, the method comprising reducing the calcium oxide to a desired particle size and/or a range of particle sizes.

The present disclosure also provides a method of preparing a cement addition, the method comprising mixing calcium oxide with SCM.

The present disclosure also provides a method of preparing a cement addition, the method comprising mixing calcium oxide with calcium hydroxide.

In some embodiments, the calcium oxide is reduced to a desired particle size and/or a range of particle sizes. In some embodiments, the particle size is about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In some embodiments, the calcium hydroxide is reduced to a desired particle size and/or a range of particle sizes. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, about 4 to about 10 mm, about 10 mm to about 30 mm, or greater than about 30 mm to about 75 mm.

In some embodiments, the calcium oxide has a particle size from about 6.35 mm to about 63 mm and is slaked prior to step (a). In some embodiments, the calcium oxide has a particle size from about 63 mm to about 204 mm and is slaked prior to step (a).

In some embodiments, the SCM comprises fly ash.

The present disclosure also provides an admixture for one or more of concrete, mortar, and grout. In some embodiments, the admixture includes a calcium compound of a desired particle size or range of particle sizes. In some embodiments, the admixture confers one or more of the following properties when used in a cementitious mixture according to the dosage of the calcium compound: self-healing, waterproof, shrinkage compensation: waterproof, anti-corrosion, workability, workability retention, and enhanced compressive strength.

The present disclosure also provides an admixture for one or more of concrete, mortar, and grout. In some embodiments, the admixture includes SCM and a calcium compound of a desired particle size or range of particle sizes. In some embodiments, the admixture confers one or more of the following properties when used in a cementitious mixture according to the dosage of the calcium compound:

self-healing, waterproof, shrinkage compensation: waterproof, anti-corrosion, workability, workability retention, and enhanced compressive strength.

The present disclosure also provides an admixture for concrete. In some embodiments, the admixture comprises a calcium compound of a desired particle size or range of particle sizes and is produced in accordance with ASTM C494 type S. In some embodiments, the admixture confers one or more of the following properties without detrimental effect as described in ASTM C494 when used in a cementitious mixture: self-healing, waterproof, shrinkage compensation; waterproof, anti-corrosion, workability, workability retention, and enhanced compressive strength.

The present disclosure also provides an admixture for one or more of concrete, mortar, and grout. In some embodiments, the admixture includes a calcium compound of a desired particle size or range of particle sizes and is produced in accordance with EN 934. In some embodiments, the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength.

The present disclosure also provides an admixture for one or more of concrete, mortar, and grout. In some embodiments, the admixture includes a calcium compound of a desired particle size or range of particle sizes and is produced in accordance with EN 934 or to a European Technical Assessments under a Regulation (EU) No 305/2011. In some embodiments, the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength.

The present disclosure also provides an addition for concrete. In some embodiments, the addition is defined by EN 206. In some embodiment, the addition includes SCM and a calcium compound of a desired particle size or range of particle sizes and is produced in accordance with EN 450 or to a European Technical Assessments under a Regulation (EU) No 305/2011. In some embodiments, the addition confers one or more of the following properties without detrimental effect as described in EN 450 when used in a cementitious mixture: self-healing, waterproof, shrinkage compensation; waterproof, anti-corrosion, workability, workability retention, and enhanced compressive strength.

The present disclosure also provides an addition for concrete. In some embodiments, the addition includes SCM and a calcium compound of a desired particle size or range of particle sizes. In some embodiments, the addition is produced in accordance with EN 450 or to a European Technical Assessments under a Regulation (EU) No 305/2011. In some embodiments, the addition confers one or more of the following properties without detrimental effect as described in EN 450 when used in a cementitious mixture: self-healing, waterproof, shrinkage compensation; waterproof, anti-corrosion, workability, workability retention, and enhanced compressive strength.

The present disclosure also provides an addition for concrete. In some embodiments, the addition includes SCM and a calcium compound of a desired particle size or range of particle sizes. In some embodiments, the addition is produced in accordance with ASTM C618. In some embodiments, the addition confers one or more of the following properties without detrimental effect as described in ASTM C618 when used in a cementitious mixture: self-healing, waterproof, shrinkage compensation; waterproof, anti-corrosion, workability, workability retention, and enhanced compressive strength.

In some embodiments, the range of particle sizes of the calcium compound is g greater than about 0 to about 0.2 mm, greater than about 0 mm to about 0.75 mm, about 0.002 mm to about 0.75 mm, about 0.075 mm to about 1 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In some embodiments, the calcium compound comprises, consists of, or consists essentially of calcium oxide.

In some embodiments, the calcium compound comprises, consists of, or consists essentially of calcium hydroxide.

In some embodiments, the SCM comprises fly ash.

BRIEF DESCRIPTION OF THE DRAWINGS

FIG. 1D depicts course-sized quicklime.

FIGS. 16A and 16B depict a summary of heat of hydration test results of mortar mixes.

FIG. 29 depicts a chart illustrating examples of calcium compound dosages useful in cement blends for concrete based on total binder content (total content of cement and SCM).

FIG. 35 shows the early-stage dry shrinkage performances of the specimen R and CONTROL (C). The specimen including the calcium compound shows early-stage (at 3, 7, 14 and 28 days) reductions of dry shrinkage (line beginning at 0.009 on day 3), which are desired to reduce crack in early stages, in comparison to CONTROL (C) (line beginning at 0.022 on day 3).

DETAILED DESCRIPTION

Figure 1A:
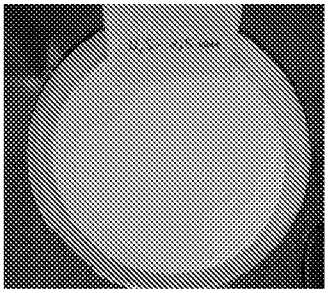
FIGS. 1A-1D depict the grain sizes of quick lime following crushing and sieving. Grain sizes prepared include 0.50-1.50 mm (FIG. 1A), 1.50-2.50 mm (FIG. 1B), and 2.50-3.50 mm (FIG. 1C).
Figure 1B:
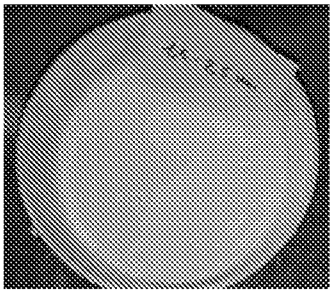
Figure 1C:
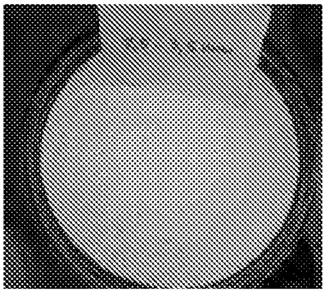
Figure 1D:
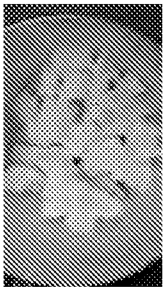

The present disclosure relates to, in part, the surprising finding that concrete mixtures of specific formulations comprising calcium compounds, such as calcium oxide (CaO), exhibit improved self-healing without a detrimental reduction in concrete workability or a reduction in compressive strength. The methods and compositions described herein provide safe and reliable infrastructure, as well as economic and environmental sustainability due to, for example, reduced costs and lower $CO_2$ emissions from less building maintenance and longer building life.

Methods

In one aspect, the present disclosure includes a method of making a cementicious mixture for building materials comprising:

(a) obtaining a cementitious mixture comprising a calcium compound and Ordinary Portland cement (OPC), and (b) adding water to the cementitious mixture. In some embodiments, the cementious mixture optionally comprises supplementary cementitious material (SCM). In some embodiments, the cementous mixture comprises supplementary cementitious material (SCM). In some embodiments, the dosage of the calcium compound is about 3.1% to about 35% of the total binder content of the cementitious mixture. As used herein, the term "cementicious mixture" refers to a mixture (e.g. grout, mortar, concrete) comprising ordinary Portland Cement, and may optionally comprise other materials such as supplementary cementitious material (SCM), fine aggregates, and coarse aggregates. As used herein, the term "total binder content" refers to the total weight of OPC and SCM in a cementitious mixture (e.g., total of kg/m$^3$ of OPC and kg/m$^3$ of SCM).

In some embodiments, step b) occurs after step a). In some embodiments, step a) and step b) occur simultaneously. As would be understood by one of ordinary skill in the art, the addition of water to a calcium compound, such as quicklime, is exothermic, thereby producing heat. In some embodiments, once water is added to the cementitious mixture, the heat produced from the hydration of the calcium compound provides a protective rim around calcined lime clasts. As used herein, the term "quicklime" refers to calcium oxide. As would be understood by one of ordinary skill in the art, the dosage and the presence or the absence of aggregates, and the dosage of water in the cementicious mixture will determine the nature of the building material, such as one of grout, mortart or concrete. In some embodiments, the calcium oxide is not slaked prior to step (a). In some embodiments, the calcium oxide is slaked prior to step (a).

In another aspect, the present disclosure also includes a method of making a cementitious mixture for building materials comprising:

(a) combining a calcium compound with ordinary Portland cement (OPC) to obtain a cementitious mixture;
(b) adding water to the cementitious mixture; and
(c) mixing the water and the cementitious mixture. In some embodiments, the cementitious mixture optionally comprises supplementary cementitious material (SCM). In some embodiments, the cementitious mixture comprises supplementary cementitious material (SCM). In some embodiments, the dosage of the calcium compound is about 3.1% to about 35% of the total binder content of the cementitious mixture. In some embodiments, the dosage of the calcium compound is about 6.5% to about 15% of the total binder content of the cementitious mixture.

In another aspect, the present disclosure also includes a method of making a cementicious mixture for building materials comprising:
(a) obtaining a cementicious mixture comprising a calcium compound, ordinary Portland cement (OPC), supplementary cementitious material (SCM), fine aggregates, and optionally further comprising coarse aggregates, and
(b) adding water to the cementicious mixture. In some embodiments, the dosage of the calcium compound is about 3.1% to about 35% of the total binder content of the cementicious mixture. In some embodiments, the dosage of the calcium compound is about 6.5% to about 15% of the total binder content of the cementitious mixture.

In another aspect, the present disclosure includes a method of making a cementicious mixture for building materials comprising obtaining a cementitious mixture comprising a calcium compound and Ordinary Portland cement (OPC). In some embodiments, the cementous mixture optionally comprises supplementary cementitious material (SCM). In some embodiments, the cementous mixture comprises supplementary cementitious material (SCM). In some embodiments, the cementous mixture optionally comprises fine aggregates. In some embodiments, the cementious mixture optionally comprises coarse aggregates. In some embodiments, the dosage of the calcium compound is about 3.1% to about 35% of the total binder content of the cementitious mixture. In some embodiments, the method includes mixing the cementitious mixture. In some embodiments, the dosage of the calcium compound is about 6.5% to about 15% of the total binder content of the cementitious mixture.

In another aspect, the present disclosure also includes a method of preparing building materials (e.g. grout, mortar, concrete) comprising:
(a) pouring a cementitious mixture comprising a calcium composition, water, ordinary Portland cement (OPC), and optionally further comprising fine aggregate, coarse aggregates and supplementary cementitious material (SCM); and
(b) allowing the cementitious mixture to set by reaction of the cementitious mixture with the water to form a hardened mass. In some embodiments, the dosage of the calcium compound is about 3.1% to about 35% of the total binder content of the cementicious mixture. In some embodiments, the building material is a hardened cementitious material. In some embodiments, the dosage of the calcium compound is about 6.5% to about 15% of the total binder content of the cementitious mixture.

In some embodiments, the building material is concrete. In some embodiments, the method comprises pouring the concrete onto a surface. In some embodiments, the method of preparing concrete comprises preparing a cement-based surface. In some embodiments, the method comprises pouring the cement onto a surface. In some embodiments, the method of preparing cement comprises preparing a cement-based surface. As would be understood by one of ordinary skill in the art, any surface is contemplated by the present disclosure. In some embodiments, the method comprises pouring the cement into a concrete form. As used herein, a "concrete form" is a solid barrier that helps to hold the fluid cementitious mixture in place until it hardens and acquire a particular shape. Non-limiting examples of concrete forms include wooden forms, insulated concrete forms, foam concrete forms, concrete wall forms, and steel forms. In some embodiments, the method further comprises adding one or more reinforcements to form a reinforced concrete. Any reinforcement is contemplated by the present disclosure. In some embodiments, the reinforcement comprises one or more materials selected from steel, polymers, fibers, and/or alternate composite material.

In another aspect, the present disclosure also includes a method of repairing a fracture in a cementitious building material comprising:
(a) pouring a cementitious mixture comprising a calcium composition, water, ordinary Portland cement (OPC), and optionally further comprising fine aggregate, coarse aggregates and supplementary cementitious material (SCM) into the fracture; and
(b) allowing the cementitious mixture to set by reaction of the cementitious mixture with the water to form a hardened mass. In some embodiments, the dosage of the calcium compound is about 3.1% to about 35% of the total binder content of the cementicious mixture.

In another aspect, the present disclosure includes a method of making a blended cement for building materials comprising obtaining a cementitious mixture comprising a calcium compound, ordinary Portland cement (OPC), and supplementary cementitious material (SCM). In some embodiments, the dosage of the calcium compound is about 3.1% to about 35% of the total binder content of the cementitious mixture. In some embodiments, the method includes mixing the cementitious mixture.

In another aspect, the present disclosure also includes a method of preparing an admixture for a cementitious mixture comprising calcium oxide, the method comprising reducing the calcium oxide to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing an admixture for a cementitious mixture comprising calcium oxide, wherein the admixture conforms to ASTM C494 and EN 934, the method comprising reducing the calcium oxide to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing an admixture for a cementitious mixture comprising calcium oxide, the method comprising reducing the calcium oxide to a desired particle size and/or a range of particle sizes and mixing the calcium oxide with calcium hydroxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture comprising calcium oxide, the method comprising reducing the calcium oxide to a desired particle size and/or a range of particle sizes and mixing the calcium oxide with any admixture listed by ASTM C494 and/or EN 934. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture comprising calcium oxide, the method comprising reducing the calcium oxide to a desired particle size and/or a range of particle sizes and mixing the calcium oxide with SCM. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture comprising calcium oxide, the method comprising reducing the calcium oxide to a desired particle size and/or a range of particle sizes and adding water to the calcium oxide to form a slurry. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture comprising calcium oxide, the method comprising reducing the calcium oxide to a desired particle size and/or a range of particle sizes and mixing the calcium oxide with sand. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture comprising calcium oxide, the method comprising reducing the calcium oxide to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture, the method comprising mixing quicklime with SCM. In some embodiments, the calcium oxide is reduced to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete admixture, the method comprising mixing calcium oxide with calcium hydroxide. In some embodiments, the calcium oxide is reduced to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a concrete addition and/or a cement addition, the method comprising mixing quicklime with SCM. In some embodiments, the SCM is fly ash. In some embodiments, the quicklime is reduced to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a cement addition comprising calcium oxide, the method comprising reducing the calcium oxide to a desired particle size and/or a range of particle sizes. In some embodiments, the particle size is greater than about 0.075 mm to about 0.5 mm, greater than about 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a cement addition, the method comprising mixing calcium oxide with SCM. In some embodiments, the calcium oxide is reduced to a desired particle size and/or a range of particle sizes. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In another aspect, the present disclosure also includes a method of preparing a cement addition, the method comprising mixing calcium oxide with calcium hydroxide. In some embodiments, the calcium oxide is reduced to a desired particle size and/or a range of particle sizes. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

Cementitious Mixtures and Compositions

In one aspect, the disclosure provides cementitious mixtures. In some embodiments, cementitious mixtures include cement, such as ordinary Portland cement, and optionally include supplementary cementitious material (SCM), fine aggregates, course aggregates, admixtures and and/or admixtures identified in ASTM C494 and EN 934, including plasticizers or retarders. In some embodiment, the cementitious mixture further include water. In some embodiments, the cementicious mixture is a cement paste mixture. In some embodiments, the cementicious mixture is a grout mixture. In some embodiments, the cementicious mixture is a mortar mixture. In some embodiments, the cementicious mixture is a concrete mixture. In some embodiments, the concrete comprises a cementitious mixture. In some embodiments, the cementitious mixtures further comprise a calcium compound. As would be understood by one of ordinary skill in the art, "ASTM C494" refers to standard specification for chemical admixtures for concrete. As would be understood by one of ordinary skill in the art, "EN 934" refer to European Standard for admixtures for concrete, mortar, and grout.

In another aspect, the disclosure provides a cementitious mixture comprising a calcium compound and ordinary Portland cement (OPC) and optionally supplementary cementitious material (SCM). In some embodiments, the dosage of the calcium compound is about 3.1% to about 35% of the total binder content of the cementitious mixture.

As would be understood by one of ordinary skill in the art, admixtures identified in ASTM C494 include specific performance admixture wherein the admixture provides a desired performance characteristic(s) other than reducing water content, or changing the time of setting of concrete, or both, without any adverse effects on fresh, hardened and durability properties of concrete as specified in ASTM C494, excluding admixtures that are used primarily in the manufacture of dry-cast concrete products.

As would be understood by one of ordinary skill in the art, admixtures identified in EN 934 include admixtures that are capable of being effective in their intended use without detrimental effects, and admixtures for concrete include material added during the mixing process of concrete in a quantity not more than 5% by mass of the cement content of the concrete in order to modify the properties of the mix in the fresh and/or hardened state.

In some embodiments, the cementitious mixtures comprise a total binder content comprising, consisting essentially of and/or consisting of cement and supplementary cementitious materials (SCM).

In some embodiments, the total binder content comprises ordinary Portland cement (OPC) and supplementary cementitious material (SCM). In some embodiments, the total binder content comprises about 20% to about 100% OPC and about 0% to about 80% SCM. In some embodiments, the cementitious mixture comprises about 50 $kg/m^3$ to about 400 $kg/m^3$ OPC, about 0 $kg/m^3$ to about 400 $kg/m^3$ SCM, about 10 $kg/m^3$ to about 100 $kg/m^3$ calcium compound, and about 10 $kg/m^3$ to about 150 $kg/m^3$ calcium compound.

In some embodiments, the total binder content comprises about 100% OPC. In some embodiments, the total binder content comprises about 80% to about 99% OPC and about 1% to about 20% SCM. In some embodiments, the total binder content comprises about 80% to about 90% OPC and about 10% to about 20% SCM. In some embodiments, the total binder content comprises about 85% to about 95% OPC and about 5% to about 15% SCM. In some embodiments, the total binder content comprises about 90% to about 99% OPC and about 1% to about 10% SCM.

In some embodiments, the total binder content comprises about 60% to about 79% OPC and about 21% to about 40% SCM. In some embodiments, the total binder content comprises about 60% to about 70% OPC and about 30% to about 40% SCM. In some embodiments, the total binder content comprises about 65% to about 75% OPC and about 25% to about 35% SCM. In some embodiments, the total binder content comprises about 65% to about 70% OPC and about 30% to about 35% SCM. In some embodiments, the total binder content comprises about 70% to about 79% OPC and about 21% to about 30% SCM. In some embodiments, the total binder content comprises about 70% OPC and about 30% SCM.

In some embodiments, the total binder content comprises about 20% to about 59% OPC and about 41% to about 80% SCM. In some embodiments, the total binder content comprises about 20% to about 50% OPC and about 50% to about 80% SCM. In some embodiments, the total binder content comprises about 20% to about 40% OPC and about 60% to about 80% SCM. In some embodiments, the total binder content comprises about 20% to about 30% OPC and about 70% to about 80% SCM. In some embodiments, the total binder content comprises about 30% to about 50% OPC and about 50% to about 70% SCM. In some embodiments, the total binder content comprises about 30% to about 40% OPC and about 60% to about 70% SCM. In some embodiments, the total binder content comprises about 40% to about 59% OPC and about 41% to about 60% SCM. In some embodiments, the total binder content comprises about 40% to about 50% OPC and about 50% to about 60% SCM. In some embodiments, the total binder content comprises about 50% to about 59% OPC and about 41% to about 50% SCM.

In some embodiments, the disclosure provides a cementitious mixture comprising a calcium compound, OPC, and SCM. In some embodiments, the dosage of calcium compound added to the mixture is a dosage of a certain percentage of the total binder content of the cementitious mixture. In some embodiments, the cementitious mixture comprises a dosage of calcium compound of a certain percentage of the total binder content of the cementitious mixture. In a non-limiting example, if the calcium compound is added to the mixture at a dosage of about 10% of the total binder content (e.g., total of $mg/m^3$ cement and $mg/m^3$ SCM) of the cementitious mixture, and the total binder content is about 300 $kg/m^3$, then the dosage of calcium compound is about 30 $kg/m^3$. In some embodiments, the cementitious mixture has a total binder content of about 100 $kg/m^3$ to about 700 $kg/m^3$. In some embodiments, the cementitious mixture has a total binder content of about 200 $kg/m^3$ to about 700 $kg/m^3$. In some embodiments, the cementitious mixture has a total binder content of about 300 $kg/m^3$ to about 700 $kg/m^3$. In some embodiments, the cementitious mixture has a total binder content of about 400 $kg/m^3$ to about 700 $kg/m^3$. In some embodiments, the cementitious mixture has a total binder content of about 200 $kg/m^3$ to about 600 $kg/m^3$. In some embodiments, the cementitious mixture has a total binder content of about 300 $kg/m^3$ to about 600 $kg/m^3$. In some embodiments, the cementitious mixture has a total binder content of about 400 $kg/m^3$ to about 600 $kg/m^3$. In some embodiments, the cementitious mixture has a total binder content of about 500 $kg/m^3$ to about 600 $kg/m^3$. In some embodiments, the cementitious mixture has a total binder content of about 200 $kg/m^3$ to about 300 $kg/m^3$. In some embodiments, the cementitious mixture has a total binder content of about 300 $kg/m^3$ to about 500 $kg/m^3$.

In some embodiments, the cementitious mixture has a total binder content of about 100 $kg/m^3$, about 200 $kg/m^3$, about 300 $kg/m^3$, about 400 $kg/m^3$, about 500 $kg/m^3$, about 600 $kg/m^3$, or about 700 $kg/m^3$.

In some embodiments, the cementitious mixture has a total binder content of about 700 $kg/m^3$ to about 1300 $kg/m^3$. In some embodiments, the cementitious mixture has a total binder content of about 800 $kg/m^3$ to about 1300 $kg/m^3$. In some embodiments, the cementitious mixture has a total binder content of about 900 kg/m$^3$ to about 1300 kg/m$^3$. In some embodiments, the cementitious mixture has a total binder content of about 800 kg/m$^3$ to about 1200 kg/m$^3$. In some embodiments, the cementitious mixture has a total binder content of about 900 kg/m$^3$ to about 1200 kg/m$^3$. In some embodiments, the cementitious mixture has a total binder content of about 900 kg/m$^3$ to about 1200 kg/m$^3$. In some embodiments, the cementitious mixture has a total binder content of about 1000 kg/m$^3$ to about 1100 kg/m$^3$. In some embodiments, the cementitious mixture has a total binder content of about 1100 kg/m$^3$ to about 1300 kg/m$^3$.

In some embodiments, the cementitious mixture has a total binder content of about 800 kg/m$^3$, about 900 kg/m$^3$, about 1000 kg/m$^3$, about 1100 kg/m$^3$, about 1200 kg/m$^3$, or about 1300 kg/m$^3$.

In some embodiments, the dosage of calcium compound is about 6.5% to about 30% of the total binder content of the cementitious mixture. In some embodiments, the dosage of calcium compound is about 6.5% to about 20% of the total binder content of the cementitious mixture. In some embodiments, the dosage of calcium compound is about 6.5% to about 15% of the total binder content of the cementitious mixture. In some embodiments, the dosage of calcium compound is about 6.5% to about 12% of the total binder content of the cementitious mixture. In some embodiments, the dosage of calcium compound is about 6.5% to about 10% of the total binder content of the cementitious mixture. In some embodiments, the dosage of calcium compound is about 6.5% to about 8% of the total binder content of the cementitious mixture. In some embodiments, the dosage of calcium compound is about 8% to about 30% of the total binder content of the cementitious mixture. In some embodiments, the dosage of calcium compound is about 8% to about 20% of the total binder content of the cementitious mixture. In some embodiments, the dosage of calcium compound is about 8% to about 15% of the total binder content of the cementitious mixture. In some embodiments, the dosage of calcium compound is about 8% to about 12% of the total binder content of the cementitious mixture. In some embodiments, the dosage of calcium compound is about 8% to about 10% of the total binder content of the cementitious mixture. In some embodiments, the dosage of calcium compound is about 3.1% to about 35% of the total binder content of the cementitious mixture. In some embodiments, the dosage of calcium compound is about 3.1% to about 30% of the total binder content of the cementitious mixture. In some embodiments, the dosage of calcium compound is about 25% to about 35% of the total binder content of the cementitious mixture. In some embodiments, the dosage of calcium compound is about 25% to about 30% of the total binder content of the cementitious mixture. In some embodiments, the dosage of calcium compound is about 15% to about 25% of the total binder content of the cementitious mixture. In some embodiments, the dosage of calcium compound is about 10% to about 35% of the total binder content of the cementitious mixture. In some embodiments, the dosage of calcium compound is about 10% to about 30% of the total binder content of the cementitious mixture. In some embodiments, the dosage of calcium compound is about 10% to about 15% of the total binder content of the cementitious mixture. In some embodiments, the dosage of calcium compound is about 3.1% to about 25% of the total binder content of the cementitious mixture. In some embodiments, the dosage of calcium compound is about 3.1% to about 20% of the total binder content of the cementitious mixture. In some embodiments, the dosage of calcium compound is about 3.1% to about 15% of the total binder content of the cementitious mixture. In some embodiments, the dosage of calcium compound is about 3.1% to about 10% of the total binder content of the cementitious mixture. In some embodiments, the dosage of calcium compound is about 3.1% to about 8% of the total binder content of the cementitious mixture. In some embodiments, the dosage of calcium compound is about 3.1% to about 6.5% of the total binder content of the cementitious mixture. In some embodiments, the dosage of calcium compound is about 5% to about 25% of the total binder content of the cementitious mixture. In some embodiments, the dosage of calcium compound is about 5% to about 20% of the total binder content of the cementitious mixture. In some embodiments, the dosage of calcium compound is about 5% to about 15% of the total binder content of the cementitious mixture. In some embodiments, the dosage of calcium compound is about 5% to about 10% of the total binder content of the cementitious mixture. In some embodiments, the dosage of calcium compound is about 10% to about 15% of the total binder content of the cementitious mixture. In some embodiments, the dosage of calcium compound is about 10% to about 20% of the total binder content of the cementitious mixture. In some embodiments, the dosage of calcium compound is about 20% to about 30% of the total binder content of the cementitious mixture. In some embodiments, the dosage of calcium compound is about 20% to about 25% of the total binder content of the cementitious mixture. In some embodiments, the dosage of calcium compound is about 25% to about 30% of the total binder content of the cementitious mixture. In some embodiments, the dosage of calcium compound is about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, or about 35% of the total binder content of the cementitious mixture.

In some embodiments, the dosage of calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, or about 8% to about 10% of the total binder content of the cementitious mixture, and the calcium compound has a particle size from about 1 mm to about 2.5 mm. In some embodiments, the dosage of calcium compound is about 8% to about 12% of the total binder content of the cementitious mixture, and the calcium compound has a particle size from about 1 mm to about 2.5 mm.

In some embodiments, the dosage of calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, or about 8% to about 10% of the total binder content of the cementitious mixture, and the calcium compound has a particle size from about 2.5 mm to about 3.5 mm. In some embodiments, the dosage of calcium compound is about 6.5% to about 30% of the total binder content of the cementitious mixture, and the calcium compound has a particle size from about 2.5 mm to about 3.5 mm.

In some embodiments, the dosage of calcium compound is about 4% to about 10% of the total binder content of the cementitious mixture. In some embodiments, the dosage of calcium compound is about 4% of the total binder content of the cementitious mixture.

Figure 28A:
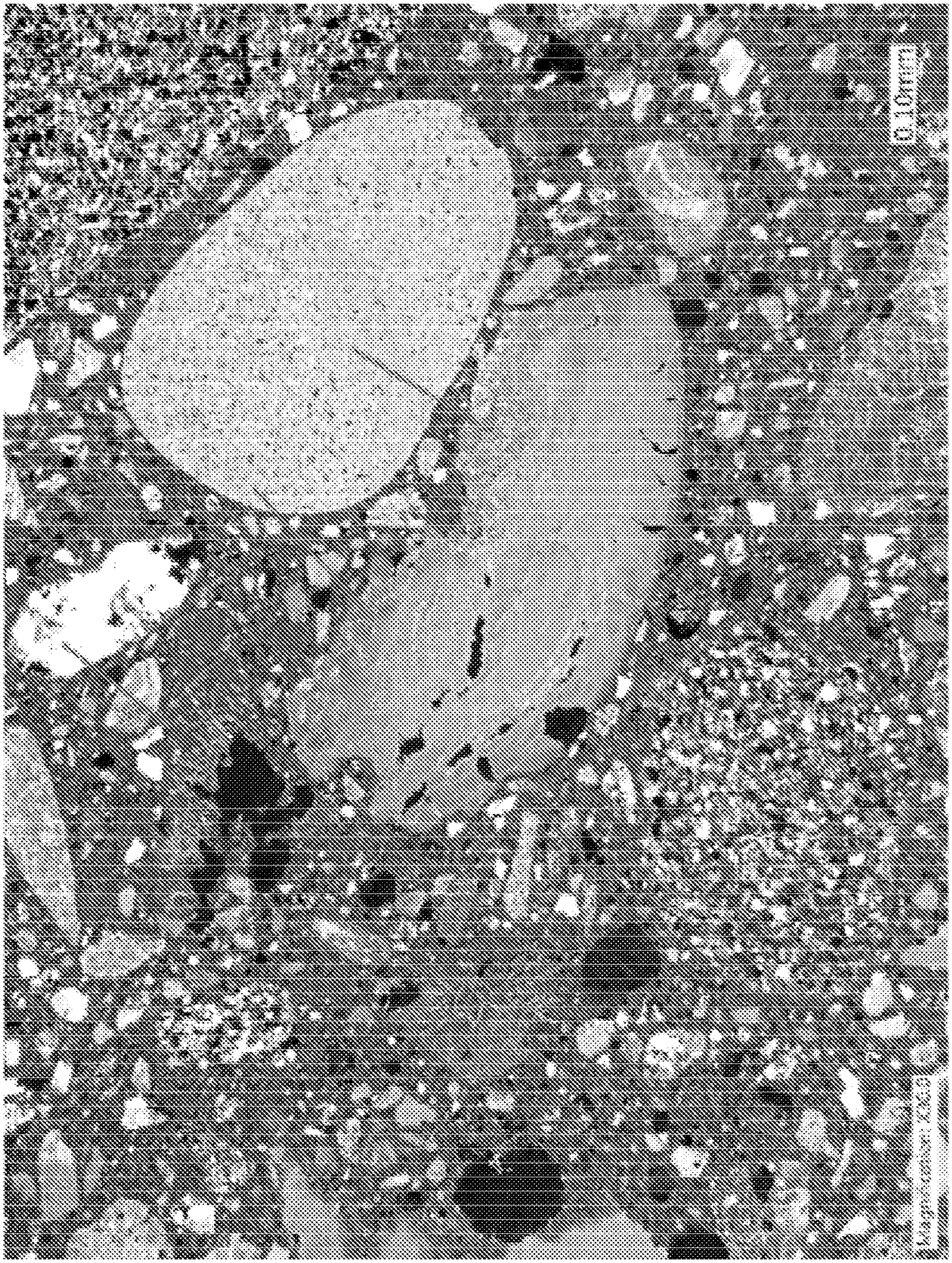
FIG. 28A depicts an image of Mix H1b at 30× magnification observed from a cut section, showing red arrows indicating calcium oxide visible in solid concrete.

In some embodiments, the cementitious mixture comprises, consists essentially of, and/or consists of a mixture of FIG. 28A. In some embodiments, the cementitious mixture comprises, consists essentially of, and/or consists of a mixture of FIG. 28B. In some embodiments, the cementitious mixture comprises, consists essentially of, and/or consists of a mixture of Table 13. In some embodiments, the cementitious mixture comprises, consists essentially of, and/or consists of a mixture of Table 15. In some embodiments, the cementitious mixture further comprises water, fine aggregates, and optionally coarse aggregates.

In some embodiments, the cementitious mixture has a total binder content of about 100 kg/m$^3$ to about 200 kg/m$^3$, and the dosage of calcium compound is about 3.1% to about 35% of the total binder content of the cementitious mixture. In some embodiments, the cementitious mixture has a total binder content of about 100 kg/m$^3$ to about 200 kg/m$^3$, and the dosage of calcium compound is about 5% to about 30% of the total binder content of the cementitious mixture. In some embodiments, the cementitious mixture has a total binder content of about 100 kg/m$^3$ to about 200 kg/m$^3$, and the dosage of calcium compound is about 10% to about 15% of the total binder content of the cementitious mixture. In some embodiments, the cementitious mixture has a total binder content of about 100 kg/m$^3$ to about 200 kg/m$^3$, and the dosage of calcium compound is about 8% to about 12% of the total binder content of the cementitious mixture. In some embodiments, the cementitious mixture has a total binder content of about 100 kg/m$^3$ to about 200 kg/m$^3$, and the dosage of calcium compound is about 6.5% to about 15% of the total binder content of the cementitious mixture.

In some embodiments, the cementitious mixture has a total binder content of about 100 kg/m$^3$ to about 700 kg/m$^3$, and the dosage of calcium compound is about 3.1% to about 35% of the total binder content of the cementitious mixture. In some embodiments, the cementitious mixture has a total binder content of about 100 kg/m$^3$ to about 700 kg/m$^3$, and the dosage of calcium compound is about 5% to about 30% of the total binder content of the cementitious mixture. In some embodiments, the cementitious mixture has a total binder content of about 100 kg/m$^3$ to about 700 kg/m$^3$, and the dosage of calcium compound is about 10% to about 15% of the total binder content of the cementitious mixture. In some embodiments, the cementitious mixture has a total binder content of about 100 kg/m$^3$ to about 700 kg/m$^3$, and the dosage of calcium compound is about 8% to about 12% of the total binder content of the cementitious mixture. In some embodiments, the cementitious mixture has a total binder content of about 100 kg/m$^3$ to about 700 kg/m$^3$, and the dosage of calcium compound is about 6.5% to about 15% of the total binder content of the cementitious mixture.

In some embodiments, the cementitious mixture has a total binder content of about 200 kg/m$^3$ to about 700 kg/m$^3$, and the dosage of calcium compound is about 3.1% to about 35% of the total binder content of the cementitious mixture. In some embodiments, the cementitious mixture has a total binder content of about 200 kg/m$^3$ to about 700 kg/m$^3$, and the dosage of calcium compound is about 5% to about 30% of the total binder content of the cementitious mixture. In some embodiments, the cementitious mixture has a total binder content of about 200 kg/m$^3$ to about 700 kg/m$^3$, and the dosage of calcium compound is about 10% to about 15% of the total binder content of the cementitious mixture. In some embodiments, the cementitious mixture has a total binder content of about 200 kg/m$^3$ to about 700 kg/m$^3$, and the dosage of calcium compound is about 8% to about 12% of the total binder content of the cementitious mixture. In some embodiments, the cementitious mixture has a total binder content of about 200 kg/m$^3$ to about 700 kg/m$^3$, and the dosage of calcium compound is about 6.5% to about 15% of the total binder content of the cementitious mixture.

In some embodiments, the cementitious mixture has a total binder content of about 300 kg/m$^3$ to about 700 kg/m$^3$, and the dosage of calcium compound is about 3.1% to about 30% of the total binder content of the cementitious mixture. In some embodiments, the cementitious mixture has a total binder content of about 300 kg/m$^3$ to about 700 kg/m$^3$, and the dosage of calcium compound is about 5% to about 25% of the total binder content of the cementitious mixture. In some embodiments, the cementitious mixture has a total binder content of about 300 kg/m$^3$ to about 700 kg/m$^3$, and the dosage of calcium compound is about 10% to about 15% of the total binder content of the cementitious mixture. In some embodiments, the cementitious mixture has a total binder content of about 300 kg/m$^3$ to about 700 kg/m$^3$, and the dosage of calcium compound is about 8% to about 12% of the total binder content of the cementitious mixture. In some embodiments, the cementitious mixture has a total binder content of about 300 kg/m$^3$ to about 700 kg/m$^3$, and the dosage of calcium compound is about 6.5% to about 15% of the total binder content of the cementitious mixture.

In some embodiments, the cementitious mixture has a total binder content of about 400 kg/m$^3$ to about 700 kg/m$^3$, and the dosage of calcium compound is about 3.1% to about 25% of the total binder content of the cementitious mixture. In some embodiments, the cementitious mixture has a total binder content of about 400 kg/m$^3$ to about 700 kg/m$^3$, and the dosage of calcium compound is about 5% to about 25% of the total binder content of the cementitious mixture. In some embodiments, the cementitious mixture has a total binder content of about 400 kg/m$^3$ to about 700 kg/m$^3$, and the dosage of calcium compound is about 3.1% to about 10% of the total binder content of the cementitious mixture. In some embodiments, the cementitious mixture has a total binder content of about 400 kg/m$^3$ to about 700 kg/m$^3$, and the dosage of calcium compound is about 3.1% to about 8% of the total binder content of the cementitious mixture. In some embodiments, the cementitious mixture has a total binder content of about 400 kg/m$^3$ to about 700 kg/m$^3$, and the dosage of calcium compound is about 3.1% to about 6.5% of the total binder content of the cementitious mixture. In some embodiments, the cementitious mixture has a total binder content of about 400 kg/m$^3$ to about 700 kg/m$^3$, and the dosage of calcium compound is about 5% to about 10% of the total binder content of the cementitious mixture. In some embodiments, the cementitious mixture has a total binder content of about 400 kg/m$^3$ to about 700 kg/m$^3$, and the dosage of calcium compound is about 10% to about 15% of the total binder content of the cementitious mixture. In some embodiments, the cementitious mixture has a total binder content of about 400 kg/m$^3$ to about 700 kg/m$^3$, and the dosage of calcium compound is about 8% to about 12% of the total binder content of the cementitious mixture. In some embodiments, the cementitious mixture has a total binder content of about 400 kg/m$^3$ to about 700 kg/m$^3$, and the dosage of calcium compound is about 6.5% to about 15% of the total binder content of the cementitious mixture.

In some embodiments, the cementitious mixture has a total binder content of about 200 kg/m$^3$ to about 600 kg/m$^3$, and the dosage of calcium compound is about 3.1% to about 35% of the total binder content of the cementitious mixture. In some embodiments, the cementitious mixture has a total binder content of about 200 kg/m$^3$ to about 600 kg/m$^3$, and the dosage of calcium compound is about 10% to about 15% of the total binder content of the cementitious mixture. In some embodiments, the cementitious mixture has a total binder content of about 200 kg/$m^3$ to about 600 kg/$m^3$, and the dosage of calcium compound is about 5% to about 25% of the total binder content of the cementitious mixture. In some embodiments, the cementitious mixture has a total binder content of about 200 kg/$m^3$ to about 600 kg/$m^3$, and the dosage of calcium compound is about 8% to about 12% of the total binder content of the cementitious mixture. In some embodiments, the cementitious mixture has a total binder content of about 200 kg/$m^3$ to about 600 kg/$m^3$, and the dosage of calcium compound is about 6.5% to about 15% of the total binder content of the cementitious mixture. In some embodiments, the cementitious mixture has a total binder content of about 200 kg/$m^3$ to about 600 kg/$m^3$, and the dosage of calcium compound is about 3.1% to about 6.5% of the total binder content of the cementitious mixture. In some embodiments, the cementitious mixture has a total binder content of about 200 kg/$m^3$ to about 600 kg/$m^3$, and the dosage of calcium compound is about 3.1% to about 8% of the total binder content of the cementitious mixture.

In some embodiments, the cementitious mixture has a total binder content of about 300 kg/$m^3$ to about 600 kg/$m^3$, and the dosage of calcium compound is about 5% to about 30% of the total binder content of the cementitious mixture. In some embodiments, the cementitious mixture has a total binder content of about 300 kg/$m^3$ to about 600 kg/$m^3$, and the dosage of calcium compound is about 5% to about 25% of the total binder content of the cementitious mixture. In some embodiments, the cementitious mixture has a total binder content of about 300 kg/$m^3$ to about 600 kg/$m^3$, and the dosage of calcium compound is about 10% to about 15% of the total binder content of the cementitious mixture. In some embodiments, the cementitious mixture has a total binder content of about 300 kg/$m^3$ to about 600 kg/$m^3$, and the dosage of calcium compound is about 8% to about 12% of the total binder content of the cementitious mixture. In some embodiments, the cementitious mixture has a total binder content of about 300 kg/$m^3$ to about 600 kg/$m^3$, and the dosage of calcium compound is about 6.5% to about 15% of the total binder content of the cementitious mixture. In some embodiments, the cementitious mixture has a total binder content of about 300 kg/$m^3$ to about 600 kg/$m^3$, and the dosage of calcium compound is about 3.1% to about 6.5% of the total binder content of the cementitious mixture. In some embodiments, the cementitious mixture has a total binder content of about 300 kg/$m^3$ to about 600 kg/$m^3$, and the dosage of calcium compound is about 3.1% to about 8% of the total binder content of the cementitious mixture.

In some embodiments, the cementitious mixture has a total binder content of about 400 kg/$m^3$ to about 600 kg/$m^3$, and the dosage of calcium compound is about 5% to about 25% of the total binder content of the cementitious mixture. In some embodiments, the cementitious mixture has a total binder content of about 400 kg/$m^3$ to about 600 kg/$m^3$, and the dosage of calcium compound is about 5% to about 15% of the total binder content of the cementitious mixture. In some embodiments, the cementitious mixture has a total binder content of about 400 kg/$m^3$ to about 600 kg/$m^3$, and the dosage of calcium compound is about 10% to about 15% of the total binder content of the cementitious mixture. In some embodiments, the cementitious mixture has a total binder content of about 400 kg/$m^3$ to about 600 kg/$m^3$, and the dosage of calcium compound is about 8% to about 15% of the total binder content of the cementitious mixture. In some embodiments, the cementitious mixture has a total binder content of about 400 kg/$m^3$ to about 600 kg/$m^3$, and the dosage of calcium compound is about 6.5% to about 15% of the total binder content of the cementitious mixture. In some embodiments, the cementitious mixture has a total binder content of about 400 kg/$m^3$ to about 600 kg/$m^3$, and the dosage of calcium compound is about 3.1% to about 6.5% of the total binder content of the cementitious mixture. In some embodiments, the cementitious mixture has a total binder content of about 400 kg/$m^3$ to about 600 kg/$m^3$, and the dosage of calcium compound is about 3.1% to about 8% of the total binder content of the cementitious mixture.

In some embodiments, the cementitious mixture has a total binder content of about 500 kg/$m^3$ to about 600 kg/$m^3$, and the dosage of calcium compound is about 5% to about 15% of the total binder content of the cementitious mixture. In some embodiments, the cementitious mixture has a total binder content of about 500 kg/$m^3$ to about 600 kg/$m^3$, and the dosage of calcium compound is about 5% to about 10% of the total binder content of the cementitious mixture. In some embodiments, the cementitious mixture has a total binder content of about 500 kg/$m^3$ to about 600 kg/$m^3$, and the dosage of calcium compound is about 10% to about 15% of the total binder content of the cementitious mixture. In some embodiments, the cementitious mixture has a total binder content of about 500 kg/$m^3$ to about 600 kg/$m^3$, and the dosage of calcium compound is about 8% to about 12% of the total binder content of the cementitious mixture. In some embodiments, the cementitious mixture has a total binder content of about 500 kg/$m^3$ to about 600 kg/$m^3$, and the dosage of calcium compound is about 6.5% to about 15% of the total binder content of the cementitious mixture. In some embodiments, the cementitious mixture has a total binder content of about 500 kg/$m^3$ to about 600 kg/$m^3$, and the dosage of calcium compound is about 3.1% to about 6.5% of the total binder content of the cementitious mixture. In some embodiments, the cementitious mixture has a total binder content of about 500 kg/$m^3$ to about 600 kg/$m^3$, and the dosage of calcium compound is about 3.1% to about 8% of the total binder content of the cementitious mixture.

In some embodiments, the cementitious mixture has a total binder content of about 200 kg/$m^3$ to about 300 kg/$m^3$, and the dosage of calcium compound is about 10% to about 35% of the total binder content of the cementitious mixture. In some embodiments, the cementitious mixture has a total binder content of about 200 kg/$m^3$ to about 300 kg/$m^3$, and the dosage of calcium compound is about 10% to about 30% of the total binder content of the cementitious mixture. In some embodiments, the cementitious mixture has a total binder content of about 200 kg/$m^3$ to about 300 kg/$m^3$, and the dosage of calcium compound is about 10% to about 25% of the total binder content of the cementitious mixture. In some embodiments, the cementitious mixture has a total binder content of about 200 kg/$m^3$ to about 300 kg/$m^3$, and the dosage of calcium compound is about 10% to about 15% of the total binder content of the cementitious mixture. In some embodiments, the cementitious mixture has a total binder content of about 200 kg/$m^3$ to about 300 kg/$m^3$, and the dosage of calcium compound is about 15% to about 25% of the total binder content of the cementitious mixture. In some embodiments, the cementitious mixture has a total binder content of about 200 kg/$m^3$ to about 300 kg/$m^3$, and the dosage of calcium compound is about 25% to about 35% of the total binder content of the cementitious mixture. In some embodiments, the cementitious mixture has a total binder content of about 200 kg/$m^3$ to about 300 kg/$m^3$, and the dosage of calcium compound is about 25% to about 30% of the total binder content of the cementitious mixture. In some embodiments, the cementitious mixture has a total binder content of about 200 $kg/m^3$ to about 300 $kg/m^3$, and the dosage of calcium compound is about 6.5% to about 15% of the total binder content of the cementitious mixture. In some embodiments, the cementitious mixture has a total binder content of about 200 $kg/m^3$ to about 300 $kg/m^3$, and the dosage of calcium compound is about 3.1% to about 6.5% of the total binder content of the cementitious mixture. In some embodiments, the cementitious mixture has a total binder content of about 200 $kg/m^3$ to about 300 $kg/m^3$, and the dosage of calcium compound is about 3.1% to about 8% of the total binder content of the cementitious mixture.

In some embodiments, the cementitious mixture has a total binder content of about 300 $kg/m^3$ to about 500 $kg/m^3$, and the dosage of calcium compound is about 5% to about 30% of the total binder content of the cementitious mixture. In some embodiments, the cementitious mixture has a total binder content of about 300 $kg/m^3$ to about 500 $kg/m^3$, and the dosage of calcium compound is about 5% to about 25% of the total binder content of the cementitious mixture. In some embodiments, the cementitious mixture has a total binder content of about 300 $kg/m^3$ to about 500 $kg/m^3$, and the dosage of calcium compound is about 5% to about 15% of the total binder content of the cementitious mixture. In some embodiments, the cementitious mixture has a total binder content of about 300 $kg/m^3$ to about 500 $kg/m^3$, and the dosage of calcium compound is about 5% to about 10% of the total binder content of the cementitious mixture. In some embodiments, the cementitious mixture has a total binder content of about 300 $kg/m^3$ to about 500 $kg/m^3$, and the dosage of calcium compound is about 10% to about 15% of the total binder content of the cementitious mixture. In some embodiments, the cementitious mixture has a total binder content of about 300 $kg/m^3$ to about 500 $kg/m^3$, and the dosage of calcium compound is about 8% to about 12% of the total binder content of the cementitious mixture. In some embodiments, the cementitious mixture has a total binder content of about 300 $kg/m^3$ to about 500 $kg/m^3$, and the dosage of calcium compound is about 6.5% to about 30% of the total binder content of the cementitious mixture. In some embodiments, the cementitious mixture has a total binder content of about 300 $kg/m^3$ to about 500 $kg/m^3$, and the dosage of calcium compound is about 6.5% to about 20% of the total binder content of the cementitious mixture. In some embodiments, the cementitious mixture has a total binder content of about 300 $kg/m^3$ to about 500 $kg/m^3$, and the dosage of calcium compound is about 6.5% to about 15% of the total binder content of the cementitious mixture. In some embodiments, the cementitious mixture has a total binder content of about 300 $kg/m^3$ to about 500 $kg/m^3$, and the dosage of calcium compound is about 6.5% to about 12% of the total binder content of the cementitious mixture. In some embodiments, the cementitious mixture has a total binder content of about 300 $kg/m^3$ to about 500 $kg/m^3$, and the dosage of calcium compound is about 6.5% to about 10% of the total binder content of the cementitious mixture. In some embodiments, the cementitious mixture has a total binder content of about 300 $kg/m^3$ to about 500 $kg/m^3$, and the dosage of calcium compound is about 6.5% to about 8% of the total binder content of the cementitious mixture. In some embodiments, the cementitious mixture has a total binder content of about 300 $kg/m^3$ to about 500 $kg/m^3$, and the dosage of calcium compound is about 8% to about 30% of the total binder content of the cementitious mixture. In some embodiments, the cementitious mixture has a total binder content of about 300 $kg/m^3$ to about 500 $kg/m^3$, and the dosage of calcium compound is about 8% to about 20% of the total binder content of the cementitious mixture. In some embodiments, the cementitious mixture has a total binder content of about 300 $kg/m^3$ to about 500 $kg/m^3$, and the dosage of calcium compound is about 8% to about 15% of the total binder content of the cementitious mixture. In some embodiments, the cementitious mixture has a total binder content of about 300 $kg/m^3$ to about 500 $kg/m^3$, and the dosage of calcium compound is about 8% to about 10% of the total binder content of the cementitious mixture. In some embodiments, the cementitious mixture has a total binder content of about 300 $kg/m^3$ to about 500 $kg/m^3$, and the dosage of calcium compound is about 3.1% to about 6.5% of the total binder content of the cementitious mixture. In some embodiments, the cementitious mixture has a total binder content of about 300 $kg/m^3$ to about 500 $kg/m^3$, and the dosage of calcium compound is about 3.1% to about 8% of the total binder content of the cementitious mixture.

In some embodiments, the cementitious mixture has a total binder content of about 200 $kg/m^3$, and the dosage of calcium compound is about 6.5%, about 7%, about 8%, about 9%, about 10%, about 11%, about 12% about 13%, about 14%, about 15%, about 20%, about 25%, about 30%, or about 35% of the total binder content of the cementitious mixture. In some embodiments, the cementitious mixture has a total binder content of about 300 $kg/m^3$, and the dosage of calcium compound is about 6.5%, about 7%, about 8%, about 9%, about 10%, about 11%, about 12% about 13%, about 14%, about 15%, about 20%, about 25%, or about 30% of the total binder content of the cementitious mixture. In some embodiments, the cementitious mixture has a total binder content of about 400 $kg/m^3$, and the dosage of calcium compound is about 3.1%, about 5%, about 6.5%, about 7%, about 8%, about 9%, about 10%, about 11%, about 12% about 13%, about 14%, about 15%, about 20%, or about 25% of the total binder content of the cementitious mixture. In some embodiments, the cementitious mixture has a total binder content of about 500 $kg/m^3$, and the dosage of calcium compound is about 3.1%, about 5%, about 6.5%, about 7%, about 8%, about 9%, about 10%, about 11%, about 12% about 13%, about 14%, or about 15% of the total binder content of the cementitious mixture. In some embodiments, the cementitious mixture has a total binder content of about 600 $kg/m^3$, and the dosage of calcium compound is about 5%, about 10%, or about 15% of the total binder content of the cementitious mixture. In some embodiments, the cementitious mixture has a total binder content of about 700 $kg/m^3$, and the dosage of calcium compound is about 3.1%, about 5% about 6.5%, about 7%, about 8%, about 9%, about 10%, about 11%, or about 12% of the total binder content of the cementitious mixture.

In some embodiments, the cementitious mixture has a total binder content of about 700 $kg/m^3$ to about 1300 $kg/m^3$, and the dosage of calcium compound is about 3.1% to about 10% of the total binder content of the cementitious mixture. In some embodiments, the cementitious mixture has a total binder content of about 700 $kg/m^3$ to about 1300 $kg/m^3$, and the dosage of calcium compound is about 5% to about 10% of the total binder content of the cementitious mixture. In some embodiments, the cementitious mixture has a total binder content of about 700 $kg/m^3$ to about 1300 $kg/m^3$, and the dosage of calcium compound is about 3.1%, about 5% or about 10% of the total binder content of the cementitious mixture.

In some embodiments, the total binder content of the cementitious mixture comprises about 100% OPC, and the dosage of calcium compound is about 3.1% to about 4% of the total binder content of the cementitious mixture. In some embodiments, the total binder content of the cementitious mixture comprises about 80% to about 99% OPC and about 1% to about 20% SCM, and the dosage of calcium compound is about 3.1% to about 4% of the total binder content of the cementitious mixture. In some embodiments, the total binder content of the cementitious mixture comprises about 60% to about 79% OPC and about 21% to about 40% SCM, and the dosage of calcium compound is about 3.1% to about 4% of the total binder content of the cementitious mixture. In some embodiments, the total binder content of the cementitious mixture comprises about 20% to about 41% OPC and about 59% to about 80% SCM, and the dosage of calcium compound is about 3.1% to about 4% of the total binder content of the cementitious mixture.

In some embodiments, the total binder content of the cementitious mixture comprises about 100% OPC, and the dosage of calcium compound is about 4% to about 10% of the total binder content of the cementitious mixture. In some embodiments, the total binder content of the cementitious mixture comprises about 80% to about 99% OPC and about 1% to about 20% SCM, and the dosage of calcium compound is about 4% to about 10% of the total binder content of the cementitious mixture. In some embodiments, the total binder content of the cementitious mixture comprises about 60% to about 79% OPC and about 21% to about 40% SCM, and the dosage of calcium compound is about 4% to about 10% of the total binder content of the cementitious mixture. In some embodiments, the total binder content of the cementitious mixture comprises about 20% to about 41% OPC and about 59% to about 80% SCM, and the dosage of calcium compound is about 4% to about 10% of the total binder content of the cementitious mixture.

In some embodiments, the total binder content of the cementitious mixture comprises about 100% OPC, and the dosage of calcium compound is about 8% to about 12% of the total binder content of the cementitious mixture. In some embodiments, the total binder content of the cementitious mixture comprises about 80% to about 99% OPC and about 1% to about 20% SCM, and the dosage of calcium compound is about 8% to about 12% of the total binder content of the cementitious mixture. In some embodiments, the total binder content of the cementitious mixture comprises about 60% to about 79% OPC and about 21% to about 40% SCM, and the dosage of calcium compound is about 8% to about 12% of the total binder content of the cementitious mixture. In some embodiments, the total binder content of the cementitious mixture comprises about 20% to about 41% OPC and about 59% to about 80% SCM, and the dosage of calcium compound is about 8% to about 12% of the total binder content of the cementitious mixture.

In some embodiments, the total binder content of the cementitious mixture comprises about 100% OPC, and the dosage of calcium compound is about 10% to about 30% of the total binder content of the cementitious mixture. In some embodiments, the total binder content of the cementitious mixture comprises about 80% to about 99% OPC and about 1% to about 20% SCM, and the dosage of calcium compound is about 10% to about 30% of the total binder content of the cementitious mixture. In some embodiments, the total binder content of the cementitious mixture comprises about 60% to about 79% OPC and about 21% to about 40% SCM, and the dosage of calcium compound is about 10% to about 30% of the total binder content of the cementitious mixture. In some embodiments, the total binder content of the cementitious mixture comprises about 20% to about 41% OPC and about 59% to about 80% SCM, and the dosage of calcium compound is about 10% to about 25% of the total binder content of the cementitious mixture.

In some embodiments, the total binder content of the cementitious mixture comprises about 100% OPC, and the dosage of calcium compound is about 30% to about 35% of the total binder content of the cementitious mixture. In some embodiments, the total binder content of the cementitious mixture comprises about 80% to about 99% OPC and about 1% to about 20% SCM, and the dosage of calcium compound is about 30% to about 35% of the total binder content of the cementitious mixture. In some embodiments, the total binder content of the cementitious mixture comprises about 60% to about 79% OPC and about 21% to about 40% SCM, and the dosage of calcium compound is about 30% to about 35% of the total binder content of the cementitious mixture. In some embodiments, the total binder content of the cementitious mixture comprises about 20% to about 41% OPC and about 59% to about 80% SCM, and the dosage of calcium compound is about 30% to about 35% of the total binder content of the cementitious mixture.

In some embodiments, the total binder content of the cementitious mixture comprises about 50 $kg/m^3$ to about 400 $kg/m^3$ OPC and about 0 $kg/m^3$ to about 400 $kg/m^3$ SCM. In some embodiments, the total binder content of the cementitious mixture comprises about 50 $kg/m^3$ to about 400 $kg/m^3$ OPC and about 0 $kg/m^3$ SCM. In some embodiments, the total binder content of the cementitious mixture comprises about 80 $kg/m^3$ to about 300 $kg/m^3$ OPC and about 100 $kg/m^3$ to about 350 $kg/m^3$ SCM. In some embodiments, the total binder content of the cementitious mixture comprises about 250 $kg/m^3$ to about 300 $kg/m^3$ OPC and about 100 $kg/m^3$ to about 150 $kg/m^3$ SCM. In some embodiments, the total binder content of the cementitious mixture comprises about 270 $kg/m^3$ to about 290 $kg/m^3$ OPC and about 110 $kg/m^3$ to about 130 $kg/m^3$ SCM. In some embodiments, the total binder content of the cementitious mixture comprises about 470 $kg/m^3$ to about 490 $kg/m^3$ OPC and about 80 $kg/m^3$ to about 90 $kg/m^3$ SCM. In some embodiments, the total binder content of the cementitious mixture comprises about 280 $kg/m^3$ OPC and about 120 $kg/m^3$ SCM. In some embodiments, the total binder content of the cementitious mixture comprises about 481 $kg/m^3$ OPC and about 85 $kg/m^3$ SCM.

In some embodiments, the SCM comprises one or more materials selected from fly ash, ground granulated blast-furnace slag, metakaolin, microsilica, natural pozzolana, rice husks, palm oil ash (POA), and glass powder (GP). Other non-limiting examples of SCM include volcanic ash, silica fume, calcined clay, brick, cocciopesto, or other ceramic materials. In some embodiments, one ore more SCMs are added to cementitious mixtures to make concrete mixtures more economical, reduce permeability, increase strength, or influence other concrete properties. In some embodiments, the SCM comprises fly ash. As used herein, "fly ash" refers to the residue from the combustion of powdered or ground coal, wherein the fly ash carried by flue gases may be recovered, for example, by electrostatic precipitation. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Two classes of fly ash are defined by ASTM C618: Class F fly ash and Class C fly ash. Class C fly ash comprises both silica and lime so that, when mixed with water, it sets to form a hardened mass. Class F fly ash generally does not contain sufficient lime, so an additional source of calcium ions is required for the Class F fly ash to form a cement composition with water. Suitable examples of fly ash include, but are not limited to, "POZMIX® A"

cement additive, commercially available from Halliburton Energy Services, Inc., Duncan, Okla. In some embodiments, the fly ash comprises fly ash meeting the standards set by ASTM C618. In some embodiments, the fly ash comprises fly ash meeting the standards set by EN 450. As would be understood by one of ordinary skill in the art, "ASTM C618" refers to standard specification for coal fly ash and raw or calcined natural pozzolan for use in concrete. As would be understood by one of ordinary skill in the art, "EN 450" refers to the European Standard definition, specifications and conformity criteria of fly ash for concrete.

In one aspect, the fly ash of the disclosure includes fly ash particles of a desirable size. Any method used for determining the particle size of fly ash is contemplated by the present disclosure, as would be understood by one of ordinary skill in the art. In a non-limiting example, the particle size of fly ash is determined by sieving.

In some embodiments, about 1.1%, about 1.2%, about 1.3%, about 1.4%, about 1.5%, about 1.6%, about 1.7%, about 1.8%, about 1.9%, about 2%, about 3%, about 4%, about 5%, about 10%, about 15%, about 20%, about 25%, about 30%, about 35%, about 40%, about 45%, about 50% or about 60% of particles of the fly ash have a particle size of about 45 microns or greater.

In some embodiments, the fly ash comprises Class N fly ash. In some embodiments, the fly ash comprises Class S fly ash. In some embodiments, about 0.1% to about 12% of particles of the fly ash have a particle size of about 45 microns or greater. In some embodiments, about 0.1% to about 13% of particles of the fly ash have a particle size of about 45 microns or greater. In some embodiments, about 0.1% to about 50% of particles of the fly ash have a particle size of about 45 microns or greater. In some embodiments, about 0% to about 60% of particles of the fly ash have a particle size of about 45 microns or greater.

In some embodiments, the fly ash comprises fly ash meeting the standards set by ASTM. In some embodiments, about 0.1% to about 34% of particles of the fly ash have a particle size of about 45 microns or greater.

In some embodiments, about 0.1% to about 87% of the particles of the fly ash have a particle size smaller than about 45 microns. In some embodiments, about 0.1% to about 88% of the particles of the fly ash have a particle size smaller than about 45 microns. In some embodiments, about 0.1% to about 70% of the particles of the fly ash have a particle size smaller than about 45 microns. In some embodiments, about 0.1% to about 66% of the particles of the fly ash have a particle size smaller than about 45 microns. In some embodiments, about 0.1% to about 60% of the particles of the fly ash have a particle size smaller than about 45 microns. In some embodiments, about 0.1% to about 50% of the particles of the fly ash have a particle size smaller than about 45 microns. In some embodiments, about 0.1% to about 40% of the particles of the fly ash have a particle size smaller than about 45 microns. In some embodiments, about 0.1% to about 30% of the particles of the fly ash have a particle size smaller than about 45 microns. In some embodiments, about 70% to about 60% of the particles of the fly ash have a particle size smaller than about 45 microns. In some embodiments, about 60% to about 50% of the particles of the fly ash have a particle size smaller than about 45 microns. In some embodiments about 50% to about 40% of the particles of the fly ash have a particle size smaller than about 45 microns. In some embodiments, about 40% to about 30% of the particles of the fly ash have a particle size smaller than about 45 microns. In some embodiments, about 30%, about 40%, about 50%, about 60%, or about 70% of the particles of the fly ash have a particle size smaller than about 45 microns.

As would be understood by one of ordinary skill in the art, when more than about 88% of the particles of fly ash have a particle size smaller than about 45 microns, the fly ash is generally not commercially available and would need to be custom made, thus making the fly ash more expensive to use and less advantageous than commercially available fly ash. As would be understood by one of ordinary skill in the art, when more than 0% of fly ash is specifically required to have a particle size smaller than about 44 microns, or about 40 microns, or about 30 microns, or about 20 microns, the fly ash is generally not commercially available and would need to be custom made, thus making the fly ash more expensive to use and less advantageous than commercially available fly ash.

In some embodiments, the cementitious mixture does not comprise activated SCM, such as activated fly ash. Methods of activating SCM, such fly ash, would be understood by one of ordinary skill in the art. In some embodiments, fly ash can be activated by fine grinding and combining with slaked calcium oxide.

In some embodiments, the cementicious mixture is a grout mixture. In some embodiments, the cementicious mixture is a mortar mixture. In some embodiments, the cementicious mixture is a concrete mixture. In some embodiments, the concrete comprises a cementious mixture.

In some embodiments, the cementicious mixture comprises about 10 kg/m$^3$ to about 200 kg/m$^3$, about 140 kg/m$^3$ to about 160 kg/m$^3$, about 10 kg/m$^3$ to about 150 kg/m$^3$, about 20 kg/m$^3$ to about 100 kg/m$^3$, about 22 kg/m$^3$ to about 100 kg/m$^3$, about 20 kg/m$^3$ to about 60 kg/m$^3$, about 15 kg/m$^3$ to about 25 kg/m$^3$, about 25 kg/m$^3$ to about 75 kg/m$^3$, about 35 kg/m$^3$ to about 70 kg/m$^3$, about 30 kg/m$^3$ to about 90 kg/m$^3$, about 35 kg/m$^3$ to about 45 kg/m$^3$, about 40 kg/m$^3$ to about 60 kg/m$^3$, about 40 kg/m$^3$ to about 50 kg/m$^3$ of calcium compound. In some embodiments, the cementicious mixture comprises about 20 kg/m$^3$, about 25 kg/m$^3$, about 30 kg/m$^3$, about 35 kg/m$^3$, about 40 kg/m$^3$, about 45 kg/m$^3$, about 50 kg/m$^3$, about 60 kg/m$^3$, about 70 kg/m$^3$, about 75 kg/m$^3$, about 90 kg/m$^3$, about 100 kg/m$^3$, or about 150 kg/m$^3$ of calcium compound.

In some embodiments, the concrete and/or concrete mixture comprises about 10 kg/m$^3$ to about 200 kg/m$^3$, about 140 kg/m$^3$ to about 160 kg/m$^3$, 10 kg/m$^3$ to about 150 kg/m$^3$, about 20 kg/m$^3$ to about 100 kg/m$^3$, about 22 kg/m$^3$ to about 100 kg/m$^3$, about 20 kg/m$^3$ to about 60 kg/m$^3$, about 15 kg/m$^3$ to about 25 kg/m$^3$, about 25 kg/m$^3$ to about 75 kg/m$^3$, about 35 kg/m$^3$ to about 70 kg/m$^3$, about 30 kg/m$^3$ to about 90 kg/m$^3$, about 35 kg/m$^3$ to about 45 kg/m$^3$, about 40 kg/m$^3$ to about 60 kg/m$^3$, about 40 kg/m$^3$ to about 50 kg/m$^3$ of calcium compound. In some embodiments, the concrete and/or concrete mixture comprises about 20 kg/m$^3$, about 25 kg/m$^3$, about 30 kg/m$^3$, about 35 kg/m$^3$, about 40 kg/m$^3$, about 45 kg/m$^3$, about 50 kg/m$^3$, about 60 kg/m$^3$, about 70 kg/m$^3$, about 75 kg/m$^3$, about 90 kg/m$^3$, about 100 kg/m$^3$ or about 150 kg/m$^3$ of calcium compound of calcium compound.

In some embodiments, the calcium compound comprises, consists of, and/or consists essentially of calcium oxide. In some embodiments, the calcium oxide is not slaked (submerged in water) prior to being adding to the cementicious mixture. In some embodiments, the SCM is not premixed or combined with slaked calcium oxide prior to being added to the cementitious mixture. In some embodiments, the calcium oxide is slaked prior to being adding to the cementicious mixture.

In some embodiments, the calcium compound comprises, consists of, and/or consists essentially of greater than about 80 wt %, greater than about 85 wt %, greater than about 90 wt %, greater than about 91 wt %, greater than about 92 wt %, greater than about 93 wt %, greater than about 94 wt %, greater than about 95 wt %, greater than about 96 wt %, greater than about 97 wt %, greater than about 98 wt %, or greater than about 99 wt % calcium oxide.

In some embodiments, the calcium compound comprises, consists of, and/or consists essentially of greater than about 80 wt %, greater than about 85 wt %, greater than about 90 wt %, greater than about 91 wt %, greater than about 92 wt %, greater than about 93 wt %, greater than about 94 wt %, greater than about 95 wt %, greater than about 96 wt %, greater than about 97 wt %, greater than about 98 wt %, or greater than about 99 wt % calcium oxide and magnesium oxide.

In some embodiments, the calcium compound comprises, consists of, and/or consists essentially of greater than about 80 wt %, greater than about 85 wt %, greater than about 90 wt %, greater than about 91 wt %, greater than about 92 wt %, greater than about 93 wt %, greater than about 94 wt %, greater than about 95 wt %, greater than about 96 wt %, greater than about 97 wt %, greater than about 98 wt %, or greater than about 99 wt % calcium hydroxide.

In some embodiments, the calcium compound comprises one or more of calcium oxide (CaO) and calcium hydroxide ($Ca(OH)_2$). In some embodiments, the calcium compound comprises one or more of calcium oxide (CaO), calcium hydroxide ($Ca(OH)_2$), and magnesium oxide. In some embodiments, the calcium compound comprises, consists of, and/or consists essentially of calcium hydroxide. In some embodiments, the calcium compound comprises, consists of, and/or consists essentially of calcium oxide. In some embodiments, the calcium compound comprises, consists of, or consists essentially of calcium oxide and calcium hydroxide, optionally further comprising magnesium oxide. In some embodiments, the calcium compound comprises, consists of, or consists essentially of calcium oxide and magnesium oxide, optionally further comprising calcium hydroxide.

In some embodiments, the calcium compound comprises calcium oxide and calcium hydroxide. In some embodiments, the calcium compound comprises about 67 wt % to about 100 wt % calcium oxide and about 0 wt % to about 33 wt % calcium hydroxide. In some embodiments, the calcium compound comprises about 33 wt % to about 66 wt % calcium oxide and about 34 wt % to about 67 wt % calcium hydroxide. In some embodiments, the calcium compound comprises about 0 wt % to about 32 wt % calcium oxide and about 68 wt % to about 100 wt % calcium hydroxide. In some embodiments, the calcium compound further comprises magnesium oxide.

In some embodiments, the calcium compound comprises about 0 wt % to about 5 wt % magnesium oxide and about 95 wt % to about 100 wt % calcium oxide. In some embodiments, the calcium compound comprises about 6 wt % to about 35 wt % magnesium oxide and about 65 wt % to about 94 wt % calcium oxide. In some embodiments, the calcium compound comprises about 36 wt % to about 46 wt % magnesium oxide and about 64 wt % to about 54 wt % calcium oxide. In some embodiments, the calcium compound comprises about 47 wt % to about 50 wt % magnesium oxide and about 53 wt % to about 50 wt % calcium oxide. In some embodiments, the calcium compound comprises about 51 wt % to about 75 wt % magnesium oxide and about 50 wt % to about 25 wt % calcium oxide. In some embodiments, the calcium compound comprises about 76 wt % to about 100 wt % magnesium oxide and about 24 wt % to about 0 wt % calcium oxide. In some embodiments, the calcium compound further comprises calcium hydroxide.

In some embodiments, the calcium compound is dry. In some embodiments, the calcium compound is not slaked. In some embodiments, the calcium compound is damp. As used herein, damp refers to calcium compound that has been combined with an amount of water that does not result in hydration of the calcium compound.

In some embodiments, the calcium compound comprises, consists of, or consists essentially of slaked lime (submerged in water). In some embodiments, the total binder content comprises of OPC and SCM. In some embodiments, the SCM is fly ash. In some embodiments, from about 2% to about 60% of the fly ash have a particle size of about 45 microns or greater.

In some embodiments, the calcium compound comprises slaked lime, such as lime that has been submerged in water. In some embodiments, the total binder content of the calcium compound comprises, consists of, or consists essentially of 100% OPC.

In some embodiments, the calcium compound has a particle size greater than about 0 to about 0.2 mm. In some embodiments, the calcium compound has a particle size from about 0.075 mm to about 0.5 mm. In some embodiments, the calcium compound has a particle size greater than about 0 mm to about 0.75 mm. In some embodiments, the calcium compound has a particle size from about 0.002 mm to about 0.75 mm. In some embodiments, the calcium compound has a particle size from about 0.075 mm to about 10 mm. In some embodiments, the calcium compound has a particle size from about 0.5 mm to about 5 mm. In some embodiments, the calcium compound has a particle size from about 0.15 mm to about 4 mm. In some embodiments, the calcium compound has a particle size from about 0.5 mm to about 1.5 mm. In some embodiments, the calcium compound has a particle size from about 0.5 mm to about 2.5 mm. In some embodiments, the calcium compound has a particle size from about 0.5 mm to about 3.5 mm. In some embodiments, the calcium compound has a particle size from about 1 mm to about 2.5 mm. In some embodiments, the calcium compound has a particle size from about 1.5 mm to about 2.5 mm. In some embodiments, the calcium compound has a particle size from about 2.5 mm to about 3.5 mm. In some embodiments, the calcium compound has a particle size from about 2.5 mm to about 4 mm. In some embodiments, the calcium compound has a particle size from about 3.5 mm to about 4 mm. In some embodiments, the calcium compound has a particle size from about 1 mm to about 10 mm. In some embodiments, the calcium compound has a particle size from about 2.5 mm to about 10 mm. In some embodiments, the calcium compound comprises, consists of, or consists essentially of calcium oxide.

In some embodiments, the calcium compound has a particle size from about 4 mm to about 5 mm. In some embodiments, the calcium compound has a particle size from about 4 mm to about 6 mm. In some embodiments, the calcium compound has a particle size from about 4 mm to about 7 mm. In some embodiments, the calcium compound has a particle size from about 4 mm to about 8 mm. In some embodiments, the calcium compound has a particle size from about 4 mm to about mm. In some embodiments, the calcium compound has a particle size from about 4 mm to about 10 mm. In some embodiments, the calcium compound has a particle size from greater than about 4 mm to about 10 mm. In some embodiments, the calcium compound comprises, consists of, or consists essentially of calcium oxide.

In some embodiments, the calcium compound is calcium oxide, and has a particle size from about 6.35 mm to about 63 mm. In some embodiments, the calcium compound is calcium oxide, and has a particle size from about 63 mm to about 204 mm. In some embodiments, the calcium compound is calcium oxide, has a particle size from about 6.35 mm to about 63 mm and is slaked prior to step (a). In some embodiments, the calcium compound is calcium oxide, has a particle size from about 63 mm to about 204 mm and is slaked prior to step (a).

In some embodiments, the calcium compound comprises, consists of, and/or consists essentially of calcium hydroxide having a particle size less than about 0.3 mm, about 0.2 mm, about 0.1 mm, about 0.09 mm, about 0.08 mm, about 0.07 mm, about 0.06 mm, about 0.06 mm, about 0.04 mm, about 0.03 mm, about 0.02 mm, or about 0.01 mm. In some embodiments, the calcium compound comprises, consists of, and/or consists essentially of calcium hydroxide, wherein about 90 wt % to about 95 wt % of the calcium hydroxide has a particle size less than about 0.3 mm or about 0.2 mm, and about 10 wt % to about 15 wt % of the calcium hydroxide has a particle size less than about 0.7 mm or about 0.6 mm.

In some embodiments, the calcium compound comprises, consists of, or consists essentially of high calcium quicklime. In some embodiments, the calcium compound comprises, consists of, or consists essentially of dolomitic quicklime.

In some embodiments, the calcium compound comprises, consists of, or consists essentially of high calcium hydrated lime. In some embodiments, the calcium compound comprises, consists of, or consists essentially of dolomitic hydrated lime.

In some embodiments, the calcium compound is of a coarse grain size (e.g. from about 1.5 mm to about 2.5 mm) in order to prevent an excessive heat of hydration of concrete prepared by the methods of the disclosure. In some embodiments, the heat of hydration is increased by less than about 10 °C, less than about 9 °C, less than about 8 °C, less than about 7 °C, less than about 6 °C, less than about 5 °C, less than about 4 °C, less than about 3 °C, less than about 2 °C, less than about 1 °C, or about 0 °C, relative to a concrete mix without a calcium compound. In some embodiments, calcium compound of a coarse grain size is used when a higher wt % (dosage) of the calcium compound is utilized in the concrete and/or concrete mixture.

In some embodiments, calcium oxide is made by calcining calcium carbonate at temperatures ranging from about 500 °C, to about 1550 °C, about 600 °C, to about 1450 °C, about 600 °C, to about 1000 °C, about 600 °C, to about 750 °C, about 1300 °C, to about 1450 °C, or over 1300 °C. In some embodiments, the calcined lime can be crushed, ground or milled and sieved, and. In a non-limiting example, lime can be obtained from limestone, dolomitic limestone, marble and any other sources of calcium carbonate ($CaCO_3$).

In some embodiments, the mixture comprises about 100 kg/m$^3$ to about 200 kg/m$^3$ water. In some embodiments, the mixture comprises about 150 kg/m$^3$ to about 200 kg/m$^3$ water. In some embodiments, the mixture comprises about 170 kg/m$^3$ to about 190 kg/m$^3$ water. In some embodiments, the mixture comprises about 180 kg/m$^3$ water. In some embodiments, the mixture comprises about 350 kg/m$^3$ to about 370 kg/m$^3$ water.

In some embodiments, the cementitious mixture comprises fine aggregate. In some embodiments, the fine aggregate comprises one or more of sand, crushed stone, silt, stone dust, and clay. In some embodiments, the fine aggregate comprises, consists of, or consists essentially of sand. In some embodiments, the fine aggregates comprise particles less than about 10 mm in diameter. In some embodiments, the fine aggregates comprise particles less than about 5 mm in diameter.

In some embodiments, the cementitious mixture comprises about 500 kg/m$^3$ to about 2000 kg/m$^3$ fine aggregate. In some embodiments, the cementitious mixture comprises about 500 kg/m$^3$ to about 1000 kg/m$^3$ fine aggregate. In some embodiments, the cementitious mixture comprises about 700 kg/m$^3$ to about 800 kg/m$^3$ fine aggregate. In some embodiments, the cementitious mixture comprises about 750 kg/m$^3$ to about 800 kg/m$^3$ fine aggregate. In some embodiments, the cementitious mixture comprises about 1000 kg/m$^3$ to about 1100 kg/m$^3$ fine aggregate. In some embodiments, the cementitious mixture comprises about 1500 kg/m$^3$ to about 2000 kg/m$^3$ fine aggregate. In some embodiments, the cementitious mixture comprises about 1600 kg/m$^3$ to about 1800 kg/m$^3$ fine aggregate. In some embodiments, the cementitious mixture comprises about 1700 kg/m$^3$ to about 1800 kg/m$^3$ fine aggregate. In some embodiments, the cementitious mixture comprises about 1700 kg/m$^3$ to about 1750 kg/m$^3$ fine aggregate.

In some embodiments, the cementitious mixture comprises coarse aggregates. In some embodiments, the coarse aggregates comprise one or more of gravel, crushed stone, cobble, and boulders. In some embodiments, the coarse aggregates comprise particles greater than about 9.5 mm in diameter. In some embodiments, the coarse aggregates comprise particles greater than about 5 mm in diameter. In some embodiments, the coarse aggregates comprise particles between about 9.5 mm to about 38 mm in diameter. In some embodiments, the coarse aggregates comprise particles between about 4 mm to about 8 mm in diameter. In some embodiments, the coarse aggregates comprise particles between about 8 mm to about 16 mm in diameter. In some embodiments, the coarse aggregates comprise particles between about 4 mm to about 8 mm in diameter and particles between about 8 mm to about 16 mm in diameter.

In some embodiments, the cementitious mixture comprises about 0 kg/m$^3$ to about 1000 kg/m$^3$ coarse aggregate. In some embodiments, the cementitious mixture comprises about 0 kg/m$^3$ to about 200 kg/m$^3$ coarse aggregate. In some embodiments, the cementitious mixture comprises about 700 kg/m$^3$ to about 800 kg/m$^3$ coarse aggregate. In some embodiments, the cementitious mixture comprises about 0 kg/m$^3$ to about 200 kg/m$^3$ of a first coarse aggregate and about 700 kg/m$^3$ to about 800 kg/m$^3$ of a second coarse aggregate.

In some embodiments, the cementitious mixture comprises fine aggregates and coarse aggregates.

In one aspect, the disclosure provides a grout mixture prepared by any one of the methods described herein. In some embodiments, the grout mixture comprises OPC and optionally SCM, water, fine aggregate, and the calcium compound. In some embodiments, the grout mixture comprises a cementitious mixture described herein.

In one aspect, the disclosure provides a mortar mixture prepared by any one of the methods described herein. In some embodiments, the mortar mixture comprises a cementitious mixture described herein, water, fine aggregate, and the calcium compound. In some embodiments, the mortar mixture comprises a cementitious mixture described herein.

In one aspect, the disclosure provides a concrete prepared by any one of the methods described herein. In some embodiments, the concrete comprises OPC, and optionally comprises SCM, water, fine aggregate, coarse aggregate, and the calcium compound. In some embodiments, the concrete comprises a cementitious mixture described herein.

In one aspect, the disclosure provides a concrete mixture prepared by any one of the methods described herein. In some embodiments, the concrete mixture comprises OPC, and optionally comprises SCM, water, fine aggregate, coarse aggregate, and the calcium compound. In some embodiments, the concrete mixture comprises a cementitious mixture described herein. In some embodiments, the concrete comprises a cementitious mixture.

In one aspect, the disclosure provides a concrete prepared by any one of the methods described herein. In some embodiments, the concrete mixture comprises a cementitious mixture described herein. In some embodiments, the concrete comprises OPC, and optionally comprises SCM, water, fine aggregate, coarse aggregate, and the calcium compound. In some embodiments, the concrete comprises a cementitious mixture comprising a calcium compound, ordinary Portland cement (OPC), optionally supplementary cementitious material (SCM), fine aggregates, coarse aggregates, and water, optionally wherein the fine aggregates comprises one or more of one or more of sand, crushed stone, silt, stone dust, and clay, wherein the dosage of the calcium compound is about 3.1% to about 35% of the total binder content of the cementitious mixture. In some embodiments, the concrete comprises a reinforcement. In some embodiments, the dosage of the calcium compound is about 6.5% to about 15% of the total binder content of the cementitious mixture. In some embodiments, the dosage of the calcium compound is about 8% to about 12% of the total binder content of the cementitious mixture. In some embodiments, the concrete further comprises supplementary cementitious material (SCM), optionally wherein the SCM comprises one or more materials selected from fly ash, ground granulated blast-furnace slag, metakaolin, microsilica, natural pozzolana, rice husks, palm oil ash (POA), and glass powder (GP). In some embodiments, the SCM comprises fly ash.

In one aspect, the disclosure provides a concrete comprising a cementitious mixture comprising a calcium compound, ordinary Portland cement (OPC), optionally supplementary cementitious material (SCM), fine aggregates, coarse aggregates, and water, optionally wherein the fine aggregates comprises one or more of one or more of sand, crushed stone, silt, stone dust, and clay, wherein the dosage of the calcium compound is about 3.1% to about 35% of the total binder content of the cementitious mixture, optionally comprising a reinforcement.

In some embodiments, the method further comprises adding one or more workability enhancing and or workability retarding chemical admixtures to a cementitious mixture. In some embodiments, the workability enhancer admixtures comprise plasticisers, superplasticizers, and hyperplasticizers. In some embodiments, the workability retarding admixtures comprise plasticizers-retarders. In some embodiments, the chemical admixtures can be added in the dry form or in the form of a solution. These admixtures help to reduce the water demand of the mixture and extend the workability. Non-limiting examples of plasticizers include hydrocarbon oils (e.g. paraffin, aromatic and naphthenic oils), long chain alkyl diesters (e.g. phthalic acid esters, such as dioctyl phthalate, and adipic acid esters, such as dioctyl adipate), sebacic acid esters, glycol, fatty acid, phosphoric and stearic esters, epoxy plasticizers (e.g. epoxidized soybean oil), polyether and polyester plasticizers, alkyl monoesters (e.g. butyl oleate), long chain partial ether esters (e.g. butyl cellosolve oleate). In some embodiments, the plasticizer is a superplasticizer. Non-limiting examples of superplasticizers include polynapthalene sulfonates, polyacrylates, polycarboxylates, lignosulfonates, melamine sulfonates, and the like. In some embodiments, the cementitious mixture is a concrete mixture. In some embodiments, the concrete comprises a cementitious mixture.

In some embodiments, the cementitious mixture comprises about 1 $kg/m^3$ to about 25 $kg/m^3$ plasticizer. In some embodiments, the cementitious mixture comprises about 2 $kg/m^3$ to about 15 $kg/m^3$ plasticizer. In some embodiments, the cementitious mixture comprises about 4 $kg/m^3$ to about 5 $kg/m^3$ plasticizer. In some embodiments, the cementitious mixture comprises about 5 $kg/m^3$ to about 15 $kg/m^3$ plasticizers. In some embodiments, the cementitious mixture comprises about 5 $kg/m^3$ to about 10 $kg/m^3$ plasticizer. In some embodiments, the cementitious mixture comprises about 10 $kg/m^3$ to about 15 $kg/m^3$ plasticizer. In some embodiments, the cementitious mixture comprises about 15 $kg/m^3$ to about 20 $kg/m^3$ plasticizer. In some embodiments, the cementitious mixture is a concrete mixture.

In some embodiments, the concrete and/or concrete mixture of the disclosure comprises one or more plasticizers. In some embodiments, the plasticizer is present in an amount from about 1 $kg/m^3$ to about 25 $kg/m^3$. In some embodiments, the plasticizer is present in an amount from about 2 $kg/m^3$ to about 15 $kg/m^3$. In some embodiments, the plasticizer is present in an amount from about 4 $kg/m^3$ to about 5 $kg/m^3$. In some embodiments, the plasticizer is present in an amount from about 5 $kg/m^3$ to about 15 $kg/m^3$. In some embodiments, the plasticizer is present in an amount from about 5 $kg/m^3$ to about 10 $kg/m^3$. In some embodiments, the plasticizer is present in an amount from about 10 $kg/m^3$ to about 15 $kg/m^3$. In some embodiments, the plasticizer is present in an amount from about 15 $kg/m^3$ to about 20 $kg/m^3$.

In some embodiments, the method further comprises adding one or more retarders to the cementitious mixture. Retarders can be used to slow the rate of setting of concrete. Non-limiting examples of retarders include boric acid, borax, citric acid, potassium tartrate, sodium tartrate and the like, and any retarding agent identified in ASTM C494 and EN 934. In some embodiments, the cementitious mixture is a concrete mixture. In some embodiments, the concrete comprises a cementitious mixture.

In some embodiments, the concrete and/or concrete mixture comprises about 1 $kg/m^3$ to about 10 $kg/m^3$ retarders. In some embodiments, the concrete and/or concrete mixture comprises about 2 $kg/m^3$ to about 8 $kg/m^3$ retarders. In some embodiments, the concrete and/or concrete mixture comprises about 3 $kg/m^3$ to about 4 $kg/m^3$ retarders.

In some embodiments, the retarders are present in an amount from about 1 $kg/m^3$ to about 10 $kg/m^3$. In some embodiments, the retarders are present in an amount from about 2 $kg/m^3$ to about 8 $kg/m^3$. In some embodiments, the retarders are present in an amount from about 3 $kg/m^3$ to about 4 $kg/m^3$.

Other admixtures also may be added to the compositions concrete and/or concrete mixture as desired for a particular application. Examples of such admixtures include, but are not limited to, admixtures identified in ASTM C494 and EN 934. A person having ordinary skill in the art, with the benefit of this disclosure, will readily be able to determine the type and amount of admixtures useful for a particular application and desired result.

In some embodiments, the cementitious mixture comprises:

a) a total binder content of about 60 wt % to about 70 wt % OPC and about 25 wt % to about 30 wt % SCM; and b) calcium compound, wherein the dosage of the calcium compound is about 5 wt % to about 15 wt % of the total binder content of the cementitious mixture. In some embodiments, the calcium compound has a particle size from about 0.5 mm to about 1.5 mm. In some embodiments, the calcium compound has a particle size from about 1.5 mm to about 2.5 mm. In some embodiments, the calcium compound has a particle size from about 2.5 mm to about 3.5 mm.

In some embodiments, the concrete and/or concrete mixture for building materials comprises, consists essentially of, and/or consists of:

c) about 270 kg/$m^3$ to about 290 kg/$m^3$ OPC;

d) and about 110 kg/$m^3$ to about 130 kg/$m^3$ SCM;

e) about 15 kg/$m^3$ to about 25 kg/$m^3$ calcium compound, wherein the calcium compound has a particle size from about 0.5 mm to about 1.5 mm;

f) about 170 kg/$m^3$ to about 190 kg/$m^3$ water;

g) about 15 kg/$m^3$ to about 25 kg/$m^3$ plasticizer; and h) about 1700 kg/$m^3$ to about 1750 kg/$m^3$ fine aggregate.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 55 kg/$m^3$ to about 65 kg/$m^3$ calcium compound, wherein the calcium compound has a particle size from about 0.5 mm to about 1.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 15 kg/$m^3$ to about 25 kg/$m^3$ calcium compound, wherein the calcium compound has a particle size from about 1.5 mm to about 2.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 35 kg/$m^3$ to about 45 kg/$m^3$ calcium compound, wherein the calcium compound has a particle size from about 1.5 mm to about 2.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete and/or concrete mixture for building materials comprises, consists essentially of, and/or consists of:

g) about 270 kg/$m^3$ to about 290 kg/$m^3$ OPC;

h) and about 110 kg/$m^3$ to about 130 kg/$m^3$ SCM;

i) about 55 kg/$m^3$ to about 65 kg/$m^3$ calcium compound, wherein the calcium compound has a particle size from about 1.5 mm to about 2.5 mm;

j) about 170 kg/$m^3$ to about 190 kg/$m^3$ water;

k) about 15 kg/$m^3$ to about 25 kg/$m^3$ plasticizer; and

I) about 1700 kg/$m^3$ to about 1750 kg/$m^3$ fine aggregate.

In some embodiments, the concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 15 kg/$m^3$ to about 25 kg/$m^3$ calcium compound, wherein the calcium compound has a particle size from about 2.5 mm to about 3.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete mixture for building materials comprises:

a) about 270 kg/$m^3$ to about 290 kg/$m^3$ OPC;

b) and about 110 kg/$m^3$ to about 130 kg/$m^3$ SCM;

c) about 35 kg/$m^3$ to about 45 kg/$m^3$ calcium compound, wherein the calcium compound has a particle size from about 2.5 mm to about 3.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 55 kg/$m^3$ to about 65 kg/$m^3$ calcium compound, wherein the calcium compound has a particle size from about 2.5 mm to about 3.5 mm;

d) about 170 kg/$m^3$ to about 190 kg/$m^3$ water;

e) about 15 kg/$m^3$ to about 25 kg/$m^3$ plasticizer; and f) about 1700 kg/$m^3$ to about 1750 kg/$m^3$ fine aggregate.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 15 kg/$m^3$ to about 45 kg/$m^3$ calcium compound, wherein the calcium compound has a particle size from about 0.5 mm to about 1.5 mm;

d) about 170 kg/$m^3$ to about 190 kg/$m^3$ water;

e) about 4 kg/$m^3$ to about 5 kg/$m^3$ plasticizer; and f) about 750 kg/$m^3$ to about 800 kg/$m^3$ fine aggregate;

g) about 100 kg/$m^3$ to about 200 kg/$m^3$ of coarse aggregate comprising particles between about 4 mm to about 8 mm in diameter;

h) about 700 kg/$m^3$ to about 800 kg/$m^3$ of coarse aggregate comprising particles between about 8 mm to about 16 mm in diameter; and i) optionally further comprising about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;

b) and about 110 kg/$m^3$ to about 130 kg/$m^3$ SCM;

c) about 15 kg/$m^3$ to about 25 kg/$m^3$ calcium compound, wherein the calcium compound has a particle size from about 1.5 mm to about 2.5 mm;

d) about 170 kg/$m^3$ to about 190 kg/$m^3$ water;

e) about 4 kg/$m^3$ to about 5 kg/$m^3$ plasticizer;

f) about 750 kg/$m^3$ to about 800 kg/$m^3$ fine aggregate;

g) about 100 kg/$m^3$ to about 200 kg/$m^3$ of coarse aggregate comprising particles between about 4 mm to about 8 mm in diameter; and h) about 700 kg/$m^3$ to about 800 kg/$m^3$ of coarse aggregate comprising particles between about 8 mm to about 16 mm in diameter.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein the calcium compound has a particle size from about 2.5 mm to about 3.5 mm;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter; and
h) about 700 kg/$m^3$ to about 800 kg/$m^3$ of coarse aggregate comprising particles between about 8 mm to about 16 mm in diameter; and
i) about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein the calcium compound has a particle size from about 0.5 mm to about 1.5 mm; optionally wherein the calcium compound comprises greater than about 95% calcium oxide;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter;
h) about 700 kg/$m^3$ to about 800 kg/$m^3$ of coarse aggregate comprising particles between about 8 mm to about 16 mm in diameter; and
i) about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein the calcium compound has a particle size from about 2.5 mm to about 3.5 mm; optionally wherein the calcium compound comprises greater than about 95% calcium oxide;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter;
h) about 700 kg/$m^3$ to about 800 kg/$m^3$ of coarse aggregate comprising particles between about 8 mm to about 16 mm in diameter; and
i) about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein the calcium compound comprises greater than about 95% calcium oxide and is mixed with an excess of water to form a slurry;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter;
h) about 700 kg/$m^3$ to about 800 kg/$m^3$ of coarse aggregate comprising particles between about 8 mm to about 16 mm in diameter; and
i) about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein the calcium compound has a particle size from about 1 mm to about 3 mm; and wherein the calcium compound comprises calcium oxide and magnesium oxide in an amount greater than about 85 wt % of the total weight of calcium compound;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter;
h) about 700 kg/$m^3$ to about 800 kg/$m^3$ of coarse aggregate comprising particles between about 8 mm to about 16 mm in diameter; and
i) about 3 kg/$m^3$ to about 4 kg/$m^3$ retarder.

In some embodiments, the concrete and/or concrete mixture for building materials comprises, consists essentially of, and/or consists of:

a) about 270 kg/$m^3$ to about 290 kg/$m^3$ OPC;
b) about 110 kg/$m^3$ to about 130 kg/$m^3$ SCM;
c) about 35 kg/$m^3$ to about 45 kg/$m^3$ calcium compound, wherein about 94% of the calcium compound has a particle size less than about 0.2 mm; optionally wherein the calcium compound comprises greater than about 90% calcium hydroxide;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;
g) about 100 kg/$m^3$ to about 200 kg/$m^3$ of coarse aggregate comprising particles between about 4 mm to about 8 mm in diameter; and
h) about 700 kg/$m^3$ to about 800 kg/$m^3$ of coarse aggregate comprising particles between about 8 mm to about 16 mm in diameter.

In some embodiments, the concrete and/or concrete mixture for building materials comprises, consists essentially of, and/or consists of:

a) about 270 kg/$m^3$ to about 290 kg/$m^3$ OPC;
b) and about 110 kg/$m^3$ to about 130 kg/$m^3$ SCM;
c) about 35 kg/$m^3$ to about 45 kg/$m^3$ calcium compound, wherein greater than about 99% of the calcium compound has a particle size less than about 0.2 mm; optionally wherein the calcium compound comprises greater than about 90% calcium hydroxide;
d) about 170 kg/$m^3$ to about 190 kg/$m^3$ water;
e) about 4 kg/$m^3$ to about 5 kg/$m^3$ plasticizer;
f) about 750 kg/$m^3$ to about 800 kg/$m^3$ fine aggregate;

g) about 100 $kg/m^3$ to about 200 $kg/m^3$ of coarse aggregate comprising particles between about 4 mm to about 8 mm in diameter; and h) about 700 $kg/m^3$ to about 800 $kg/m^3$ of coarse aggregate comprising particles between about 8 mm to about 16 mm in diameter.

In some embodiments, the concrete and/or concrete mixture for building materials comprises, consists essentially of, and/or consists of:

a) about 270 $kg/m^3$ to about 290 $kg/m^3$ OPC;

b) about 110 $kg/m^3$ to about 130 $kg/m^3$ SCM;

c) about 35 $kg/m^3$ to about 45 $kg/m^3$ calcium compound, wherein greater than about 93% to about 94% of the calcium compound has a particle size less than about 0.2 mm, and about 14% to about 15% of the calcium compound has a particle size less than about 0.063 mm; optionally wherein the calcium compound comprises greater than or equal to about 95% calcium hydroxide;

d) about 170 $kg/m^3$ to about 190 $kg/m^3$ water;

e) about 4 $kg/m^3$ to about 5 $kg/m^3$ plasticizer;

f) about 750 $kg/m^3$ to about 800 $kg/m^3$ fine aggregate;

g) about 100 $kg/m^3$ to about 200 $kg/m^3$ of coarse aggregate comprising particles between about 4 mm to about 8 mm in diameter; and h) about 700 $kg/m^3$ to about 800 $kg/m^3$ of coarse aggregate comprising particles between about 8 mm to about 16 mm in diameter.

In some embodiments, the cementitious mixture for building materials comprises, consists essentially of, and/or consists of:

a) about 470 $kg/m^3$ to about 490 $kg/m^3$ OPC;

b) about 80 $kg/m^3$ to about 90 $kg/m^3$ SCM;

c) about 140 $kg/m^3$ to about 160 $kg/m^3$ calcium compound, wherein the calcium compound has a particle size from about 2.5 mm to about 3.5 mm; optionally wherein the calcium compound comprises greater than about 95% calcium oxide;

d) about 350 $kg/m^3$ to about 370 $kg/m^3$ water; and e) about 1000 $kg/m^3$ to about 1100 $kg/m^3$ fine aggregate.

In some embodiments, the cementitious mixture for building materials comprises, consists essentially of, and/or consists of a mixture of Table 1. In some embodiments, the cementitious mixture for building materials comprises, consists essentially of, and/or consists of a mixture of Table 2. In some embodiments, the cementitious mixture for building materials comprises, consists essentially of, and/or consists of a mixture of Table 8. In some embodiments, the cementitious mixture for building materials comprises, consists essentially of, and/or consists of a mixture of Table 10. In some embodiments, the cementitious mixture for building materials comprises, consists essentially of, and/or consists of a mixture of Table 13. In some embodiments, the cementitious mixture for building materials comprises, consists essentially of, and/or consists of a mixture of Table 15.

In one aspect, the disclosure includes ceramic materials prepared by the methods described herein. Any ceramic material is contemplated by the present disclosure, as would be understood by one of ordinary skill in the art. Non-limiting examples of ceramic materials include cement paste, grout, mortar, and concrete. As used herein, the term "grout" refers to a mixture comprising water, OPC, and optionally SCM. As used herein, the term "mortar" refers to a mixture comprising fine aggregate (e.g. sand), and grout. In some embodiments, the mortar comprises fine aggregates less than 5 mm in diameter. As used herein, the term "concrete" refers to a mixture comprising course aggregate (e.g. gravel), fine aggregate (e.g. sand), and grout.

In one aspect, the disclosure includes cement prepared by the methods described herein. In some embodiments, In one aspect, the disclosure includes compositions prepared by the methods described herein. In some embodiments, the composition and/or the ceramic material has one or more of the following properties: self-healing, waterproof, shrinkage compensation; waterproof, anti-corrosion, workability, workability retention, and enhanced compressive strength. In some embodiments, the self-healing, waterproof, shrinkage compensation; waterproof, anti-corrosion properties do not have detrimental impact on workability, workability retention, and compressive strength. In some embodiments, the disclosure provides a building material comprising a composition and/or a ceramic material prepared by any one of the methods described herein. In some embodiments, the building material is reinforced concrete. In some embodiments, the building material comprises Opus signinum (Cocciopesto). In some embodiments, the disclosure provides a cement prepared by any one of the methods described herein. In some embodiments, the disclosure provides a grout prepared by any one of the methods described herein. In some embodiments, the disclosure provides a mortar prepared by any one of the methods described herein. In some embodiments, the disclosure provides a concrete admixture prepared by any one of the methods described herein. In some embodiments, the disclosure provides a concrete addition prepared by any one of the methods described herein. In some embodiments, the disclosure provides a cement addition prepared by any one of the methods described herein.

In another aspect, the disclosure provides a blended cement prepared by the methods described herein. In some embodiments, the blended cement comprises a calcium compound, ordinary Portland cement (OPC), and supplementary cementitious material (SCM). In some embodiments, the dosage of the calcium compound is about 3.1% to about 35% of the total binder content of the cementitious mixture In some embodiments, the composition and/or the ceramic material has a peak temperature between about 70 °C, to about 75 °C. In some embodiments, the composition and/or the ceramic material has a peak temperature less than about 90 °C, about 85 °C, about 80 °C, about 75 °C, about 70 °C, about 65 °C, or about 60 °C.

In some embodiments, the maximum amount of calcium compound, such as CaO, used is determined based on the total volume of concrete. For example, at a fixed binder content, a small volume of concrete can contain more CaO than a large volume of concrete (i.e. mass concrete) because in mass concrete, the basal (i.e. no CaO present) heat of hydration is higher than in a small volume of concrete.

As used herein, self-healing refers to any process by the material itself involving the recovery and hence improvement of a performance after an earlier action that had reduced the performance of the material. In some embodiments, self-healing can be divided into two categories:

a) Autogenic self-healing: when concrete can undergo self-healing with compounds that are either present in the matrix or they are added in the system to enhance self-healing abilities.

b) Autonomic self-healing: when concrete is specifically engineered with external compounds that alter the chemistry of the matrix to produce the self-healing effect.

In some embodiments, the compositions and/or the ceramic materials of the disclosure are autogenic self-healing compositions. In some embodiments, the compositions and/or the ceramic materials of the disclosure are autonomic self-healing compositions. In some embodiments, the cementitious compounds contained in the concrete can induce some degree of natural self-healing. As would be understood by one of ordinary skill in the art, at relatively low water pressure gradients and up to 10% relative movement of the crack, any crack width between about 0.20 mm and about 0.25 mm can naturally self-heal, while for relative movement between about 10% and about 20%, the crack width for natural self-healing is between about 0.15 mm and about 0.20 mm.

In some embodiments, the compositions and/or the ceramic materials of the disclosure can self-heal cracks with a dimension of at least 1.0 mm, 0.9 mm, 0.8 mm, 0.7 mm, 0.6 mm, 0.5 mm, 0.4 mm, 0.3 mm, 0.2 mm, or 0.1 mm. In some embodiments, the compositions and/or the ceramic materials of the disclosure can self-heal cracks with a dimension ranging from about 0.5 mm to about 0.1 mm. As would be understood by one of ordinary skill in the art, the dimension of the crack can be determined using any method known in the art, including any optical method known in the art. For example, the dimension of the crack is the maximum crack width or the average crack width.

The objective of self-healing can be dual:

a) Restore water tightness;

b) Restore (or enhance) durability against aggressive fluids.

Restoring water tightness implies a complete sealing of the cracks, while restoring durability against aggressive fluids (carbon dioxide and chloride) requires restoring the threshold crack width where no transport phenomena occur. The threshold width believed to virtually prevent transport mechanisms into the concrete cover in reinforced concrete is 0.15 mm.

Three components are believed to contribute to self-healing, namely:

a) Precipitation of newly formed crystals (chemical process);

b) Expansion (physical process);

c) Blocking.

In laboratory conditions where clean tap water is used, blocking is unlikely. Hence the evaluation of self-healing properties shall consider:

a) Effective decrease of flow with time;

b) Formation of crystals.

Only when the flow of water in a crack decreases with time to within 0.0+1.0 litres/hour the self-healing is considered accomplished under the boundary conditions of the test.

In some embodiments, if visual observation under the microscope provides evidence for extensive crystal formation on the crack's wall, the self-healing is rated as "chemically dominated". In some embodiments, if crystal formation is not dominant, the self-healing is rated as "chemically and physically dominated".

In some embodiments, the compositions and/or the ceramic materials of the disclosure exhibit a flow less than about 2.0 L/h, about 1.9 L/h, about 1.8 L/h, about 1.7 L/h, about 1.6 L/h, about 1.5 L/h, about 1.4 L/h, about 1.3 L/h, about 1.2 L/h, about 1.1 L/h, about 1.0 L/h, about 0.9 L/h, about 0.8 L/h, about 0.7 L/h, about 0.6 L/h, about 0.5 L/h, about 0.4 L/h, about 0.3 L/h, about 0.2 L/h, or about 0.1 L/h. In some embodiments, the compositions and/or the ceramic materials of the disclosure exhibit a flow between about 0.0 L/h and about 1.0 L/h.

In some embodiments, the compositions and/or the ceramic materials of the disclosure exhibit chemically dominated self-healing properties. In a non-limiting embodiment, chemically-dominated self-healing includes crystals comprising more than about 99%, about 98%, about 97%, about 96%, about 95%, about 94%, about 93%, about 92%, about 91%, about 90%, about 85%, about 80%, about 75%, or about 70% of net paste's surface on the crack's wall (i.e. the total surface of the crack's wall minus the area occupied by aggregates).

In some embodiments, the compositions and/or the ceramic materials of the disclosure exhibit chemically dominated self-healing properties and physical dominated self-healing properties. In a non-limiting embodiment, chemically-dominated self-healing and physically-dominated self-healing properties include crystals between about 50% and about 70%, between about 50% and about 55%, between about 55% and about 60%, between about 60% and about 65%, or between about 65% and about 70% of net paste's surface on the crack's wall.

In some embodiments, the compositions and/or the ceramic materials of the disclosure exhibit physically dominated self-healing properties. In a non-limiting embodiment, physically-dominated self-healing includes crystals comprising less than about 50%, about 49%, about 48%, about 47%, about 46%, about 45%, about 44%, about 43%, about 42%, about 41%, about 40%, about 35%, about 30%, or about 25% of net paste's surface on the crack's wall (i.e. the total surface of the crack's wall minus the area occupied by aggregates).

In some embodiments, the compositions and/or the ceramic materials prepared by the methods described herein are for underwater use. In some embodiments, the compositions and/or the ceramic materials prepared by the methods described herein are for surface use. In some embodiments, the compositions and/or the ceramic materials prepared by the methods described herein are for subterranean use. In some embodiments, the compositions and/or the ceramic materials prepared by the methods described herein are for construction use.

Other admixtures suitable for use in the methods described herein also may be added to certain embodiments of the cementitious mixtures, including concrete and/or concrete mixtures. Non-limiting examples of such admixtures include admixtures identified in ASTM C494 and EN 934. A person having ordinary skill in the art, with the benefit of this disclosure, will readily be able to determine the type and amount of admixture useful for a particular application and desired result.

In one aspect, the disclosure provides cementitious mixtures useful in the methods of the disclosure. In some embodiments, the cementitious mixture comprises water. OPC, and optionally SCM. In some embodiments, the cementitious mixture comprises a calcium compound, water, OPC, and optionally SCM. In some embodiments, the dosage of the calcium compound is about 3.1% to about 35% of the total binder content of the cementitious mixture. In some embodiments, the total binder content comprises about 20 wt % to about 100 wt % OPC and about 0 wt % to about 80 wt % SCM. In some embodiments, the cementitious mixture comprises water, about 20 kg/m$^3$ to about 100 kg/m$^3$ calcium compound, and has a total binder content comprising about 50 kg/m$^3$ to about 400 kg/m$^3$ OPC and about 0 kg/m$^3$ to about 400 kg/m$^3$ SCM. In some embodiments, the cementitious mixture comprises water, about 50 kg/m$^3$ to about 400 kg/m$^3$ OPC, about 0 kg/m$^3$ to about 400 kg/m$^3$ SCM, and about 20 kg/m$^3$ to about 100 kg/m$^3$ calcium compound. In some embodiments the cementicious mixture comprises fine aggregates, and optionally comprises coarse aggregates. In some embodiments the cementicious mixture comprises fine aggregates and coarse aggregates.

In one aspect, the disclosure provides an admixture for one or more of concrete, mortar, and grout, wherein the admixture comprises a calcium compound of a desired particle size or range of particle sizes. In some embodiments, the admixture confers one or more of the following properties when used in a cementitious mixture according to the dosage of the calcium compound: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In one aspect, the disclosure provides an admixture for one or more of concrete, mortar, and grout, wherein the admixture comprises a calcium compound of a desired particle size or range of particle sizes and wherein the admixture is required to be slaked prior to preparing concrete, mortar, and/or grout. In some embodiments, the admixture confers one or more of the following properties when used in a cementitious mixture according to the dosage of the calcium compound: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments. In some embodiments, the particle size is from about 6.35 mm to about 63 mm, and from about 63 mm to about 204 mm and is slaked prior to preparing concrete, mortar, and/or grout.

In one aspect, the disclosure provides an admixture for one or more of concrete, mortar, and grout, wherein the admixture comprises SCM and a calcium compound of a desired particle size or range of particle sizes. In some embodiments, the admixture confers one or more of the following properties when used in a cementitious mixture according to the dosage of the calcium compound: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm. In some embodiments, the SCM comprises fly ash.

In one aspect, the disclosure provides an admixture for concrete, wherein the admixture comprises a calcium compound of a desired particle size or range of particle sizes and is produced in accordance with ASTM C494 type S. As would be understood by one of ordinary skill in the art "ASTM C494 type S" refers to specific performance admixtures as described in ASTM C494. In some embodiments, the admixture confers one or more of the following properties without detrimental effect as described in ASTM C494 when used in a cementitious mixture: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In one aspect, the disclosure provides an admixture for one or more of concrete, mortar, and grout, wherein the admixture comprises a calcium compound of a desired particle size or range of particle sizes and is produced in accordance with EN 934. In some embodiments, the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In one aspect, the disclosure provides an admixture for one or more of concrete, mortar, and grout, wherein the admixture comprises a calcium compound of a desired particle size or range of particle sizes and is produced in accordance with EN 934 or to a European Technical Assessments under a Regulation (EU) No 305/2011. As would be understood by one of ordinary skill in the art, "Regulation (EU) No 305/2011" refers to a regulation of 9 Mar. 2011 with EEA relevance that lays down harmonised conditions for the marketing of construction products and replaces Construction Products Directive (89/106/EEC). In some embodiments, the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm.

In one aspect, the disclosure provides an addition for concrete, wherein the addition is defined by EN 206 and comprises SCM and a calcium compound of a desired particle size or range of particle sizes and is produced in accordance with EN 450 or to a European Technical Assessments under a Regulation (EU) No 305/2011. In some embodiments, the addition confers one or more of the following properties without detrimental effect as described in EN 450 when used in a cementitious mixture: self-healing, waterproof, shrinkage compensation: waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm. In some embodiments, the SCM comprises fly ash.

In one aspect, the disclosure provides an addition for concrete, wherein the addition comprises SCM and a calcium compound of a desired particle size or range of particle sizes and is produced in accordance with EN 450 or to a European Technical Assessments under a Regulation (EU) No 305/2011. In some embodiments, the addition confers one or more of the following properties without detrimental effect as described in EN 450 when used in a cementitious mixture: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm. In some embodiments, the SCM comprises fly ash.

In one aspect, the disclosure provides an addition for concrete, wherein the addition comprises SCM and a calcium compound of a desired particle size or range of particle sizes and is produced in accordance with ASTM C618. In some embodiments, the addition confers one or more of the following properties without detrimental effect as described in ASTM C618 when used in a cementitious mixture: self-healing, waterproof, shrinkage compensation; waterproof, anti-corrosion, workability, workability retention, and enhanced compressive strength. In some embodiments, the calcium compound comprises calcium oxide and calcium hydroxide. In some embodiments, the calcium compound comprises, consists of, or consists essentially of calcium oxide. In some embodiments, the particle size is greater than about 0 to about 0.2 mm, greater than about 0 mm to about 0.75 mm, about 0.002 mm to about 0.75 mm, about 0.075 mm to about 0.5 mm, 0.075 mm to about 1.5 mm, about 0.5 mm to about 1.5 mm, about 1.5 mm to about 2.5 mm, about 2.5 mm to about 4 mm, about 2.5 mm to about 10 mm, or greater than about 4 mm to about 10 mm. In some embodiments, the SCM comprises fly ash.

As will be appreciated by those of ordinary skill in the art, certain embodiments of the cementitious mixtures, including grout, mortar, concrete, and concrete mixtures of the present disclosure may be used in a variety of applications, including primary and remedial cementing, surface applications, subterranean applications, underwater applications, building materials, construction activity, and the like. Certain embodiments of the cementitious mixtures may be introduced into formations, such as subterranean formations, surface formations, and underwater formations, and allowed to set therein. Certain embodiments of the cementitious mixtures may comprise nano-hydraulic cement, hydraulic cement, and water. By way of example, in certain primary cementing embodiments, a cementitious mixture may be introduced into a space between a formation and a structure, such as a pipe string, located in the formation. The cementitious mixture may be allowed to set to form a hardened mass in the space between the formation and the structure. In addition, in certain remedial cementing embodiments, cementitious mixture may be used, for example, in squeeze-cementing operations or in the placement of cement plugs.

In some embodiments, introducing the cementitious mixture into a desired location, such as a surface, a structure, a subterranean formation, an underwater formation, and the like, includes introduction into any portion of the location. In some embodiments, the cementitious mixture is allowed to set to form a hardened ceramic material. In some embodiments, the cementitious mixture is allowed to set to form a hardened concrete. In some embodiments, the cementitious mixture is allowed to set to form a hardened mortar. In some embodiments, the cementitious mixture is allowed to set to form a hardened grout. In some embodiments, the cementitious mixture is allowed to set to form a hardened cement paste. In some embodiments, the cementitious mixture is used to form a barrier that prevents the migration of fluids into adjacent locations. By way of example, the cementitious mixture may be used to plug an opening (e.g., a void or crack) in the formation or other structure.

In one aspect, the disclosure provides a building material comprising one or more of a calcium compound and supplementary cementious material (SCM), and optionally comprising an admixture. In some embodiments, the calcium compound is mixed with the SCM, and about 1 wt % to about 99 wt %, about 1 wt % to about 50 wt %, about 1 wt % to about 40 wt %, about 1 wt % to about 30 wt %, about 1 wt % to about 10 wt %, about 1 wt % to about 5 wt %, about 3 wt % to about 4 wt %, about 4 wt % to about 10 wt %, or about 10 wt % to about 30 wt %, of the total weight of the SCM is replaced with the calcium compound. In some embodiments, the calcium compound is mixed with the admixture, and about 1 wt % to about 99 wt %, about 1 wt % to about 50 wt %, about 1 wt % to about 40 wt %, about 1 wt % to about 30 wt %, about 1 wt % to about 10 wt %, about 1 wt % to about 5 wt %, about 3 wt % to about 4 wt %, about 4 wt % to about 10 wt %, or about 10 wt % to about 30 wt %, of the total weight of the admixture is replaced with the calcium compound. In some embodiments, the SCM comprises one or more selected from fly ash, ground granulated blast-furnace slag, metakaolin, microsilica, natural pozzolana, rice husks, palm oil ash (POA), and glass powder (GP). In some embodiments, the admixture comprises one or more admixture identified in ASTM C494 and EN 934.

Having described the disclosure in detail, it will be apparent that modifications, variations, and equivalent embodiments are possible without departing from the scope of the disclosure defined in the appended claims. Further-more, it should be appreciated that all examples in the present disclosure are provided as non-limiting examples.

The following clauses describe certain embodiments.

Clause 1a. A method of making a cementitious mixture for building materials comprising:

(a) obtaining a cementitious mixture comprising a calcium compound and ordinary Portland cement (OPC) and optionally supplementary cementitious material (SCM), wherein the dosage of the calcium compound is about 3.1% to about 35% of the total binder content of the cementitious mixture; and (b) adding water to the cementitious mixture.

Clause 1b. A method of making a cementitious mixture for building materials comprising:

(a) obtaining a cementitious mixture comprising a calcium compound and ordinary Portland cement (OPC) and optionally supplementary cementitious material (SCM), wherein the dosage of the calcium compound is about 6.5% to about 15% of the total binder content of the cementitious mixture; and (b) adding water to the cementitious mixture.

Clause 1c. A method of making a concrete mixture for building materials comprising:

(a) obtaining a cementitious mixture comprising a calcium compound, ordinary Portland cement (OPC), fine aggregates, and coarse aggregates, and optionally supplementary cementitious material (SCM), wherein the dosage of the calcium compound is about 3.1% to about 35% of the total binder content of the cementitious mixture; and (b) adding water to the cementitious mixture.

Clause 1d. A method of making a cementitious mixture for building materials comprising:

(a) obtaining a cementitious mixture comprising a calcium compound, ordinary Portland cement (OPC), fine aggregates, and coarse aggregates, and optionally supplementary cementitious material (SCM), wherein the dosage of the calcium compound is about 6.5% to about 15% of the total binder content of the cementitious mixture; and (b) adding water to the cementitious mixture.

Clause 2a. A method of making a cementitious mixture for building materials comprising obtaining a cementitious mixture comprising a calcium compound and ordinary Portland cement (OPC) and optionally supplementary cementitious material (SCM), wherein the dosage of the calcium compound is about 3.1% to about 35% of the total binder content of the cementitious mixture.

Clause 2b. A method of making a cementitious mixture for building materials comprising obtaining a cementitious mixture comprising a calcium compound and ordinary Portland cement (OPC) and optionally supplementary cementitious material (SCM), wherein the dosage of the calcium compound is about 6.5% to about 15% of the total binder content of the cementitious mixture.

Clause 2c. A method of making a cementitious mixture for building materials comprising obtaining a cementitious mixture comprising a calcium compound and ordinary Portland cement (OPC) and optionally supplementary cementitious material (SCM), and mixing the cementitious mixture, wherein the dosage of the calcium compound is about 3.1% to about 35% of the total binder content of the cementitious mixture.

Clause 2d. A method of making a cementitious mixture for building materials comprising obtaining a cementitious mixture comprising a calcium compound and ordinary Portland cement (OPC) and optionally supplementary cementitious material (SCM), and mixing the cementitious mixture, wherein the dosage of the calcium compound is about 6.5% to about 15% of the total binder content of the cementitious mixture.

Clause 2e. A method of making a concrete mixture for building materials comprising obtaining a cementitious mixture comprising a calcium compound, ordinary Portland cement (OPC), fine aggregates, and coarse aggregates, and optionally supplementary cementitious material (SCM), wherein the dosage of the calcium compound is about 3.1% to about 35% of the total binder content of the cementitious mixture.

Clause 2f. A method of making a concrete mixture for building materials comprising obtaining a cementitious mixture comprising a calcium compound, ordinary Portland cement (OPC), fine aggregates, and coarse aggregates, and optionally supplementary cementitious material (SCM), wherein the dosage of the calcium compound is about 6.5% to about 15% of the total binder content of the cementitious mixture.

Clause 2g. A method of making a concrete mixture for building materials comprising obtaining a cementitious mixture comprising a calcium compound, ordinary Portland cement (OPC), fine aggregates, and coarse aggregates, and optionally supplementary cementitious material (SCM), and mixing the cementitious mixture, wherein the dosage of the calcium compound is about 3.1% to about 35% of the total binder content of the cementitious mixture.

Clause 2h. A method of making a concrete mixture for building materials comprising obtaining a cementitious mixture comprising a calcium compound, ordinary Portland cement (OPC), fine aggregates, and coarse aggregates, and optionally supplementary cementitious material (SCM), and mixing the cementitious mixture, wherein the dosage of the calcium compound is about 6.5% to about 15% of the total binder content of the cementitious mixture.

Clause 3a. A method of making a blended cement for building materials comprising obtaining a cementitious mixture comprising a calcium compound, ordinary Portland cement (OPC), and supplementary cementitious material (SCM), wherein the dosage of the calcium compound is about 3.1% to about 35% of the total binder content of the cementitious mixture.

Clause 3b. A method of making a blended cement for building materials comprising obtaining a cementitious mixture comprising a calcium compound, ordinary Portland cement (OPC), and supplementary cementitious material (SCM), and mixing the cementitious mixture, wherein the dosage of the calcium compound is about 3.1% to about 35% of the total binder content of the cementitious mixture.

Clause 4. A method of preparing a hardened cementicious material comprising:

(a) pouring a cementitious mixture comprising a calcium compound, water, ordinary Portland cement (OPC), and optionally further comprising fine aggregate, coarse aggregates and supplementary cementitious material (SCM) onto a surface or into a concrete form, wherein the dosage of the calcium compound is about 3.1% to about 35% of the total binder content of the cementitious materials; and (b) allowing the cementitious mixture to set by reaction of the cementitious mixture with the water to form a hardened mass.

Clause 5a. The method of any one of Clauses 1a-4, wherein the total binder content of the cementitious mixture comprises about 20% to about 100% OPC and about 0% to about 80% SCM; about 80% to about 99% OPC and about 1% to about 20% SCM; about 60% to about 79% OPC and about 21% to about 40% SCM; or about 20% to about 59% OPC and about 41% to about 80% SCM.

Clause 5b. The method of any one of Clauses 1a-4, wherein the total binder content of the cementitious mixture comprises about 80% to about 99% OPC and about 1% to about 20% SCM.

Clause 6a. The method of any one of Clauses 1a-5b, wherein the dosage of the calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, about 8% to about 10%, about 3.1% to about 35%, about 25% to about 35%, about 25% to about 30%, about 15% to about 25%, about 10% to about 35%, about 10% to about 30%, about 10% to about 15%, about 3.1% to about 25%, about 3.1% to about 20%, about 3.1% to about 15%, or about 3.1% to about 10%, 3.1% to about 8%, about 3.1% to about 6.5%, about 5% to about 25%, about 5% to about 20%, about 5% to about 15%, about 5% to about 10%, about 10% to about 20%, about 20% to about 30%, or about 20% to about 25% of the total binder content of the cementitious mixture, optionally about 8% to about 12%.

Clause 6b. The method of any one of Clauses 1a-5b, wherein the dosage of the calcium compound is about 6.5% to about 15%.

Clause 6c. The method of any one of Clauses 1a-5b, wherein the dosage of the calcium compound is about 8% to about 12%.

Clause 7. The method of any one of Clauses 1a-6c, wherein the dosage of the calcium compound is about 8%, about 9%, about 10%, about 11%, about 12%, about 35%, about 30%, about 25%, about 20%, about 15%, about 10%, about 5%, or about 3.1% of the total binder content of the cementitious mixture.

Clause 8a. The method of any one of Clauses 1a-7, wherein the cementitious mixture has a total binder content of about 100 $kg/m^3$ to about 700 $kg/m^3$, about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about about 300 $kg/m^3$ to about 500 $kg/m^3$.

Clause 8b. The method of any one of Clauses 1a-7, wherein the cementitious mixture has a total binder content of about 100 $kg/m^3$ to about 200 $kg/m^3$.

Clause 8c. The method of any one of Clauses 1a-7, wherein the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about 300 $kg/m^3$ to about 500 $kg/m^3$.

Clause 8d. The method of any one of Clauses 1a-7, wherein the cementitious mixture has a total binder content of about 300 $kg/m^3$ to about 500 $kg/m^3$.

Clause 8e. The method of any one of Clauses 1a-8d, wherein the total binder content comprises about 270 $kg/m^3$ to about 290 $kg/m^3$ OPC and about 110 $kg/m^3$ to about 130 $kg/m^3$ SCM.

Clause 9. The method of any one of Clauses 1a-8e, wherein the cementitious mixture has a total binder content of about 700 $kg/m^3$ to about 1300 $kg/m^3$, about 800 $kg/m^3$ to about 1300 $kg/m^3$, about 900 $kg/m^3$ to about 1300 $kg/m^3$, about 800 $kg/m^3$ to about 1200 $kg/m^3$, about 900 $kg/m^3$ to about 1200 $kg/m^3$, about 900 $kg/m^3$ to about 1200 $kg/m^3$, about 1000 $kg/m^3$ to about 1100 $kg/m^3$, or about 1100 $kg/m^3$ to about 1300 $kg/m^3$.

Clause 10. The method of any one of Clauses 1a-9, wherein the cementitious mixture has a total binder content of about 100 $kg/m^3$, about 200 $kg/m^3$, about 300 $kg/m^3$, about 400 $kg/m^3$, about 500 $kg/m^3$, about 600 $kg/m^3$, or about 700 $kg/m^3$.

Clause 11. The method of any one of Clauses 1a-10, wherein the cementitious mixture has a total binder content of about 800 $kg/m^3$, about 900 $kg/m^3$, about 1000 $kg/m^3$, about 1100 $kg/m^3$, about 1200 $kg/m^3$, or about 1300 $kg/m^3$.

Clause 12. The method of any one of Clauses 1a-11, wherein the calcium compound has a particle size from greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 0.5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

Clause 13. The method of any one of Clauses 1a-12, wherein the calcium compound has a particle size from about 0.075 mm to about 1.5 mm.

Clause 14. The method of any one of Clauses 1a-12, wherein the calcium compound has a particle size from about 1.5 mm to about 2.5 mm.

Clause 15. The method of any one of Clauses 1a-12, wherein the calcium compound has a particle size from about 1 mm to about 2.5 mm.

Clause 16. The method of any one of Clauses 1a-12, wherein the calcium compound has a particle size from about 2.5 mm to about 10 mm.

Clause 17. The method of any one of Clauses 1a-16, wherein the calcium compound comprises one or more of calcium oxide (CaO) and calcium hydroxide ($Ca(OH)_2$).

Clause 18. The method of any one of Clauses 1a-17, wherein the calcium compound comprises, consists of, or consists essentially of calcium oxide.

Clause 19. The method of any one of Clauses 1a-18, wherein the calcium compound is dry.

Clause 20. The method of any one of Clauses 1a-19, wherein the calcium oxide is not slaked, optionally the calcium oxide is not slaked prior to step (a).

Clause 21. The method of any one of Clauses 1a-19, wherein the calcium oxide is slaked, optionally the calcium oxide is slaked prior to step (a).

Clause 22a. The method of any one of Clauses 1a-17, wherein the calcium compound comprises, consists of, or consists essentially of calcium hydroxide.

Clause 22b. The method of any one of Clauses 1a-22a, wherein the calcium compound comprises, consists of, or consists essentially of calcium oxide and magnesium oxide.

Clause 22c. The method of Clause 22b, wherein the calcium compound comprises about 0 wt % to about 5 wt % magnesium oxide and about 95 wt % to about 100 wt % calcium hydroxide.

Clause 22d. The method of Clause 22b, wherein the calcium compound comprises about 6 wt % to about 35 wt % magnesium oxide and about 65 wt % to about 94 wt % calcium hydroxide.

Clause 22e. The method of Clause 22b, wherein the calcium compound comprises about 36 wt % to about 46 wt % magnesium oxide and about 64 wt % to about 54 wt % calcium hydroxide.

Clause 22f. The method of Clause 22b, wherein the calcium compound comprises about 47 wt % to about 50 wt % magnesium oxide and about 53 wt % to about 50 wt % calcium hydroxide.

Clause 22g. The method of Clause 22b, wherein the calcium compound comprises about 51 wt % to about 75 wt % magnesium oxide and about 50 wt % to about 25 wt % calcium hydroxide.

Clause 22h. The method of Clause 22b, wherein the calcium compound comprises about 76 wt % to about 100 wt % magnesium oxide and about 24 wt % to about 0 wt % calcium hydroxide.

Clause 23a. The method of any one of Clauses 1a-22a, wherein the calcium compound comprises calcium oxide and calcium hydroxide.

Clause 23b. The method of any one of Clauses 1a-22a, wherein the calcium compound comprises, consists of, or consists essentially of Quickilme.

Clause 23c. The method of any one of Clauses 1a-22a, wherein the calcium compound comprises, consists of, or consists essentially of Dolomitic Quickilme.

Clause 23d. The method of any one of Clauses 1a-22a, wherein the calcium compound comprises, consists of, or consists essentially of Hydrated Lime.

Clause 23e. The method of any one of Clauses 1a-22a, wherein the calcium compound comprises, consists of, or consists essentially of Dolomitic Hydrated Lime.

Clause 24. The method of any one of Clauses 23a-23e, wherein the calcium compound comprises about 67 wt % to about 100 wt % calcium oxide and about 0 wt % to about 33 wt % calcium hydroxide.

Clause 25. The method of any one of Clauses 23a-23e, wherein the calcium compound comprises about 33 wt % to about 66 wt % calcium oxide and about 34 wt % to about 67 wt % calcium hydroxide.

Clause 26. The method of any one of Clauses 23a-23e, wherein the calcium compound comprises about 0 wt % to about 32 wt % calcium oxide and about 68 wt % to about 100 wt % calcium hydroxide.

Clause 27. The method of any one of Clauses 1a-22a, wherein the calcium compound comprises, consists of, or consists essentially of calcium oxide and magnesium oxide.

Clause 28. The method of Clause 27, wherein the calcium compound comprises about 0 wt % to about 5 wt % magnesium oxide and about 95 wt % to about 100 wt % calcium oxide.

Clause 29. The method of Clause 27, wherein the calcium compound comprises about 6 wt % to about 35 wt % magnesium oxide and about 65 wt % to about 94 wt % calcium oxide.

Clause 30. The method of Clause 27, wherein the calcium compound comprises about 36 wt % to about 46 wt % magnesium oxide and about 64 wt % to about 54 wt % calcium oxide.

Clause 31. The method of Clause 27, wherein the calcium compound comprises about 47 wt % to about 50 wt % magnesium oxide and about 53 wt % to about 50 wt % calcium oxide.

Clause 32. The method of Clause 27, wherein the calcium compound comprises about 51 wt % to about 75 wt % magnesium oxide and about 50 wt % to about 25 wt % calcium oxide.

Clause 33. The method of Clause 27, wherein the calcium compound comprises about 76 wt % to about 100 wt % magnesium oxide and about 24 wt % to about 0 wt % calcium oxide.

Clause 34. The method of Clause 27, wherein the calcium compound comprises calcium oxide, calcium hydroxide and further comprises magnesium oxide.

Clause 35. The method of any one of Clauses 22-26, wherein the calcium compound further comprises magnesium oxide.

Clause 36. The method of any one of Clauses 27-34, wherein the calcium compound further comprises calcium hydroxide.

Clause 37. The method of any one of Clauses 1a-36, wherein the SCM comprises one or more materials selected from fly ash, ground granulated blast-furnace slag, metakaolin, microsilica, natural pozzolana, rice husks, palm oil ash (POA), and glass powder (GP), optionally fly ash.

Clause 38. The method of any one of Clauses 1 and 5-37, wherein step b) occurs after step a).

Clause 39. The method of any one of Clauses 1 and 5-37, wherein step a) and step b) occur simultaneously.

Clause 40. The method of any one of Clauses 1a-39, wherein the cementitious mixture further comprises fine aggregate.

Clause 41a. The method of Clause 40, wherein the fine aggregate comprises one or more of one or more of sand, crushed stone, silt, stone dust, and clay.

Clause 41b. The method of Clause 40 or 41, wherein the fine aggregates are present in an amount from about 750 $kg/m^3$ to about 800 $kg/m^3$.

Clause 42a. The method of any one of Clauses 1a-41b, wherein the cementitious mixture further comprises coarse aggregates.

Clause 42b. The method of Clause 42a, wherein the coarse aggregates are present in an amount from about 100 $kg/m^3$ to about 200 $kg/m^3$.

Clause 42c. The method of Clause 42a or 42b, wherein the coarse aggregates comprise particles between about 4 mm to about 8 mm in diameter.

Clause 42d. The method of any one of Clauses 42a-42c, wherein the coarse aggregates are present in an amount from about 700 $kg/m^3$ to about 800 $kg/m^3$.

Clause 42e. The method of any one of Clauses 42a-42d, wherein the coarse aggregates comprise particles between about 8 mm to about 16 mm in diameter.

Clause 43a. The method of any one of Clauses 1a-42e, wherein the method further comprises adding one or more plasticizers to the cementitious mixture.

Clause 43b. The method of Clause 43a, wherein the one or more plasticizers are present in an amount of about 4 $kg/m^3$ to about 5 $kg/m^3$.

Clause 44a. The method of any one of Clauses 1a-43b, wherein the method further comprises adding one or more retarders to the cementitious mixture.

Clause 44b. The method of Clause 44a, wherein the one or more retarders are present in an amount of about 3 $kg/m^3$ to about 4 $kg/m^3$.

Clause 45. A ceramic material prepared by the method of any one of Clauses 1 and 5-44b.

Clause 46. The ceramic material of Clause 45, wherein the ceramic material is selected from cement paste, grout, mortar, and concrete.

Clause 47. The ceramic material of Clause 45, wherein the ceramic material is grout.

Clause 48. The ceramic material of Clause 45, the ceramic material is a mortar.

Clause 49. The ceramic material of Clause 45, wherein the ceramic material is concrete.

Clause 50. The ceramic material of Clause 46, wherein the ceramic material comprises sand.

Clause 51. The ceramic material of Clause 46, the ceramic material comprises gravel.

Clause 52a. The ceramic material of any one of Clauses 45-51, wherein the ceramic material further comprises one or more plasticizers.

Clause 52b. The ceramic material of Clause 52a, wherein the one or more plasticizers are present in an amount of about 4 $kg/m^3$ to about 5 $kg/m^3$.

Clause 53a. The ceramic material of any one of Clauses 45-52b, wherein the ceramic material further comprises one or more retarders.

Clause 53b. The ceramic material of Clause 53a, wherein the one or more retarders are present in an amount of about 3 $kg/m^3$ to about 4 $kg/m^3$.

Clause 54. A composition prepared by the method of any one of Clauses 1a-45.

Clause 55. The ceramic material of any one of Clauses 45-53 or the composition of Clause 54, wherein the ceramic material or the composition has one or more of the following properties and/or has an augmented performance in one or more of the following properties:

a) self-healing;
b) waterproof,
c) shrinkage compensation;
d) volumetric expansion;
e) anti-corrosion; and
f) enhanced compressive strength.

Clause 56. The ceramic material of any one of Clauses 45-53 or the composition of Clause 54.

Clause 57. The ceramic material of any one of Clauses 45-53 or the composition of Clause 54, wherein the ceramic material or the composition is for underwater use.

Clause 58. A building material comprising the ceramic material of any one of Clauses 45-53, 56, or 57, or the composition of any one of Clauses 54-57.

Clause 59. The building material of Clause 58, wherein the building material comprises reinforced concrete.

Clause 60. The building material of Clause 58 or 59, wherein the building material further comprises Opus signinum (Cocciopesto).

Clause 61. A concrete admixture prepared by the method of any one of Clauses 1a-1d and 5-44.

Clause 62. A concrete admixture prepared by the method of any one of Clauses 2, 3, 5-37, and 40-44.

Clause 63. A blended cement prepared by the method of any one of Clauses 2a-2g, 3a-3b, 5-37, and 40-44.

Clause 64a. The method of any one of Clauses 4-37 and 40-44, wherein the water is present in an amount between about 20% and about 40% of the cement composition.

Clause 64b. The method of any one of Clauses 4-37 and 40-44, wherein the water is present in an amount between about 170 $kg/m^3$ to about 190 $kg/m^3$.

Clause 65. The method of any one of Clauses 4-37, 40-44, 64a, and 64b, wherein the method further comprises adding one or more reinforcements to form a reinforced concrete.

Clause 66. The method of any one of Clauses 4-37, 40-44, 64a, 64b, and 65, wherein the method further comprises adding one or more retarders to the cementitious mixture.

Clause 67. The method of any one of Clauses 4-37, 40-44, and 64a-66, wherein the method further comprises adding one or more reinforcements to form a reinforced concrete.

Clause 68. The method of any one of Clauses 4-37, 40-44, and 64a-67, wherein the reinforcement comprises one or more materials selected from steel, polymers, fibers, and/or alternate composite material.

Clause 69. The method of any one of Clauses 4-37, 40-44, and 64a-68, wherein the method comprises pouring the cementitious mixture onto a surface.

Clause 70. The method of any one of Clauses 4-37, 40-44, and 64a-69, wherein the method comprises preparing a cement-based surface.

Clause 71. The method of any one of Clauses 4-37, 40-44, and 64a-70, wherein the method comprises pouring the cementitious mixture into a concrete form.

Clause 72. A method of preparing an admixture comprising calcium oxide for a cementitious mixture, the method comprising reducing the calcium oxide to a desired particle size and/or a range of particle sizes.

Clause 73. A method of preparing an admixture comprising calcium oxide for a cementitious mixture, wherein the admixture conforms to ASTM C494 and EN 934, the method comprising reducing the calcium oxide to a desired particle size and/or a range of particle sizes.

Clause 74. A method of preparing an admixture for a cementitious mixture comprising calcium oxide, the method comprising reducing the calcium oxide to a desired particle size and/or a range of particle sizes and mixing the calcium oxide with calcium hydroxide.

Clause 75. A method of preparing a admixture for a cementitious mixture comprising calcium oxide, the method comprising reducing the calcium oxide to a desired particle size and/or a range of particle sizes and mixing the calcium oxide with any admixture listed by ASTM C494 and/or EN 934.

Clause 76. A method of preparing an admixture for a cementitious mixture comprising calcium oxide, the method comprising reducing the calcium oxide to a desired particle size and/or a range of particle sizes and mixing the calcium oxide with SCM.

Clause 77. A method of preparing an admixture for a cementitious mixture comprising calcium oxide, the method comprising reducing the calcium oxide to a desired particle size and/or a range of particle sizes and adding water to the calcium oxide to form a slurry.

Clause 78. A method of preparing an admixture for a cementitious mixture comprising calcium oxide, the method comprising reducing the calcium oxide to a desired particle size and/or a range of particle sizes and mixing the calcium oxide with sand.

Clause 79. A method of preparing a cement addition comprising calcium oxide, the method comprising reducing the calcium oxide to a desired particle size and/or a range of particle sizes.

Clause 80. A method of preparing a cement addition, the method comprising mixing calcium oxide with SCM.

Clause 81. A method of preparing a cement addition, the method comprising mixing calcium oxide with calcium hydroxide.

Clause 82. The method of Clause 80 or 81, wherein the calcium oxide is reduced to a desired particle size and/or a range of particle sizes.

Clause 83. The method of any one of Clauses 72-82, wherein the calcium oxide particle size is greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 0.5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

Clause 84. The method of Clause 76 or 80, wherein the SCM comprises fly ash.

Clause 85. An admixture for one or more of concrete, mortar, and grout, wherein the admixture comprises a calcium compound of a desired particle size or range of particle sizes, and the admixture confers one or more of the following properties when used in a cementitious mixture according to the dosage of the calcium compound: self-healing, waterproof, shrinkage compensation; waterproof, anti-corrosion, workability, workability retention, and enhanced compressive strength.

Clause 86. An admixture for one or more of concrete, mortar, and grout, wherein the admixture comprises SCM and a calcium compound of a desired particle size or range of particle sizes, and the admixture confers one or more of the following properties when used in a cementitious mixture according to the dosage of the calcium compound: self-healing, waterproof, shrinkage compensation; waterproof, anti-corrosion, workability, workability retention, and enhanced compressive strength.

Clause 87. An admixture for concrete, wherein the admixture comprises a calcium compound of a desired particle size or range of particle sizes and is produced in accordance with ASTM C494 type S, and the admixture confers one or more of the following properties without detrimental effect as described in ASTM C494 when used in a cementitious mixture: self-healing, waterproof, shrinkage compensation; waterproof, anti-corrosion, workability, workability retention, and enhanced compressive strength.

Clause 88. An admixture for one or more of concrete, mortar, and grout, wherein the admixture comprises a calcium compound of a desired particle size or range of particle sizes and is produced in accordance with EN 934, and the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength.

Clause 89. An admixture for one or more of concrete, mortar, and grout, wherein the admixture comprises a calcium compound of a desired particle size or range of particle sizes and is produced in accordance with EN 934 or to a European Technical Assessments under a Regulation (EU) No 305/2011, and, the admixture confers one or more of the following properties without detrimental effect as described in EN 934 when used in a cementitious mixture: self-healing, waterproof, shrinkage compensation; waterproof, anti-corrosion, workability, workability retention, and enhanced compressive strength.

Clause 90. An addition for concrete, wherein the addition is defined by EN 206 and comprises SCM and a calcium compound of a desired particle size or range of particle sizes and is produced in accordance with EN 450 or to a European Technical Assessments under a Regulation (EU) No 305/2011, and the addition confers one or more of the following properties without detrimental effect as described in EN 450 when used in a cementitious mixture: self-healing, waterproof, shrinkage compensation; waterproof, anti-corrosion, workability, workability retention, and enhanced compressive strength.

Clause 91. An addition for concrete, wherein the addition comprises SCM and a calcium compound of a desired particle size or range of particle sizes and is produced in accordance with EN 450 or to a European Technical Assessments under a Regulation (EU) No 305/2011, and the addition confers one or more of the following properties without detrimental effect as described in EN 450 when used in a cementitious mixture: self-healing, waterproof, shrinkage compensation; waterproof, anti-corrosion, workability, workability retention, and enhanced compressive strength.

Clause 92. An addition for concrete, wherein the addition comprises SCM and a calcium compound of a desired particle size or range of particle sizes and is produced in accordance with ASTM C618, and the addition confers one or more of the following properties without detrimental effect as described in ASTM C618 when used in a cementitious mixture: self-healing, waterproof, shrinkage compensation; waterproof, anti-corrosion, workability, workability retention, and enhanced compressive strength.

Clause 93a. The admixture of any one of Clauses 85-89 or the addition of any one of Clauses 90-92, wherein the range of particle sizes of the calcium compound is greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

Clause 93b. The admixture of any one of Clauses 85-89 or the addition of any one of Clauses 90-92, wherein the calcium compound has a particle size from about 6.35 mm to about 63 mm, and from about 63 mm to about 204 mm and is slaked prior to being used to prepare concrete, mortar, and/or grout.

Clause 94. The admixture of any one of Clauses 85-89 or 93a-93b or the addition of any one of Clauses 90-92, 93a, or 93b, wherein the calcium compound comprises, consists of, or consists essentially of calcium oxide.

Clause 95. The admixture of any one of Clauses 85-89 or 93a-93b or the addition of any one of Clauses 90-92, 93a, or 93b, wherein the calcium compound comprises, consists of, or consists essentially of calcium oxide and magnesium oxide.

Clause 96. The admixture of Clause 95 or the addition of Clause 95, wherein the calcium compound comprises about 0 wt % to about 5 wt % magnesium oxide and about 95 wt % to about 100 wt % calcium oxide.

Clause 97. The admixture of Clause 95 or the addition of Clause 95, wherein the calcium compound comprises about 6 wt % to about 35 wt % magnesium oxide and about 65 wt % to about 94 wt % calcium oxide.

Clause 98. The admixture of Clause 95 or the addition of Clause 95, wherein the calcium compound comprises about 36 wt % to about 46 wt % magnesium oxide and about 64 wt % to about 54 wt % calcium oxide.

Clause 99. The admixture of Clause 95 or the addition of Clause 95, wherein the calcium compound comprises about 47 wt % to about 50 wt % magnesium oxide and about 53 wt % to about 50 wt % calcium oxide Clause 100. The admixture of Clause 95 or the addition of Clause 95, wherein the calcium compound comprises about 51 wt % to about 75 wt % magnesium oxide and about 50 wt % to about 25 wt % calcium oxide.

Clause 101. The admixture of Clause 95 or the addition of Clause 95, wherein the calcium compound comprises about 76 wt % to about 100 wt % magnesium oxide and about 24 wt % to about 0 wt % calcium oxide Clause 102a. The admixture of Clause 95 or the addition of Clause 95, wherein the calcium compound comprises calcium oxide, calcium hydroxide and further comprise magnesium oxide.

Clause 102b. The admixture of Clause 102a or the addition of Clause 102a, wherein the calcium compound comprises, consists of, or consists essentially of calcium oxide and magnesium oxide.

Clause 102c. The admixture of Clause 102a or the addition of Clause 102a, wherein the calcium compound comprises about 0 wt % to about 5 wt % magnesium oxide and about 95 wt % to about 100 wt % calcium hydroxide.

Clause 102d. The admixture of Clause 102a or the addition of Clause 102a, wherein the calcium compound comprises about 6 wt % to about 35 wt % magnesium oxide and about 65 wt % to about 94 wt % calcium hydroxide.

Clause 102e. The admixture of Clause 102a or the addition of Clause 102a, wherein the calcium compound comprises about 36 wt % to about 46 wt % magnesium oxide and about 64 wt % to about 54 wt % calcium hydroxide.

Clause 102f. The admixture of Clause 102a or the addition of Clause 102a, wherein the calcium compound comprises about 47 wt % to about 50 wt % magnesium oxide and about 53 wt % to about 50 wt % calcium hydroxide.

Clause 102g. The admixture of Clause 102a or the addition of Clause 102a, wherein the calcium compound comprises about 51 wt % to about 75 wt % magnesium oxide and about 50 wt % to about 25 wt % calcium hydroxide.

Clause 102h. The admixture of Clause 102a or the addition of Clause 102a, wherein the calcium compound comprises about 76 wt % to about 100 wt % magnesium oxide and about 24 wt % to about 0 wt % calcium hydroxide.

Clause 103. The admixture of any one of Clauses 94-101 or the addition of any one of Clauses 94-101, wherein the calcium compound further comprises calcium hydroxide.

Clause 104. The admixture of Clause 86 or the addition of Clause 90 or 91, wherein the SCM comprises fly ash.

Clause 105. A cementitious mixture comprising a calcium compound and ordinary Portland cement (OPC) and optionally supplementary cementitious material (SCM), wherein the dosage of the calcium compound is about 3.1% to about 35% of the total binder content of the cementitious mixture.

Clause 106a. The cementitious mixture of Clause 105, wherein the total binder content of the cementitious mixture comprises about 20% to about 100% OPC and about 0% to about 80% SCM; about 80% to about 99% OPC and about 1% to about 20% SCM; about 60% to about 79% OPC and about 21% to about 40% SCM; or about 20% to about 59% OPC and about 41% to about 80% SCM.

Clause 106b. The cementitious mixture of Clauses 105 or 106a, wherein the total binder content of the cementitious mixture comprises about 80% to about 99% OPC and about 1% to about 20% SCM.

Clause 106c. The cementitious mixture of any one of Clauses 105-106b, wherein the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about 300 $kg/m^3$ to about 500 $kg/m^3$.

Clause 106d. The cementitious mixture of any one of Clauses 105-106b, wherein the cementitious mixture has a total binder content of about 300 $kg/m^3$ to about 500 $kg/m^3$.

Clause 106e. The cementitious mixture of any one of Clauses 105-106d, wherein the total binder content comprises about 270 $kg/m^3$ to about 290 $kg/m^3$ OPC and about 110 $kg/m^3$ to about 130 $kg/m^3$ SCM.

Clause 107a. The cementitious mixture of Clause 105 or 106e, wherein the dosage of the calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, about 8% to about 10%, about 3.1% to about 35%, about 25% to about 35%, about 25% to about 30%, about 15% to about 25%, about 10% to about 35%, about 10% to about 30%, about 10% to about 15%, about 3.1% to about 25%, about 3.1% to about 20%, about 3.1% to about 15%, or about 3.1% to about 10%, 3.1% to about 8%, about 3.1% to about 6.5%, about 5% to about 25%, about 5% to about 20%, about 5% to about 15%, about 5% to about 10%, about 10% to about 20%, about 20% to about 30%, or about 20% to about 25% of the total binder content of the cementitious mixture, optionally about 8% to about 12%.

Clause 107b. The cementitious mixture of any one of Clauses 105-106e, wherein the dosage of the calcium compound is about 6.5% to about 15%.

Clause 107c. The cementitious mixture of any one of Clauses 105-106e, wherein the dosage of the calcium compound is about 8% to about 12%.

Clause 108. The cementitious mixture of any one of Clauses 105-107c, wherein the dosage of the calcium compound is about 8%, about 9%, about 10%, about 11%, about 12%, about 35%, about 30%, about 25%, about 20%, about 15%, about 10%, about 5%, or about 3.1% of the total binder content of the cementitious mixture.

Clause 109a. The cementitious mixture of any one of Clauses 105-108, wherein the cementitious mixture has a total binder content of about 100 $kg/m^3$ to about 700 $kg/m^3$, about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$.

Clause 109b. The cementitious mixture of any one of Clauses 105-108, wherein the cementitious mixture has a total binder content of about 100 $kg/m^3$ to about 200 $kg/m^3$.

Clause 109c. The cementitious mixture of any one of Clauses 105-108, wherein the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about 300 $kg/m^3$ to about 500 $kg/m^3$.

Clause 109d. The method of any one of Clauses 105-108, wherein the cementitious mixture has a total binder content of about 300 $kg/m^3$ to about 500 $kg/m^3$.

Clause 110. The cementitious mixture of any one of Clauses 105-108, wherein the cementitious mixture has a total binder content of about 700 $kg/m^3$ to about 1300 $kg/m^3$, about 800 $kg/m^3$ to about 1300 $kg/m^3$, about 900 $kg/m^3$ to about 1300 $kg/m^3$, about 800 $kg/m^3$ to about 1200 $kg/m^3$, about 900 $kg/m^3$ to about 1200 $kg/m^3$, about 900 $kg/m^3$ to about 1200 $kg/m^3$, about 1000 $kg/m^3$ to about 1100 $kg/m^3$, or about 1100 $kg/m^3$ to about 1300 $kg/m^3$.

Clause 111. The cementitious mixture of any one of Clauses 105-109d, wherein the cementitious mixture has a total binder content of about 100 $kg/m^3$, about 200 $kg/m^3$, about 300 $kg/m^3$, about 400 $kg/m^3$, about 500 $kg/m^3$, about 600 $kg/m^3$, or about 700 $kg/m^3$.

Clause 112. The cementitious mixture of any one of Clauses 105-108 and 110, wherein the cementitious mixture has a total binder content of about 800 $kg/m^3$, about 900 $kg/m^3$, about 1000 $kg/m^3$, about 1100 $kg/m^3$, about 1200 $kg/m^3$, or about 1300 $kg/m^3$.

Clause 113a. The cementitious mixture of any one of Clauses 105-112, wherein the calcium compound has a particle size from greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 0.5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

Clause 113b. The cementitious mixture of any one of Clauses 105-112, wherein the calcium compound has a particle size from size from about 6.35 mm to about 63 mm, and from about 63 mm to about 204 mm, optionally wherein the calcium compound is slaked.

Clause 114. The cementitious mixture of any one of Clauses 105-113b, wherein the calcium compound has a particle size from about 0.075 mm to about 1.5 mm.

Clause 115. The cementitious mixture of any one of Clauses 105-113b, wherein the calcium compound has a particle size from about 1.5 mm to about 2.5 mm.

Clause 116. The cementitious mixture of any one of Clauses 105-113b, wherein the calcium compound has a particle size from about 1 mm to about 2.5 mm.

Clause 117. The cementitious mixture of any one of Clauses 105-113b, wherein the calcium compound has a particle size from about 2.5 mm to about 10 mm.

Clause 118. The cementitious mixture of any one of Clauses 105-117, wherein the calcium compound comprises one or more of calcium oxide (CaO) and calcium hydroxide ($Ca(OH)_2$).

Clause 119. The cementitious mixture of any one of Clauses 105-118, wherein the calcium compound comprises, consists of, or consists essentially of calcium oxide.

Clause 120. The cementitious mixture of any one of Clauses 105-119, wherein the calcium compound is dry.

Clause 121. The cementitious mixture of any one of Clauses 105-120, wherein the calcium oxide is not slaked, optionally the calcium oxide is not slaked prior to step (a).

Clause 122. The cementitious mixture of any one of Clauses 105-120, wherein the calcium oxide is slaked, optionally the calcium oxide is slaked prior to step (a).

Clause 123a. The cementitious mixture of any one of Clauses 105-118, wherein the calcium compound comprises, consists of, or consists essentially of calcium hydroxide.

Clause 123b. The cementitious mixture of Clause 123a, wherein the calcium compound comprises about 0 wt % to about 5 wt % magnesium oxide and about 95 wt % to about 100 wt % calcium hydroxide.

Clause 123c. The cementitious mixture of Clause 123a, wherein the calcium compound comprises about 6 wt % to about 35 wt % magnesium oxide and about 65 wt % to about 94 wt % calcium hydroxide.

Clause 123d. The cementitious mixture of Clause 123a, wherein the calcium compound comprises about 36 wt % to about 46 wt % magnesium oxide and about 64 wt % to about 54 wt % calcium hydroxide.

Clause 123e. The cementitious mixture of Clause 123a, wherein the calcium compound comprises about 47 wt % to about 50 wt % magnesium oxide and about 53 wt % to about 50 wt % calcium hydroxide.

Clause 123f. The cementitious mixture of Clause 123a, wherein the calcium compound comprises about 51 wt % to about 75 wt % magnesium oxide and about 50 wt % to about 25 wt % calcium hydroxide.

Clause 123g. The cementitious mixture of Clause 123a, wherein the calcium compound comprises about 76 wt % to about 100 wt % magnesium oxide and about 24 wt % to about 0 wt % calcium hydroxide.

Clause 124. The cementitious mixture of any one of Clauses 105-123, wherein the calcium compound comprises calcium oxide and calcium hydroxide.

Clause 125. The cementitious mixture of Clause 124, wherein the calcium compound comprises about 67 wt % to about 100 wt % calcium oxide and about 0 wt % to about 33 wt % calcium hydroxide.

Clause 126. The cementitious mixture of Clause 124, wherein the calcium compound comprises about 33 wt % to about 66 wt % calcium oxide and about 34 wt % to about 67 wt % calcium hydroxide.

Clause 127. The cementitious mixture of Clause 124, wherein the calcium compound comprises about 0 wt % to about 32 wt % calcium oxide and about 68 wt % to about 100 wt % calcium hydroxide.

Clause 128. The cementitious mixture of any one of Clauses 105-123, wherein the calcium compound comprises, consists of, or consists essentially of calcium oxide and magnesium oxide.

Clause 129. The cementitious mixture of Clause 128, wherein the calcium compound comprises about 0 wt % to about 5 wt % magnesium oxide and about 95 wt % to about 100 wt % calcium oxide.

Clause 130. The cementitious mixture of Clause 128, wherein the calcium compound comprises about 6 wt % to about 35 wt % magnesium oxide and about 65 wt % to about 94 wt % calcium oxide.

Clause 131. The cementitious mixture of Clause 128, wherein the calcium compound comprises about 36 wt % to about 46 wt % magnesium oxide and about 64 wt % to about 54 wt % calcium oxide.

Clause 132. The cementitious mixture of Clause 128, wherein the calcium compound comprises about 47 wt % to about 50 wt % magnesium oxide and about 53 wt % to about 50 wt % calcium oxide.

Clause 133. The cementitious mixture of Clause 128, wherein the calcium compound comprises about 51 wt % to about 75 wt % magnesium oxide and about 50 wt % to about 25 wt % calcium oxide.

Clause 134. The cementitious mixture of Clause 128, wherein the calcium compound comprises about 76 wt % to about 100 wt % magnesium oxide and about 24 wt % to about 0 wt % calcium oxide.

Clause 135. The cementitious mixture of Clause 128, wherein the calcium compound comprises calcium oxide, calcium hydroxide and further comprises magnesium oxide.

Clause 136. The cementitious mixture of any one of Clauses 118-127, wherein the calcium compound further comprises magnesium oxide.

Clause 137. The cementitious mixture of any one of Clauses 128-134, wherein the calcium compound further comprises calcium hydroxide.

Clause 138a. The cementitious mixture of any one of Clauses 105-137, wherein the SCM comprises one or more materials selected from fly ash, ground granulated blast-furnace slag, metakaolin, microsilica, natural pozzolana, rice husks, palm oil ash (POA), and glass powder (GP).

Clause 138b. The cementitious mixture of any one of Clauses 105-137, wherein the SCM comprises fly ash.

Clause 139. The cementitious mixture of any one of Clauses 105-138, wherein the cementitious mixture further comprises fine aggregate.

Clause 140a. The cementitious mixture of Clause 139, wherein the fine aggregate comprises one or more of one or more of sand, crushed stone, silt, stone dust, and clay.

Clause 140b. The cementitious mixture of Clause 139, or 140a wherein the fine aggregate is present in an amount from about 750 $kg/m^3$ to about 800 $kg/m^3$.

Clause 141a. The cementitious mixture of any one of Clauses 105-140, wherein the cementitious mixture further comprises coarse aggregates.

Clause 141b. The cementitious mixture of Clause 141a, wherein the coarse aggregates are present in an amount from about 100 $kg/m^3$ to about 200 $kg/m^3$.

Clause 141c. The cementitious mixture of Clause 141a or 141b, wherein the coarse aggregates comprise particles between about 4 mm to about 8 mm in diameter.

Clause 141d. The cementitious mixture of any one of Clauses 141a-141c, wherein the coarse aggregates are present in an amount from about 700 $kg/m^3$ to about 800 $kg/m^3$.

Clause 141e. The cementitious mixture of any one of Clauses 141a-141d, wherein the coarse aggregates comprise particles between about 8 mm to about 16 mm in diameter.

Clause 142a. The cementitious mixture of any one of Clauses 105-141e, wherein the cementitious mixture further one or more plasticizers.

Clause 142b. The cementitious mixture of Clause 142a, wherein the one or more plasticizers are present in an amount of about 4 $kg/m^3$ to about 5 $kg/m^3$.

Clause 143a. The cementitious mixture of any one of Clauses 105-142b, wherein the cementitious mixture further comprises one or more retarders.

Clause 143b. The cementitious mixture of Clause 143a, wherein the one or more retarders are present in an amount of about 3 $kg/m^3$ to about 4 $kg/m^3$.

Clause 144. A cementitious mixture prepared by the method of any one of Clauses 1a-44.

Clause 145a. A concrete comprising a cementitious mixture comprising calcium compound and ordinary Portland cement (OPC), fine aggregates, and coarse aggregates, and optionally supplementary cementitious material (SCM), wherein the dosage of the calcium compound is about 3.1% to about 35% of the total binder content of the cementitious mixture.

Clause 145b. A concrete comprising a cementitious mixture comprising calcium compound and ordinary Portland cement (OPC), fine aggregates, coarse aggregates, water, and optionally supplementary cementitious material (SCM), wherein the dosage of the calcium compound is about 3.1% to about 35% of the total binder content of the cementitious mixture.

Clause 145c. A concrete for building materials comprising a cementitious mixture comprising a calcium compound, ordinary Portland cement (OPC), optionally supplementary cementitious material (SCM), fine aggregates, coarse aggregates, and water, optionally wherein the fine aggregates comprises one or more of one or more of sand, crushed stone, silt, stone dust, and clay, wherein the dosage of the calcium compound is about 3.1% to about 35% of the total binder content of the cementitious mixture.

Clause 145d. A concrete for building materials comprising a cementitious mixture comprising a calcium compound, ordinary Portland cement (OPC), optionally supplementary cementitious material (SCM), fine aggregates, coarse aggregates, and water, optionally wherein the fine aggregates comprises one or more of one or more of sand, crushed stone, silt, stone dust, and clay, wherein the dosage of the calcium compound is about 3.1% to about 35% of the total binder content of the cementitious mixture, optionally comprising a reinforcement.

Clause 145e. A concrete made of a mixture comprising a calcium compound and ordinary Portland cement (OPC) and optionally supplementary cementitious material (SCM), fine aggregates, coarse aggregates, water, optionally wherein the fine aggregates comprises one or more of one or more of sand, crushed stone, silt, stone dust, and clay, wherein the dosage of the calcium compound is about 3.1% to about 35% of the total binder content of the mixture, optionally comprising a reinforcement.

Clause 146a. The concrete of any one of Clauses 145a-145e, wherein the total binder content of the cementitious mixture comprises about 20% to about 100% OPC and about 0% to about 80% SCM; about 80% to about 99% OPC and about 1% to about 20% SCM; about 60% to about 79% OPC and about 21% to about 40% SCM; or about 20% to about 59% OPC and about 41% to about 80% SCM.

Clause 146b. The concrete of any one of Clauses 145a-145d or 146a, wherein the total binder content of the cementitious mixture comprises about 80% to about 99% OPC and about 1% to about 20% SCM.

Clause 146c. The concrete of any one of Clauses 145a-146b, wherein the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about 300 $kg/m^3$ to about 500 $kg/m^3$.

Clause 146d. The concrete of any one of Clauses 145a-146b, wherein the cementitious mixture has a total binder content of about 300 $kg/m^3$ to about 500 $kg/m^3$.

Clause 146e. The concrete of any one of Clauses 145a-146d, wherein the total binder content comprises about 270 $kg/m^3$ to about 290 $kg/m^3$ OPC and about 110 $kg/m^3$ to about 130 $kg/m^3$ SCM.

Clause 147a. The concrete of Clause 145a. 145b, or 146e, wherein the dosage of the calcium compound is about 6.5% to about 30%, about 6.5% to about 20%, about 6.5% to about 15%, about 6.5% to about 12%, about 6.5% to about 10%, about 6.5% to about 8%, about 8% to about 30%, about 8% to about 20%, about 8% to about 15%, about 8% to about 12%, about 8% to about 10%, about 3.1% to about 35%, about 25% to about 35%, about 25% to about 30%, about 15% to about 25%, about 10% to about 35%, about 10% to about 30%, about 10% to about 15%, about 3.1% to about 25%, about 3.1% to about 20%, about 3.1% to about 15%, or about 3.1% to about 10%, 3.1% to about 8%, about 3.1% to about 6.5%, about 5% to about 25%, about 5% to about 20%, about 5% to about 15%, about 5% to about 10%, about 10% to about 20%, about 20% to about 30%, or about 20% to about 25% of the total binder content of the cementitious mixture, optionally about 8% to about 12%.

Clause 147b. The concrete of any one of Clauses 145a-146b, wherein the dosage of the calcium compound is about 6.5% to about 15%.

Clause 147c. The concrete of any one of Clauses 145a-146b, wherein the dosage of the calcium compound is about 8% to about 12%.

Clause 148. The concrete of any one of Clauses 145a-147c, wherein the dosage of the calcium compound is about 8%, about 9%, about 10%, about 11%, about 12%, about 35%, about 30%, about 25%, about 20%, about 15%, about 10%, about 5%, or about 3.1% of the total binder content of the cementitious mixture.

Clause 149a. The concrete of any one of Clauses 145a-148, wherein the cementitious mixture has a total binder content of about 100 $kg/m^3$ to about 700 $kg/m^3$, about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$.

Clause 149b. The concrete of any one of Clauses 145a-148, wherein the cementitious mixture has a total binder content of about 100 $kg/m^3$ to about 200 $kg/m^3$.

Clause 149c. The concrete of any one of Clauses 145a-148, wherein the cementitious mixture has a total binder content of about 200 $kg/m^3$ to about 700 $kg/m^3$, about 300 $kg/m^3$ to about 700 $kg/m^3$, about 400 $kg/m^3$ to about 700 $kg/m^3$, about 200 $kg/m^3$ to about 600 $kg/m^3$, about 300 $kg/m^3$ to about 600 $kg/m^3$, about 400 $kg/m^3$ to about 600 $kg/m^3$, about 500 $kg/m^3$ to about 600 $kg/m^3$, about 200 $kg/m^3$ to about 300 $kg/m^3$, or about 300 $kg/m^3$ to about 500 $kg/m^3$, optionally about 300 $kg/m^3$ to about 500 $kg/m^3$.

Clause 149d. The method of any one of Clauses 145a-148, wherein the cementitious mixture has a total binder content of about 300 $kg/m^3$ to about 500 $kg/m^3$.

Clause 150. The concrete of any one of Clauses 145a-148, wherein the cementitious mixture has a total binder content of about 700 $kg/m^3$ to about 1300 $kg/m^3$, about 800 $kg/m^3$ to about 1300 $kg/m^3$, about 900 $kg/m^3$ to about 1300 $kg/m^3$, about 800 $kg/m^3$ to about 1200 $kg/m^3$, about 900 $kg/m^3$ to about 1200 $kg/m^3$, about 900 $kg/m^3$ to about 1200 $kg/m^3$, about 1000 $kg/m^3$ to about 1100 $kg/m^3$, or about 1100 $kg/m^3$ to about 1300 $kg/m^3$.

Clause 151. The concrete of any one of Clauses 145a-149d, wherein the cementitious mixture has a total binder content of about 100 $kg/m^3$, about 200 $kg/m^3$, about 300 $kg/m^3$, about 400 $kg/m^3$, about 500 $kg/m^3$, about 600 $kg/m^3$, or about 700 $kg/m^3$.

Clause 152. The concrete of any one of Clauses 145a-148 and 150, wherein the cementitious mixture has a total binder content of about 800 $kg/m^3$, about 900 $kg/m^3$, about 1000 $kg/m^3$, about 1100 $kg/m^3$, about 1200 $kg/m^3$, or about 1300 $kg/m^3$.

Clause 153a. The concrete of any one of Clauses 145a-152, wherein the calcium compound has a particle size from greater than about 0 to about 0.2 mm, greater than about 0 mm to about 0.75 mm, about 0.002 mm to about 0.75 mm, about 0.075 mm to about 1 mm, 0.075 mm to about 1.5 mm, 0.075 mm to about 5 mm, about 0.075 mm to about 0.5 mm, about 0.5 mm to about 0.5 mm, about 0.15 mm to about 4 mm, about 0.5 mm to about 3.5 mm, about 0.5 mm to about 1.5 mm, about 1 mm to about 2.5 mm, about 1.5 mm to about 2.5 mm, about 2.5 mm to about 3.5 mm, about 4 mm to about 5 mm, about 4 mm to about 6 mm, about 4 mm to about 7 mm, about 4 mm to about 8 mm, about 4 mm to about 9 mm, about 4 mm to about 10 mm, greater than about 4 mm to about 10 mm, or about 1 mm to about 10 mm.

Clause 153b. The concrete of any one of Clauses 145a-152, wherein the calcium compound has a particle size from size from about 6.35 mm to about 63 mm, and from about 63 mm to about 204 mm, optionally wherein the calcium compound is slaked.

Clause 154. The concrete of any one of Clauses 145a-153b, wherein the calcium compound has a particle size from about 0.075 mm to about 1.5 mm.

Clause 155. The concrete of any one of Clauses 145a-153b, wherein the calcium compound has a particle size from about 1.5 mm to about 2.5 mm.

Clause 156. The concrete of any one of Clauses 145a-153b, wherein the calcium compound has a particle size from about 1 mm to about 2.5 mm.

Clause 157. The concrete of any one of Clauses 145a-153b, wherein the calcium compound has a particle size from about 2.5 mm to about 10 mm.

Clause 158. The concrete of any one of Clauses 145a-157, wherein the calcium compound comprises one or more of calcium oxide (CaO) and calcium hydroxide ($Ca(OH)_2$).

Clause 159. The concrete of any one of Clauses 145a-158, wherein the calcium compound comprises, consists of, or consists essentially of calcium oxide.

Clause 160. The concrete of any one of Clauses 145a-159, wherein the calcium compound is dry.

Clause 161. The concrete of any one of Clauses 145a-160, wherein the calcium oxide is not slaked, optionally the calcium oxide is not slaked prior to step (a).

Clause 162. The concrete of any one of Clauses 145a-160, wherein the calcium oxide is slaked, optionally the calcium oxide is slaked prior to step (a).

Clause 163a. The concrete of any one of Clauses 145a-158, wherein the calcium compound comprises, consists of, or consists essentially of calcium hydroxide.

Clause 163b. The concrete of Clause 163a, wherein the calcium compound comprises about 0 wt % to about 5 wt % magnesium oxide and about 95 wt % to about 100 wt % calcium hydroxide.

Clause 163c. The concrete of Clause 163a, wherein the calcium compound comprises about 6 wt % to about 35 wt % magnesium oxide and about 65 wt % to about 94 wt % calcium hydroxide.

Clause 163d. The concrete of Clause 163a, wherein the calcium compound comprises about 36 wt % to about 46 wt % magnesium oxide and about 64 wt % to about 54 wt % calcium hydroxide.

Clause 163e. The concrete of Clause 163a, wherein the calcium compound comprises about 47 wt % to about 50 wt % magnesium oxide and about 53 wt % to about 50 wt % calcium hydroxide.

Clause 163f. The concrete of Clause 163a, wherein the calcium compound comprises about 51 wt % to about 75 wt % magnesium oxide and about 50 wt % to about 25 wt % calcium hydroxide.

Clause 163g. The concrete of Clause 163a, wherein the calcium compound comprises about 76 wt % to about 100 wt % magnesium oxide and about 24 wt % to about 0 wt % calcium hydroxide.

Clause 163b. The concrete of any one of Clauses 145a-158, wherein the calcium compound comprises, consists of, and/or consists essentially of calcium hydroxide, wherein about 90 wt % to about 95 wt % of the calcium hydroxide has a particle size less than about 0.3 mm or about 0.2 mm, and about 10 wt % to about 15 wt % of the calcium hydroxide has a particle size less than about 0.7 mm or about 0.6 mm.

Clause 164. The concrete of any one of Clauses 145a-163b, wherein the calcium compound comprises calcium oxide and calcium hydroxide.

Clause 165. The concrete of Clause 164, wherein the calcium compound comprises about 67 wt % to about 100 wt % calcium oxide and about 0 wt % to about 33 wt % calcium hydroxide.

Clause 166. The concrete of Clause 164, wherein the calcium compound comprises about 33 wt % to about 66 wt % calcium oxide and about 34 wt % to about 67 wt % calcium hydroxide.

Clause 167. The concrete of Clause 164, wherein the calcium compound comprises about 0 wt % to about 32 wt % calcium oxide and about 68 wt % to about 100 wt % calcium hydroxide.

Clause 168. The concrete of any one of Clauses 145a-163, wherein the calcium compound comprises, consists of, or consists essentially of calcium oxide and magnesium oxide.

Clause 169. The concrete of Clause 168, wherein the calcium compound comprises about 0 wt % to about 5 wt % magnesium oxide and about 95 wt % to about 100 wt % calcium oxide.

Clause 170. The concrete of Clause 168, wherein the calcium compound comprises about 6 wt % to about 35 wt % magnesium oxide and about 65 wt % to about 94 wt % calcium oxide.

Clause 171. The concrete of Clause 168, wherein the calcium compound comprises about 36 wt % to about 46 wt % magnesium oxide and about 64 wt % to about 54 wt % calcium oxide.

Clause 172. The concrete of Clause 168, wherein the calcium compound comprises about 47 wt % to about 50 wt % magnesium oxide and about 53 wt % to about 50 wt % calcium oxide.

Clause 173. The concrete of Clause 168, wherein the calcium compound comprises about 51 wt % to about 75 wt % magnesium oxide and about 50 wt % to about 25 wt % calcium oxide.

Clause 174. The concrete of Clause 168, wherein the calcium compound comprises about 76 wt % to about 100 wt % magnesium oxide and about 24 wt % to about 0 wt % calcium oxide.

Clause 175. The concrete of Clause 168, wherein the calcium compound comprises calcium oxide, calcium hydroxide and further comprises magnesium oxide.

Clause 176. The concrete of any one of Clauses 148-177, wherein the calcium compound further comprises magnesium oxide.

Clause 177. The concrete of any one of Clauses 148-174, wherein the calcium compound further comprises calcium hydroxide.

Clause 178a. The concrete of any one of Clauses 145a-177, wherein the SCM comprises one or more materials selected from fly ash, ground granulated blast-furnace slag, metakaolin, microsilica, natural pozzolana, rice husks, palm oil ash (POA), and glass powder (GP).

Clause 178b. The concrete of any one of Clauses 145a-177, wherein the SCM comprises fly ash.

Clause 179a. The concrete of any one of Clauses 145a-178b, wherein the fine aggregate comprises one or more of one or more of sand, crushed stone, silt, stone dust, and clay.

Clause 179b. The concrete of Clause 179a, wherein the fine aggregate is present in an amount from about 750 $kg/m^3$ to about 800 $kg/m^3$.

Clause 180a. The concrete of any one of Clauses 145a-179b, wherein the coarse aggregates are present in an amount from about 100 $kg/m^3$ to about 200 $kg/m^3$.

Clause 180b. The concrete of any one of Clauses 145a-180a, wherein the coarse aggregates comprise particles between about 4 mm to about 8 mm in diameter.

Clause 180c. The concrete of any one of Clauses 145a-180b, wherein the coarse aggregates are present in an amount from about 700 $kg/m^3$ to about 800 $kg/m^3$.

Clause 180d. The concrete of any one of Clauses 145a-180c, wherein the coarse aggregates comprise particles between about 8 mm to about 16 mm in diameter.

Clause 181a. The concrete of any one of Clauses 145a-180d, wherein the concrete further comprises one or more plasticizers.

Clause 181b. The concrete of Clause 181a, wherein the one or more plasticizers are present in an amount of about 4 $kg/m^3$ to about 5 $kg/m^3$.

Clause 182a. The concrete of any one of Clauses 145a-181b, wherein the concrete further comprises one or more retarders.

Clause 182b. The concrete of Clause 181a, wherein the one or more retarders are present in an amount of about 3 $kg/m^3$ to about 4 $kg/m^3$.

Clause 183. The concrete of any one of Clauses 145a-182b, wherein the concrete further comprises one or more reinforcements.

Clause 184. The concrete of Clause 183, wherein the reinforcement comprises one or more of steel reinforcement, non-steel reinforcement, stainless steel reinforcement, ferrous reinforcement, non-ferrous reinforcement, fiber reinforcement, and non-fiber reinforcement.

Clause 185. The concrete of Clause 183 or 184, wherein the reinforcement comprises one or more of bars, reinforcing bars, plain steel bars, deformed steel bars, t-bars, composite bars, wires, reinforcing wires, cold-drawn wire, composite wire, welded wire fabric, deformed welded wire fabric, composite welded wire fabric, strands, prestressing strands, steel prestressing strands, composite prestressing strands, fibers, composite fibers, reinforcing fibers, reinforcing fibers made of steel, reinforcing fibers made of copper, reinforcing fibers made of glass, reinforcing synthetic fibers, reinforcing nylon fibers, reinforcing polyester fibers, reinforcing polypropylene fibers, reinforcing fibers made of natural materials, reinforcing fibers made of composite materials, chemical fibers, natural fibers, and composite fibers.

Clause 186. The concrete of any one of Clauses 145a-185, wherein the water is present in an amount between about 170 $kg/m^3$ to about 190 $kg/m^3$.

Clause 187. A concrete prepared by the method of any one of Clauses 1a-44.

DEFINITIONS

The following definitions are used in connection with the disclosure disclosed herein. Unless defined otherwise, all technical and scientific terms used herein have the same meaning as commonly understood to one of skill in the art to which this disclosure belongs.

As used herein, "a," "an," or "the" can mean one or more than one.

As referred to herein, all compositional percentages are by weight of the total composition, unless otherwise specified. As used herein, the word "include." and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of terms such as including, containing, or having, is used herein to describe and claim the disclosure, the present disclosure, or embodiments thereof, may alternatively be described using alternative terms such as "consisting of" or "consisting essentially of."

This disclosure is further illustrated by the following non-limiting examples.

Examples

Example 1: Study on the Effects of Quicklime on Some Key Properties of Concrete This example demonstrates the results of a laboratory study to define the effects of added quick lime on some key properties of concrete.

The study was carried out based on the following steps:

a) useful first dosages and grain sizes of quick-lime were identified through small scale mortars laboratory batches;

b) laboratory made concrete batches were prepared with certain selected grain sizes and proportions of quick lime; and c) workability, carbonation resistance, thermal properties and self-healing of concrete mixes containing a useful range of dosage and grain size of quick-lime were characterized.

Commercially produced quick lime (about 96.8% CaO) was purchased in the 30-80 mm range and was further reduced to the required grain sizes as described below.

The testing program was carried out over 116 days upon completion of 63-days readings of the accelerated carbonation test.

Laboratory Mortar Batches: Over the first 5 days of the testing program, eleven batches of 2.0 litres each were prepared along with one batch named "control" without quick lime for comparative purposes. The sequence of additions was the following: 1, powders (CEM I, Fly Ash), 2, quick-lime in grains and sand. 3, water, 4, superplasticizer. The following standards were used for batching and testing mortar:

a) EN 196-1—Methods of testing cement. Determination of strength b) EN 196-3—Methods of testing cement. Determination of setting times The coarse-sized quick lime was reduced to three grain sizes by means of laboratory crushing and sieving (FIGS. 1A-1D):

Results of the Laboratory Program on Mortar Mixes: The summary of mortar mix composition and laboratory results for density, air content, initial/final setting tie, and compressive/flexural strength are depicted in Table 1 below:

TABLE 1

Summary of mortar mix composition and laboratory results

| MORTAR MIX COMPOSITION (kg/m³) | | | | | | | | | | | | | | | | | | | |
|---|---|---|---|---|---|---|---|---|---|---|---|---|---|---|---|---|---|---|---|
| | | | | | | | | | Flow [mm] | | | Density | | Initial setting | Final Setting | Flexural strength [MPa] | | Compressive strength [MPa] | |
| MIX | CEM | Fly Ash | CaO (0.5-1.5 mm) | CaO (1.5-2.5 mm) | CaO (2.5-3.5 mm) | Water | SPL | Sand | Time 0' | Time 30' | Time 60' | (kg/m³) | Air [%] | time [h] | time [h] | 7-day | 28-day | 7-day | 28-day |
| Control | 280 | 120 | 0 | 0 | 0 | 180 | 10 | 1761 | 180 | 155 | 140 | 2360 | 2.0 | 02:00 | 04:00 | 6.3 | 7.4 | 36.5 | 51.4 |
| A | 280 | 120 | 20 | 0 | 0 | 180 | 20 | 1745 | 151 | 134 | 131 | 2292 | 3.4 | 01:44 | >6:00 | 5.4 | 7.5 | 37.0 | 52.2 |
| B | 280 | 120 | 40 | 0 | 0 | 180 | 20 | 1729 | 130 | 119 | 111 | 2285 | 3.1 | 02:43 | >04:43:00 | 4.7 | 7 | 31.0 | 47.3 |
| C | 280 | 120 | 60 | 0 | 0 | 180 | 20 | 1713 | 108 | — | — | — | — | — | — | 1.6 | 4.2 | 21.7 | 34.6 |
| D | 280 | 120 | 0 | 20 | 0 | 180 | 20 | 1745 | 148 | 134.5 | 132.5 | 2283 | 3.5 | 02:12 | >5:00 | 4.2 | 6.5 | 33.6 | 46.7 |
| E | 280 | 120 | 0 | 40 | 0 | 180 | 20 | 1729 | 116 | — | — | — | — | — | — | 4.9 | 7.1 | 36.2 | 47.1 |
| F | 280 | 120 | 0 | 60 | 0 | 180 | 20 | 1713 | 132.5 | 116 | 110 | 2309 | 4.3 | 02:19 | >6:50 | 4.2 | 6.9 | 36 | 44.8 |
| G | 280 | 120 | 0 | 0 | 20 | 180 | 20 | 1745 | 135 | 124 | 127 | 2322 | 3.1 | 02:19 | >04:07:00 | 5.7 | 7.2 | 33.8 | 44 |
| H | 280 | 120 | 0 | 0 | 40 | 180 | 20 | 1729 | 135 | 128 | 120 | 2287 | 5.1 | 01:35 | >05:47:00 | 6 | 6.7 | 35.1 | 48.5 |
| I | 280 | 120 | 0 | 0 | 60 | 180 | 20 | 1713 | 140 | 127 | 117 | 2311 | 4.5 | 00:59 | 03:27 | 5.7 | 5.9 | 33.6 | 45.9 |
| J | 80 | 320 | 40 | 0 | 0 | 200 | 20 | 1603 | 227.5 | 215 | 195.5 | — | — | — | — | 0.6 | 2.9 | 7.8 | 18.0 |
| K | 80 | 320 | 0 | 0 | 40 | 200 | 20 | 1603 | 228.5 | 196 | 175 | — | — | — | — | 1.4 | 3.5 | 8.1 | 20.0 |

Results on Mortar Mixes: From the testing program on mortar mixes, mixes A, B, D, and H of Table 1 were selected for additional testing. Unlike the remaining mixes, these mixes did not show any detrimental influence (on setting time, workability and/or strength) by the addition of quicklime in the system when compared to the control mix.

Figure 2:
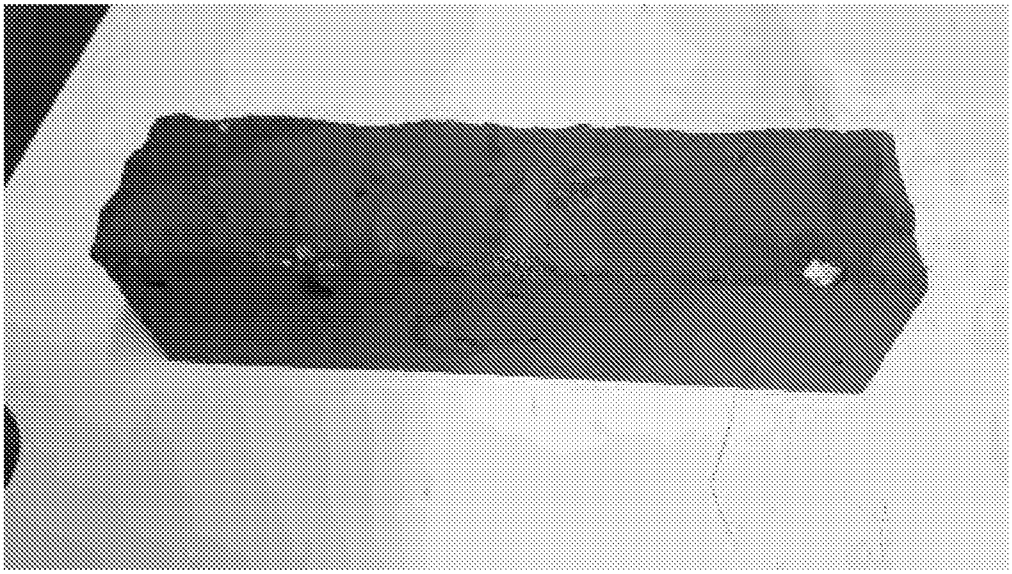
FIG. 2 depicts an example of pop-up by CaO grains on mix G.

In particular, formation of pop-ups was considered as one main criteria for discarding certain mixes (FIG. 2), as pop-ups are always unacceptable on finished concrete surfaces.

Figure 30:
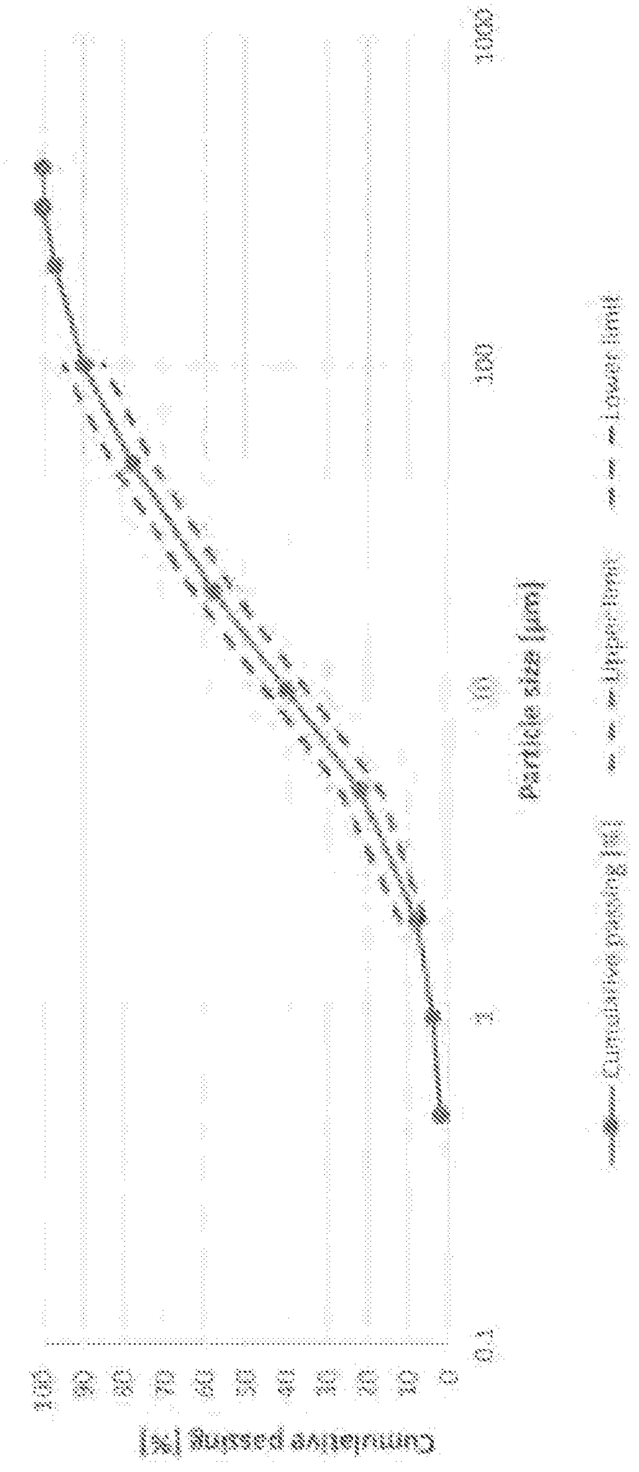
FIG. 30 depicts a chart illustrating the fineness of the fly ash used in certain mixes containing fly ash as described herein.

Conformity of Components: All components used in the testing program on mortar and concrete conform to the relevant EN standards, namely:

a) CEM I 42.5 N—conforming to EN 196;

b) Fly ash—conforming to EN 450 with fineness as in FIG. 30;

c) Superplasticizer/Retarder—conforming to EN 934; and d) Aggregates—conforming to EN 12620.

Laboratory Concrete Batches: Over a period of 12 days, four batches of concrete of approximately 40.0 litres each were prepared along with one batch named "control" without quick lime for comparative purposes. The summary of concrete mix designs subjected to further testing is given in Table 2 below.

When retarder was used (mixes B and H), workability retention was found to have the highest value.

Figure 5:
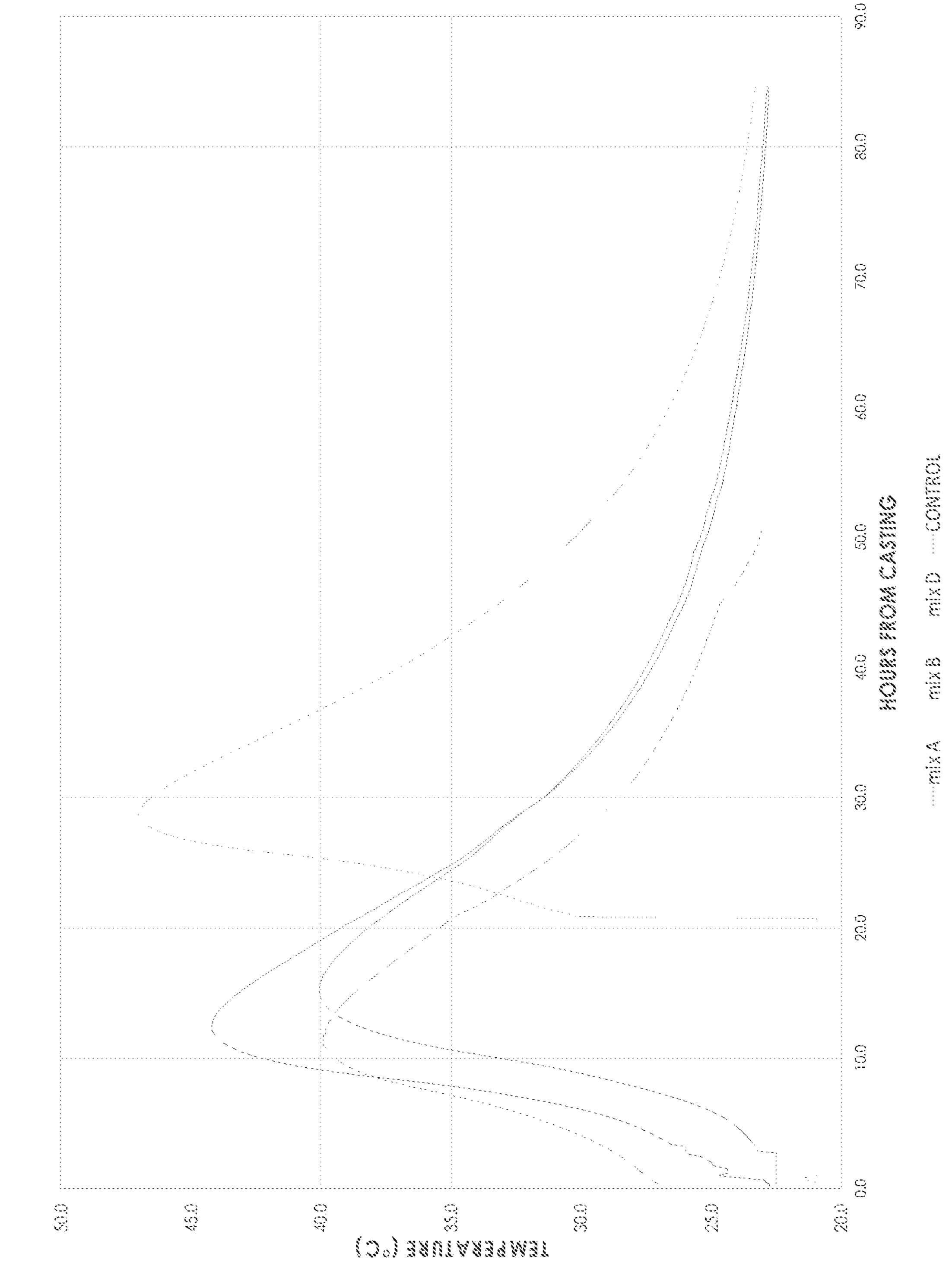
FIG. 5 depicts experimental data demonstrating the results of heat development of concrete mixes. The order of curves, top to bottom, at X-axis point 10 h is mix A, mix D, control, and mix B.

Results of Heat Development of Concrete Mixes: Heat development was measured on small (150 mm×150 mm×150 mm) volumes of concrete cast into polystyrene moulds with a thermocouple located in the centre of the samples to assess whether addition of quick lime would increase the semi-adiabatic temperature rise compared to the control mix. Results are presented in FIG. 5.

The dosage and grain size of quicklime for mixes A, B, and D were as follows:

a) Mix A: 20 kg/0.5-1.5 mm;

b) Mix B: 40 kg/0.5-1.5 mm; and c) Mix D: 20 kg/1.5-2.5 mm.

These results demonstrate that, for the same dosage, quicklime in fine grained size (Mix A, 0-5-1.5 mm) heats up more than quick lime in coarse grained size (Mix D, 1.5-2.5 mm). Although not wishing to be bound by any particular theory, this result is hypothesized to be due to the increased specific surface of finer quicklime.

Compared to the control mix, mix D did not have any extra heat developed while mix A heated up +4 °C, more and mix B +7 °C, more, respectively.

TABLE 2

Concrete mix designs (all quantities are in kg/m$^3$)

| CONCRETE MIX | CEM I | FLY ASH | CaO (0.5-1.5 mm) | CaO (1.5-2.5 mm) | CaO (2.5-3.5 mm) | WATER | SPL* | RET** | SAND | 4/8 mm | 8/16 mm |
|---|---|---|---|---|---|---|---|---|---|---|---|
| Control | 280 | 120 | 0 | 0 | 0 | 180 | 4.8 | 0 | 791 | 176 | 791 |
| A | 280 | 120 | 20 | 0 | 0 | 180 | 4.8 | 0 | 784 | 174 | 784 |
| B | 280 | 120 | 40 | 0 | 0 | 180 | 4.8 | 3.2 | 777 | 173 | 777 |
| D | 280 | 120 | 0 | 20 | 0 | 180 | 4.8 | 0 | 784 | 174 | 784 |
| H | 280 | 120 | 0 | 0 | 40 | 180 | 4.8 | 3.2 | 777 | 173 | 777 |

*superplasticizer;
**retarder

The sequence of additions was as follows: 1, powders (CEM I and Fly Ash), 2, quicklime in grains and aggregates, 3, water, 4, superplasticizer/retarder.

Figure 3A:
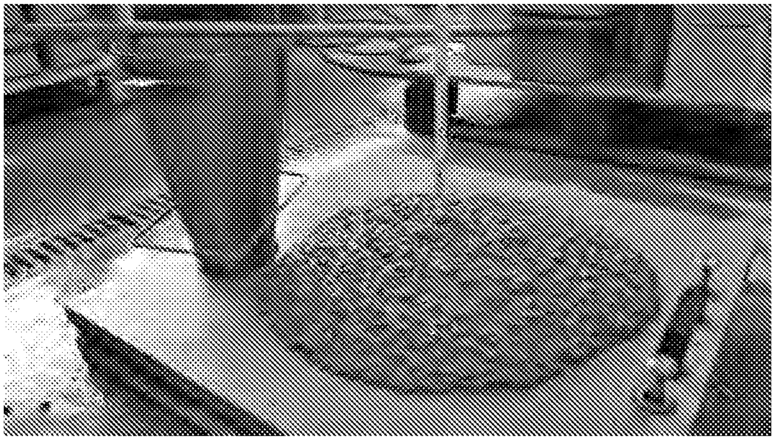
FIGS. 3A and 3B depict images of the slump cone test.
Figure 3B:
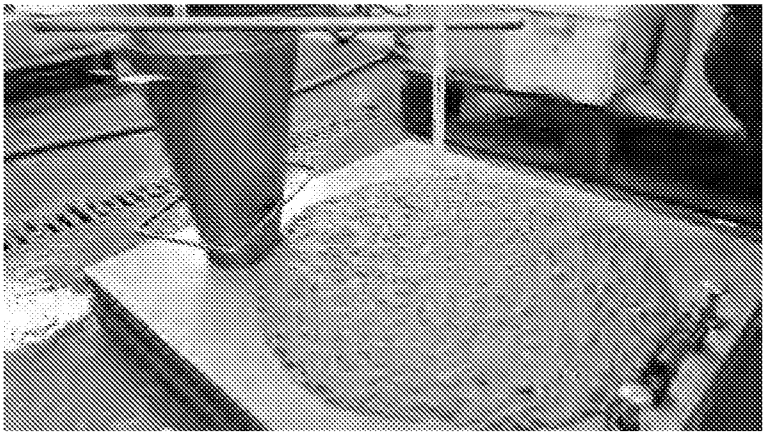

Workability with the slump cone test (EN 12350-2) was conducted at intervals of 30 min from initial to 2 hours on fresh concrete batches only (FIGS. 3A-3B).

Figure 4:
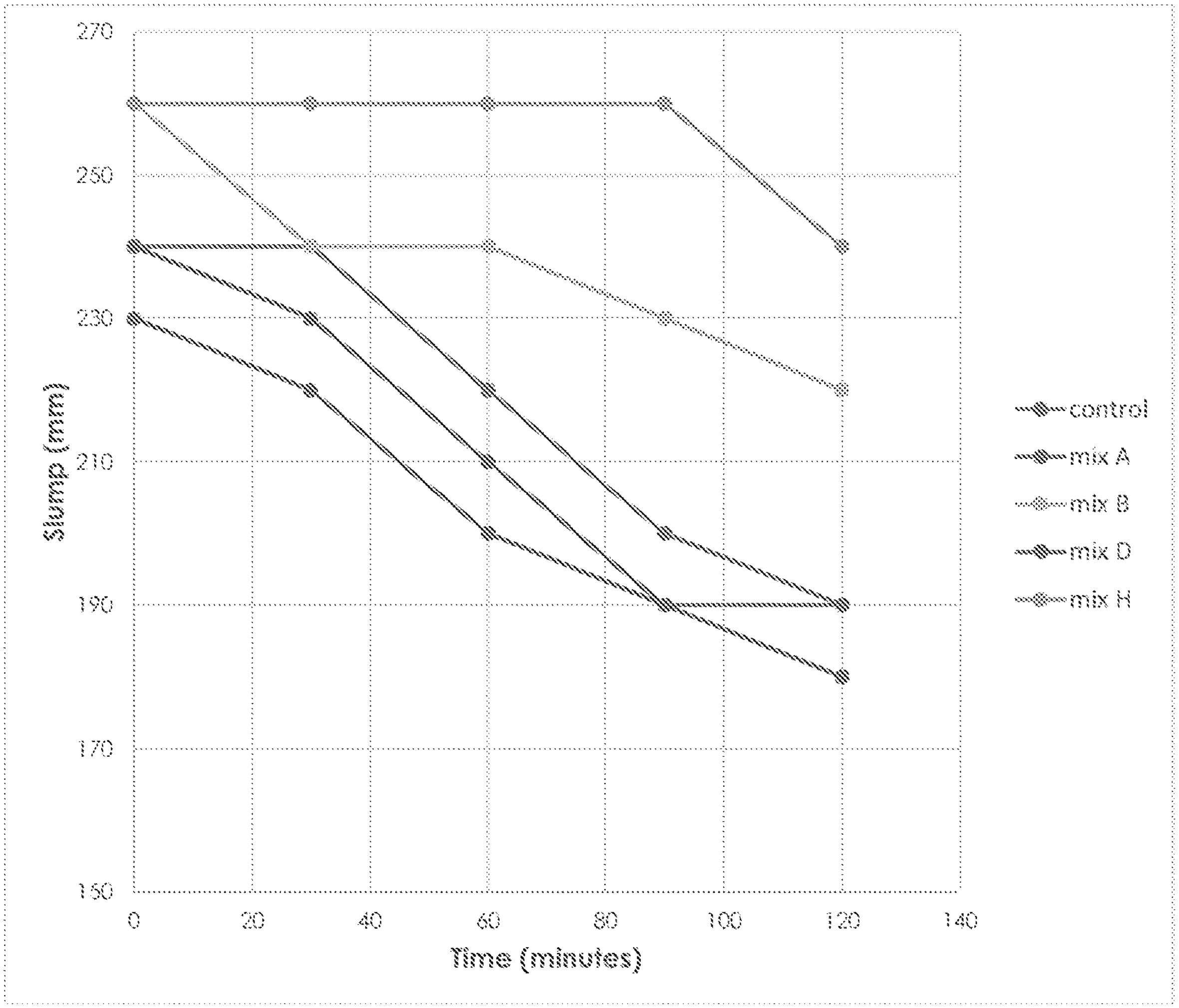
FIG. 4 depicts a summary of experimental data demonstrating initial slump and slump retention for mixes A, B, D. H, and control. The order of curves, top to bottom, at X-axis point 60 min is mix H, mix B, control, mix D, and mix A.

Results of Workability on Concrete Mixes: The summary of initial slump and slump retention for mixes "A", "B", "D", "H" and "control" is reported in Table 3 and FIG. 4.

TABLE 3

Summary of initial slump and slump retention.

| CONCRETE MIX | 0 min | 30 min | 60 min | 90 min | 120 min |
|---|---|---|---|---|---|
| Control | 240 | 240 | 220 | 200 | 190 |
| A | 230 | 220 | 200 | 190 | 180 |
| B | 260 | 240 | 240 | 230 | 220 |
| D | 240 | 230 | 210 | 190 | 180 |
| H | 260 | 260 | 260 | 260 | 240 |

The results of workability and workability retention show that adding quick lime in the selected grain sizes and dosages has no detrimental effect on concrete workability. The target initial slump class of S5 (≥220 mm) as per EN 206-1 has been granted by all of the combinations, and at the end of the workability period of 120 minutes all concrete mixes retained class S4 (160-210 mm) of EN 206-1.

Although not wishing to be bound by any particular theory, because heat development is almost linearly proportional to the volume of concrete and works with linear superposition, these results suggest that for large volume real structures, the heat of hydration of concrete containing quick lime would also be from unaffected (mix D with 0% increase) to moderately affected (mix A and B with +4 °C, and +7 °C, respectively, on the peak temperature of the structure).

Mixes A and D were selected for further testing because they contained dosages and grain sizes of quick lime that do not alter the relative heat of hydration of concrete by more than +5 °C. If a higher dosage of quicklime is desired, coarser (hence less thermally active) grain sizes may be useful.

Results of Self-Healing of Concrete mixes: Mixes A and H were subjected to a self-healing test to verify whether the addition of quicklime in different dosage and grain size in the system would promote healing of cracks by formation of newly deposited calcium carbonate crystals by reaction of free lime in the matrix of concrete containing quicklime and carbon dioxide dissolved in water.

The self-healing of cracks with width of up to 0.50 mm (as measured on the surface of the samples exposed to the flow of water) refers to autogenic self-healing induced by external cementitious and/or pozzolanic compounds that enhance the natural self-healing properties of the concrete.

Figure 6:
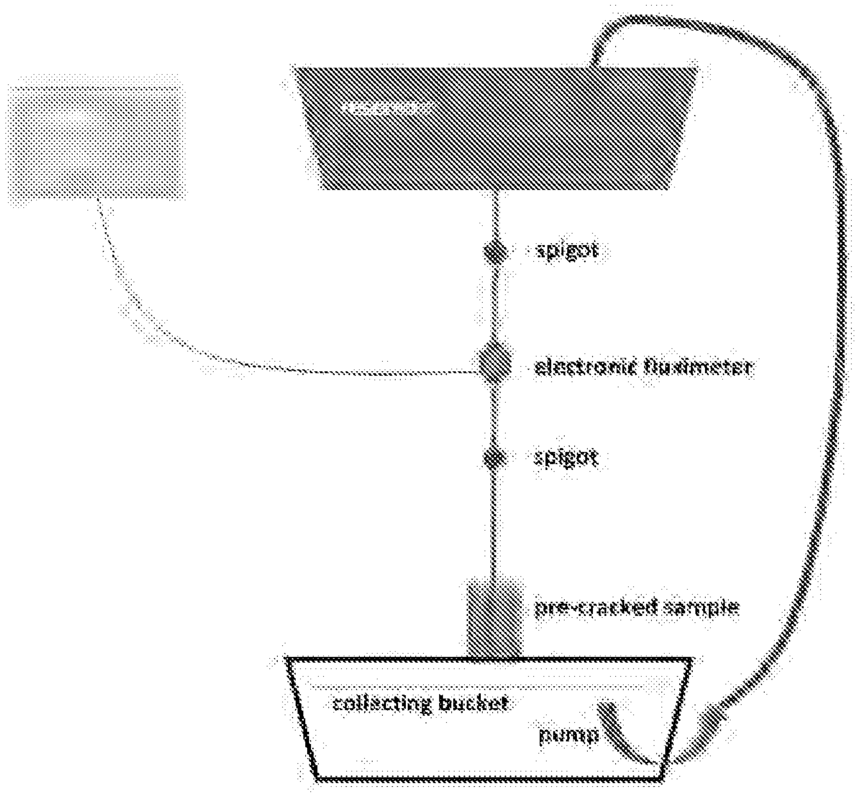
FIG. 6 depicts a schematic representation of the water flow self-healing test.
Figure 7:
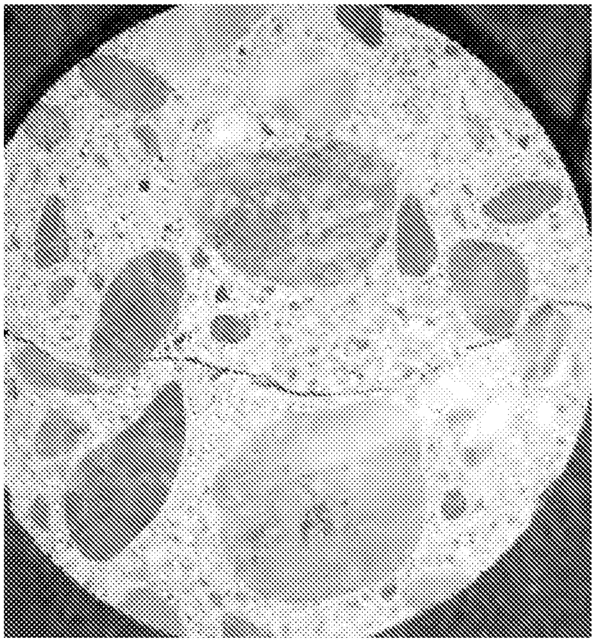
FIG. 7 depicts an image of a pre-cracked sample with a crack width between 0.40 mm and 0.50 mm.
Figure 8A:
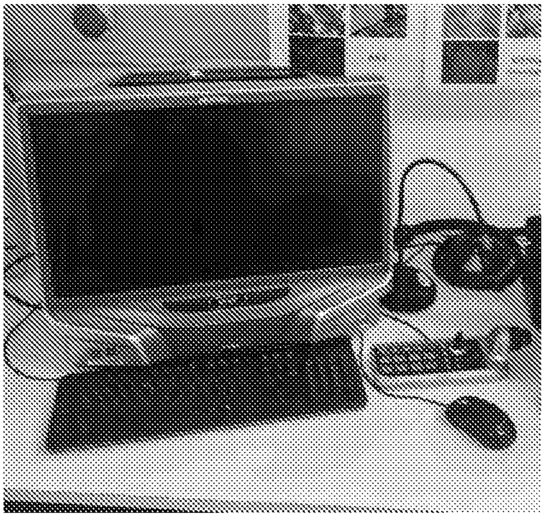
FIG. 8A depicts an HD screen for image analysis.
Figure 8B:
FIG. 8B depicts a microscope and HD camera.

Test Description: The test consisted of subjecting a pre-cracked cylinder of concrete with diameter=height=100 mm to unidirectional flow of water from a reservoir under the action of gravity only. The initial flow is the maximum value of flow in litres/h that the crack with a width W comprised between 0.40 and 0.60 mm on the face exposed to flow can take. The average difference in height from the reservoir's water level and the sample inlet is 3.5 m (FIG. 6). This, for a sample height of 0.1 m, corresponds to an average hydraulic gradient of 35 (m/m). Samples were pre-cracked in splitting tensile strength mode and the opposite walls of the cracked sample were adjoined in order to achieve a width comprised between 0.40 mm and 0.50 mm (FIG. 7). Crack width was optically measured, as per structural engineering definitions, at the surface exposed to water inflow. The flow of tap water through the cracked samples was digitally recorded with electromagnetic fluximeters. A data logger collected readings of flow at intervals. The optical microscope with up to 1000× magnification shown in FIGS. 8A and 8B below was used to make all the visual and quantitative assessments for the evaluation and rating of the self-healing process.

Evaluation of Results: The criteria used for the evaluation of results were based on the difference between physically dominated and chemically dominated self-healing. See, for example, de Rooij et al., "Self-Healing Phenomena in Cement-Based Materials," Vol. 11 (2013), which is incorporated by reference herein in its entirety.

The following criteria were used for the evaluation of results:

1. Flow drops to within 0.0 and 1.0 litres/h→PASS, otherwise FAIL;
2. More than 70% of net paste's surface* on the crack's wall has newly formed crystals→CHEMICALLY DOMINATED SELF-HEALING;
3. Between 50% and 70% of net paste's surface along the crack's wall has newly formed crystals→CHEMICALLY AND PHYSICALLY DOMINATED SELF-HEALING;
4. Less than 50% of net paste's surface on the crack's wall has newly formed crystals→PHYSICALLY DOMINATED SELF-HEALING.

*The total surface of the crack's wall minus the area occupied by aggregates.

For residual steady inflows between 0.5 and 1.0 litres/h the residual crack's width can be determined using the formula to calculate the initial water leakage per meter of visible crack ($q_w$) (see Edvardsen, Innovation in Concrete Structures: Design and Construction; 473-487 (1999), which is incorporated by reference herein in its entirety):

$$q_w = 740 \cdot I \cdot w_m^3 \cdot k \quad \text{(eq. 1)}$$

Where:

I—hydraulic gradient (m/m)

$w_m$—mean crack width on the surface k—correction factor for the temperature of water (k=0.88 @15 °C, k=1.00 @20 °C, k=1.26@30 °C).

The water temperature exiting the fluximeters was automatically measured throughout the duration of the test and averaged 26 °C, with negligible scatter, from which a value of k=1.20 could be interpolated.

Validation: Although there is no common agreement in the literature on a unified test methodology and criteria for evaluation of self-healing properties of cementitious systems, this approach incorporates known elements such as the set-up for exposure to variable flow with time, and the optical techniques for assessing the effectiveness of secondary crystals growth on the crack's wall.

Figure 9:
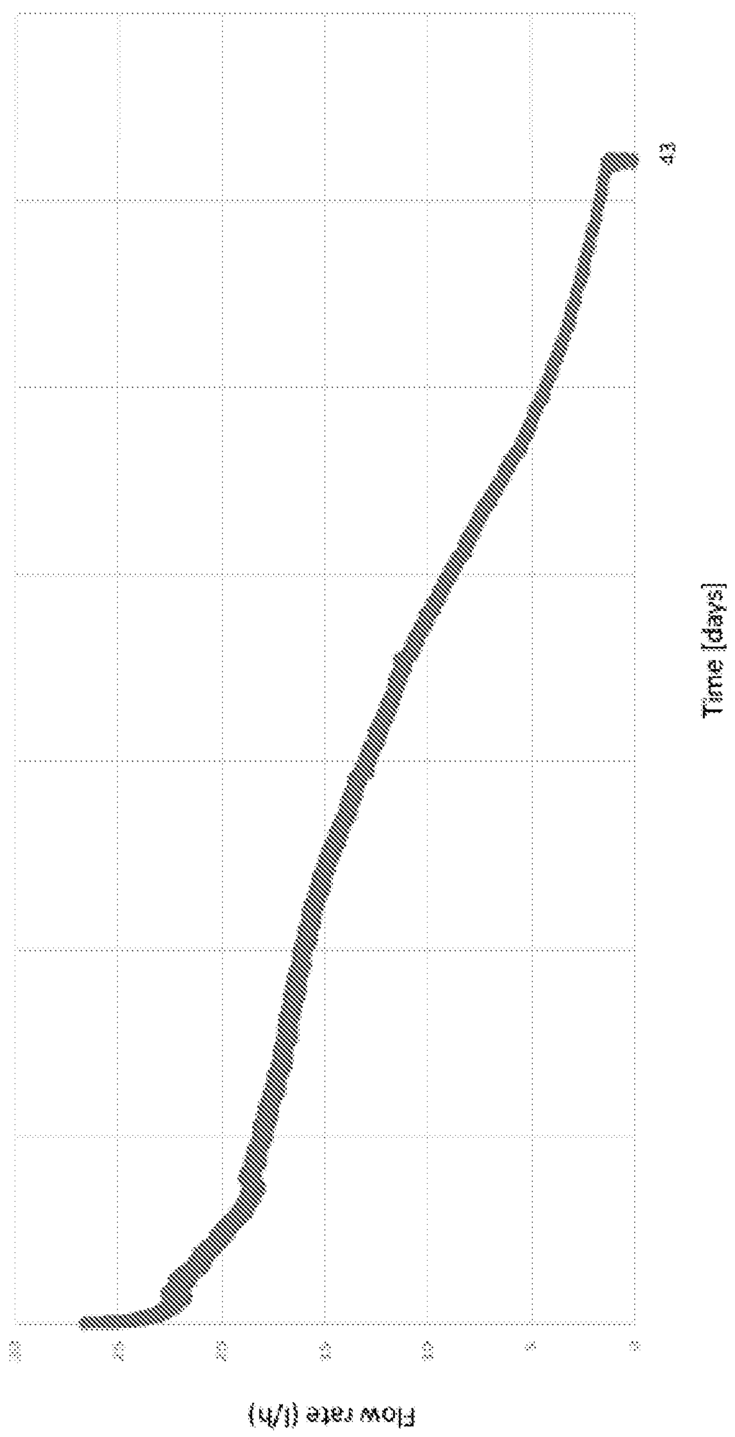
FIG. 9 depicts the evolution of flow over time for Mix A over 43 days.
Figure 10:
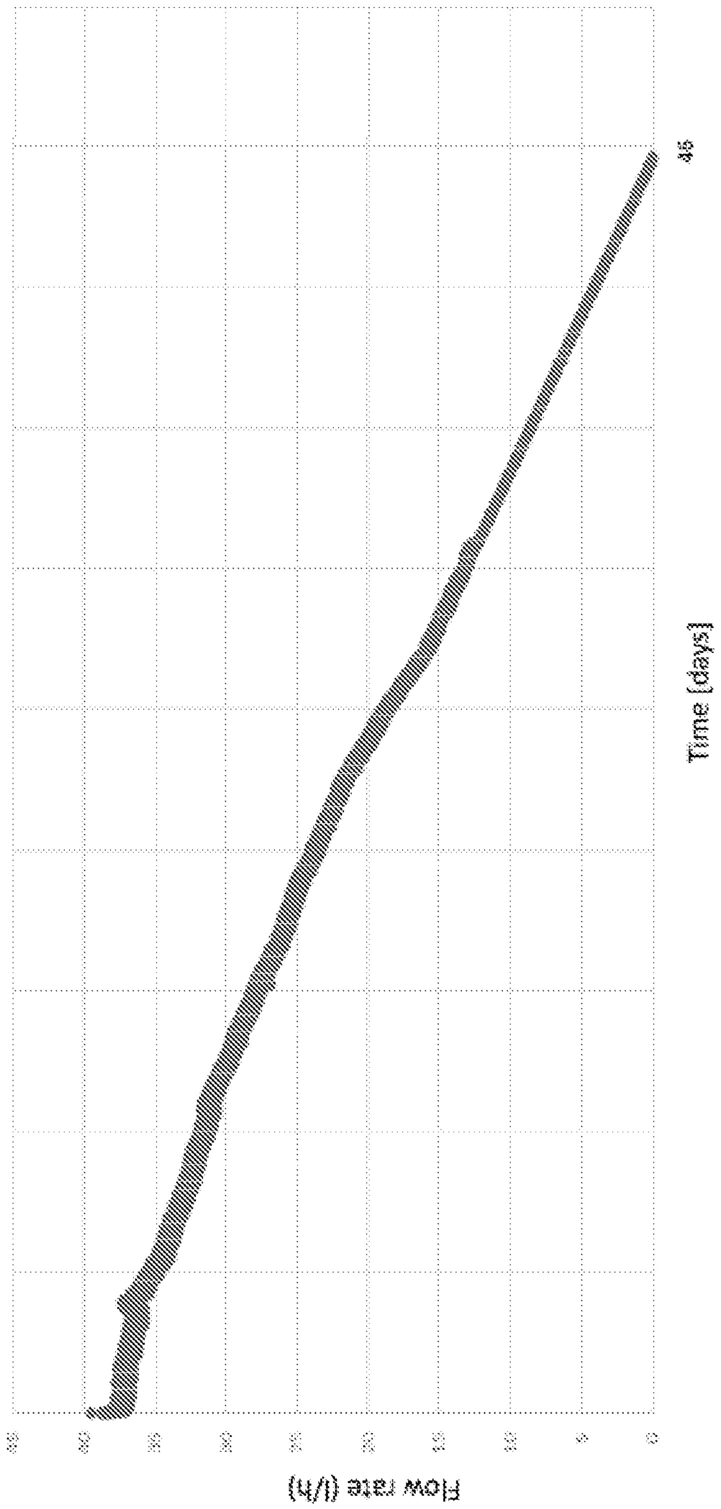
FIG. 10 depicts the evolution of flow over time for Mix H over 46 days.

Decrease of Flow over Time: The evolution of flow over time for Mix A and Mix H is reported in FIGS. 9 and 10.

Figure 11:
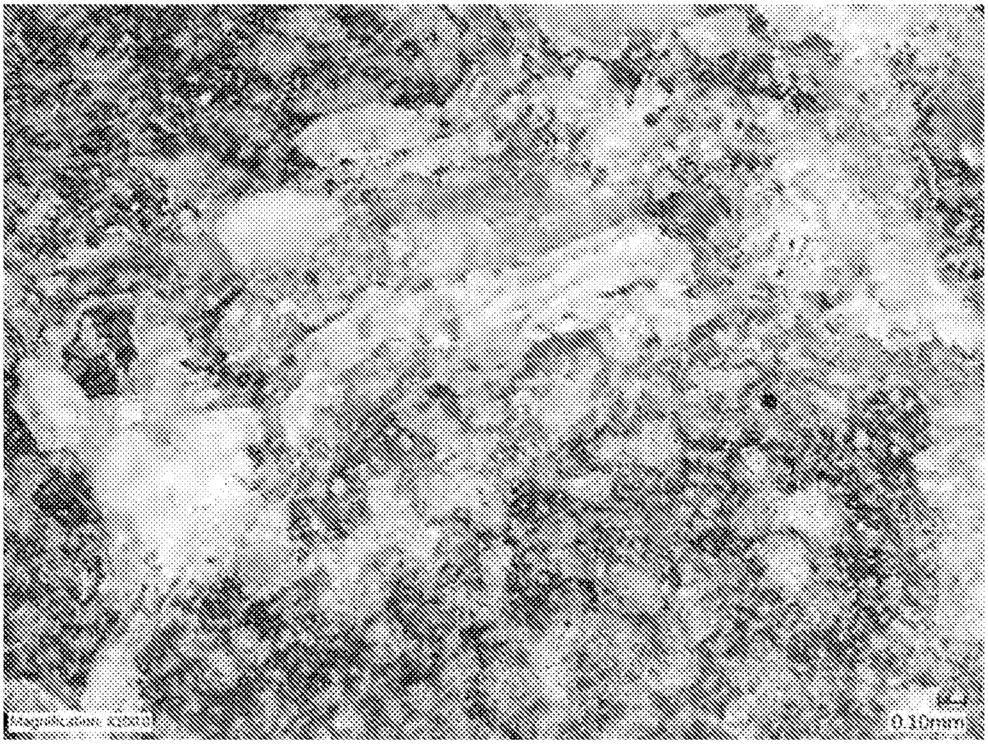
FIG. 11 depicts the discontinuous growth of white calcite globular crystals on the crack's wall.
Figure 12:
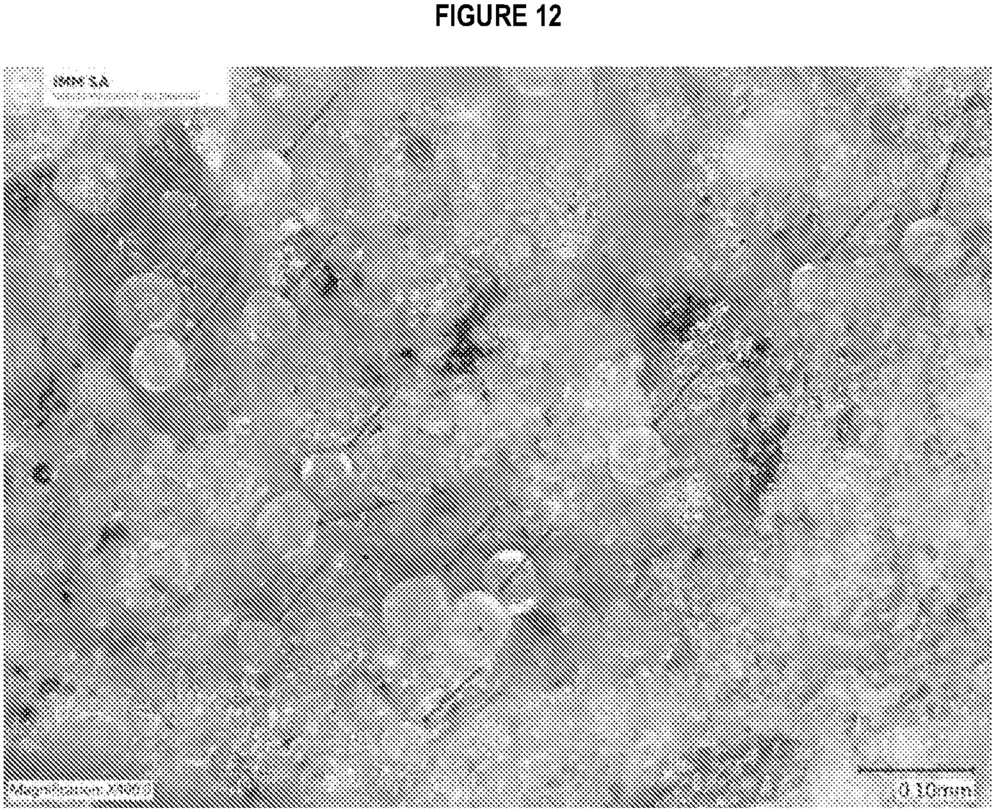
FIG. 12 depicts the continuous growth of white calcite globular crystals on the crack's wall.

Newly Formed Crystals and Coverage Ratio: The typical appearance of a crack's wall for Mix A at the end of the test is shown in FIG. 11. The typical appearance of crack's wall for mix H at the end of the test is shown in FIG. 12. The coverage ratios for mix A and H at the end of the test are reported in Tables 4 and 5.

TABLE 4

Coverage Ratio of Mix A

| Magnification | Total Area of the region [mm$^2$] | Total Area with crystals [mm$^2$] | Coverage ratio |
|---|---|---|---|
| 200 X | 4.17 | 2.63 | High |
| 200 X | 4.17 | 2.47 | High |
| 200 X | 4.17 | 1.65 | Low |
| 200 X | 4.17 | 1.87 | Low |
| Average | 4.17 | 2.16 | High |

TABLE 5

Coverage Ratio of Mix H

| Magnification | Total Area of the region [mm$^2$] | Total Area with crystals [mm$^2$] | Coverage ratio |
|---|---|---|---|
| 200 X | 4.17 | 3.09 | Very High |
| 200 X | 4.17 | 3.60 | Very High |
| 200 X | 4.17 | 2.84 | High |
| 200 X | 4.17 | 3.16 | Very High |
| Average | 4.17 | 3.17 | Very high |

Figure 13:
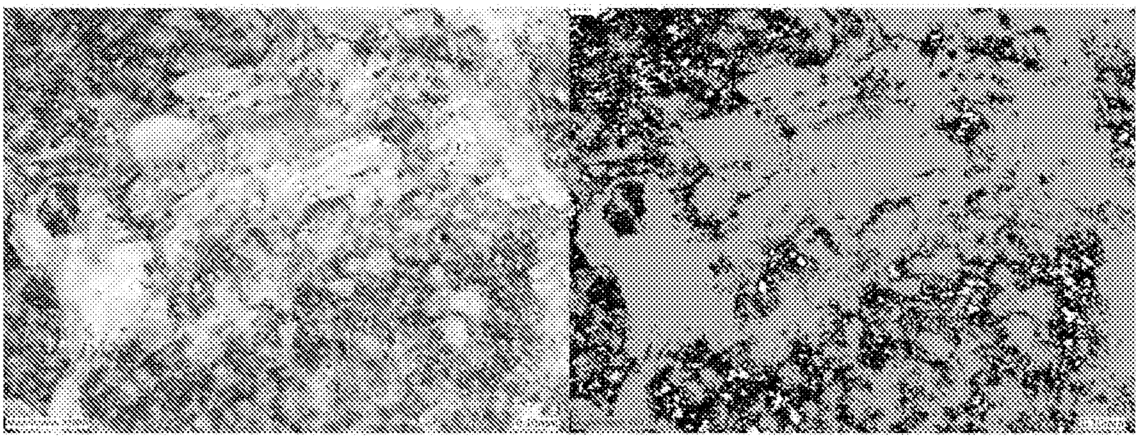
FIG. 13 depicts an example of image analysis for Mix A used for coverage ratio.
Figure 14:
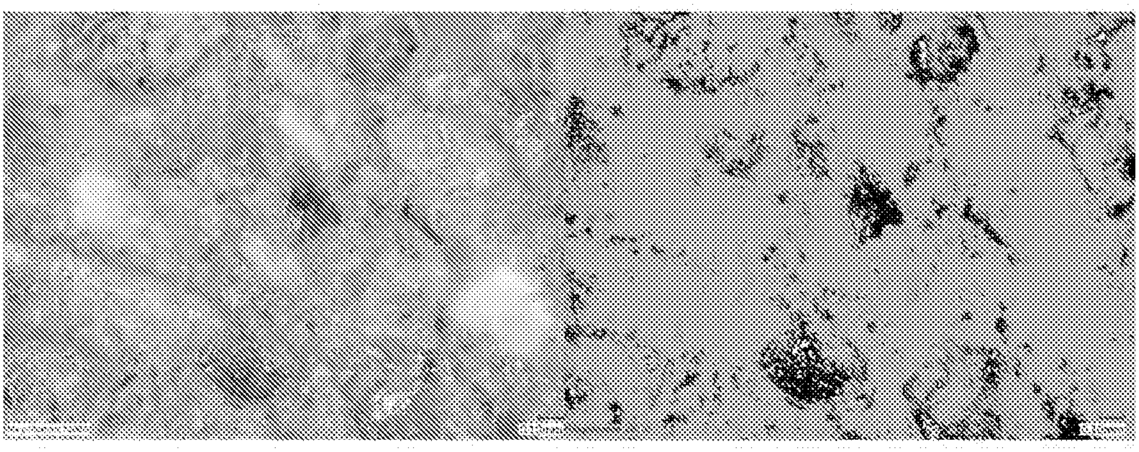
FIG. 14 depicts an example of image analysis for Mix H used for coverage ratio.

An example of image analysis used for calculating the coverage ratios is given in FIG. 13 for Mix A and in FIG. 14 for Mix H.

The rating given here is based on the ranges reported in Table 6 below.

TABLE 6

Rating of Coverage Ratios

| Visual rating scale: | [%] |
|---|---|
| Very high | 70-100 |
| High | 50-70 |
| Low | 20-50 |
| Poor | 10-20 |
| Absent | 0-10 |

Table 7 reports the evaluation of results based on the criteria defined in the Evaluation of Results section above.

TABLE 7

Evaluation of Results of Self-Healing of Concrete Mixes A and H

| | Mix A | Mix H |
|---|---|---|
| Day start/finish | 19 Apr. 2020/ 1 Jun. 2020 | 3 May 2020/ 18 Jun. 2020 |
| 1. Average surface crack width as measured optically at the beginning of the test | 0.50 mm | 0.50 mm |

TABLE 7-continued

| Evaluation of Results of Self-Healing of Concrete Mixes A and H | | |
|---|---|---|
| | Mix A | Mix H |
| 2. Final reading of flow in steady conditions (litres/h) | 0.0 | 0.0 |
| 3. More than 70% coverage by crystals | FALSE | TRUE |
| 4. Between 50% and 70% coverage by crystals | TRUE | TRUE |
| 5. Less than 50% coverage by crystals | FALSE | FALSE |
| 6. Residual nominal crack's width calculated at the end of the test (mm) | 0.0 | 0.0 |

Results of Accelerated Carbonation of Concrete Mixes: Because the addition of quick lime into a cementitious system increases the free lime content of concrete, and because free lime is responsible, keeping all other factors constant, of the carbonation rate of concrete, mixes A, B, C, D, H, and control have been subjected to the accelerated carbonation test according to the Swiss SIA 262/1-1 standard.

Test Conditions for the Carbonation Test: In this test, samples are subjected to a target concentration of carbon dioxide (4.0%) ten times larger than the average atmospheric concentration (0.4%) with target temperature of 20 °C, and target R.H. of 57% for 63 days and the carbonation front is measured at 0-day, 7-day, 28-day and 63-day.

Results for the accelerated carbonation test ($K=mm/\sqrt{t}$) are reported in Table 8 below.

TABLE 8

Results of the accelerated carbonation test

| MIX | CEM I | FLY ASH | CaO (0.5-1.5) | CaO (1.5-2.5) | CaO (2.5-3.5) | WATER | SPL* | RET** | SAND | 4/8 mm | 8/16 mm | $K = mm/\sqrt{t}$ |
|---|---|---|---|---|---|---|---|---|---|---|---|---|
| Control | 280 | 120 | 0 | 0 | 0 | 180 | 4.8 | 0 | 791 | 176 | 791 | 1.96 |
| A | 280 | 120 | 20 | 0 | 0 | 180 | 4.8 | 0 | 784 | 174 | 784 | 1.71 |
| B | 280 | 120 | 40 | 0 | 0 | 180 | 4.8 | 3.2 | 777 | 173 | 777 | 2.10 |
| D | 280 | 120 | 0 | 20 | 0 | 180 | 4.8 | 0 | 784 | 174 | 784 | 5.03 |
| H | 280 | 120 | 0 | 0 | 40 | 180 | 4.8 | 3.2 | 777 | 173 | 777 | 3.14 |

TABLE 7-continued

| Evaluation of Results of Self-Healing of Concrete Mixes A and H | | |
|---|---|---|
| | Mix A | Mix H |
| 7. Nature of product of precipitation in cracks | Calcite | Calcite |
| 8. Rating | PASS | PASS |
| 9. Classification of self-healing | CHEMICALLY AND PHYSICALLY DOMINATED | CHEMICALLY DOMINATED |

Commentary to the Results of Self-Healing: The results obtained for the self-healing tests show in both mixes formation of new crystal phases (calcite mainly) as a result of precipitation of $CaCO_3$ after reaction between free lime (CaO) artificially introduced in the system and carbon dioxide ($CO_2$) dissolved in mineral water. However, for comparison purposes with best in class products working largely on chemically dominated mechanisms, mix H (with 40 kg/$m^3$ of 2.5-3.5 mm CaO) showed a prevailing chemically dominated mechanism of sealing which, per definition, is non-reversible when concrete is above water.

Mix A (with 20 kg/$m^3$ of 0.5-1.5 mm CaO) seems conversely to work more with a combined effect of the notorious expansion provided by excess free lime and precipitation of newly formed phases. This process may be partly reversible once concrete is in the dry.

This means that, while mix H has the potential for a self-healing process requiring water to activate but lasting also when water is removed, mix A might slightly shrink back after water is removed causing the self-healed crack to partially re-open.

The implication of the above, if this behaviour is confirmed, is that, while mix A could only be suitable for structures permanently submerged in water, mix H could be suitable for concrete cyclically exposed to wet/dry cycles.

Commentary to the Carbonation Test: For 50 years service life, Swiss standard SIA 262/1: 2019 requires the coefficient of accelerated carbonation of concrete to be less than 4.50 $mm/\sqrt{t}$.

These results demonstrate that, except for mix D, the coefficient of carbonation of concrete with quick lime has not been negatively affected by the excess free lime, with mix A and B noticeably very close to the value of the control mix.

Results of Compressive Strength of Concrete Mixes: Compressive strength of Mix H was determined in accordance with SN EN 12390-3 on 150×150×150 mm cubes. The results are reported in Table 9 below.

TABLE 9

Compressive Strength Test Results

COMPRESSIVE STRENGTH TEST RESULTS - MIX H

| 7 days results (MPa) | | | 28 days results (MPa) | | |
|---|---|---|---|---|---|
| 25.0 | 28.0 | 31.0 | 35.5 | 40.0 | 45.0 |
| Mean value and Standard deviation (MPa) | | | | | |
| 28.0 ± 3.0 | | | 40.2 ± 4.8 | | |

Commentary to the Compressive Strength test: These results demonstrate that the addition of quick lime did not have a negative effect on the compressive strength of Mix H. In fact, the average compressive strength at 28 days was comparable to similar grades of concrete cast without the addition of quick lime.

Example 2: Summary of Heat of Hydration Test Results on Mortars Containing Quicklime This example demonstrates the results of heat hydration tests of eight mortar mixtures.

All components used in the testing conform to the relevant EN standards, namely:

a) CEM I 42.5 N—conforming to EN 196;
b) Fly ash—conforming to EN 450 with fineness as in FIG. 30;
c) Superplasticizer/Retarder—conforming to EN 934; and
d) Aggregates—conforming to EN 12620.

Quicklime used in the testing has a CaO content of about 96.9% and was reduced to the desired particle size by means of laboratory crushing and sieving.

Eight mortar mixes were produced, each one containing a different dosage of quicklime (Table 10). The particle size of quicklime ranged between 2.5 and 3.5 mm. The material was added to the mortar in dry form and mixed together with the other dry ingredients, before adding water and liquid admixture(s). For each mortar mix, a visual inspection was carried out in both the fresh and the hardened state in order to assess the presence of potential defects such as, for instance, excessive stiffness, lack of cohesion, cracking and swelling. Subsequently, based on the results of the visual inspection, a mortar flow test was carried out in order to determine the workability of each mix. Finally, heat of hydration tests were carried out on some selected mixes which exhibited satisfactory performances during visual inspection and workability tests. For this test, mortar mixes were poured in 150×150 mm polystyrene cubes where a thermocuple was previously embedded.

meaning that concrete in service would be subjected to very high thermal gradients within limited thickness (500 mm for a 1000 mm thick member), with increased risk of uncontrolled thermal cracking when the tensile strength of concrete is still very low. FIGS. 16A and 16B show a summary of test results for new mixes.

Because the maximum temperature a member can reach in-situ is set worldwide to 70 °C-75 °C, to prevent deleterious destabilization of ettringite during cement hardening and consequent expansion with water in service to cause internal sulphate attack, and because the rate of thermal gain should be such to minimize internal stresses, none of the options above would be applicable to mass concrete structures. Considering that 40 kg/m$^3$ CaO gave 40 °C, peak temperature in the completed testing program on a 150 mm cube, while 90 kg/m$^3$ gave 50 °C, in this testing program corresponding to not less than 80 °C, in a real structure, these results suggest that 40 kg/m$^3$ is the maximum content expected to remain within 70 °C, peak temperature in mass concrete.

Finally, removal of PFA and use of 100% OPC would increase heat of hydration by roughly 25%, keeping all other factors constant, meaning that the mix with 90 kg/m$^3$ CaO would heat up to more than 100 °C, for a 1000 mm thick concrete member and the mix with 40 kg/m$^3$ CaO would reach about 90 °C, for the same thickness.

TABLE 10

Mortar Mixes

| MORTAR MIX | CEM I | FLY ASH | CaO (0.5-1.5 mm) | CaO (1.5-2.5 mm) | CaO (2.5-3.5 mm) | WATER | SPL* | SAND |
|---|---|---|---|---|---|---|---|---|
| L | 280 | 120 | 0 | 0 | 90 | 180 | 20 | 1683 |
| M | 280 | 120 | 0 | 0 | 120 | 180 | 20 | 1653 |
| N | 280 | 120 | 0 | 0 | 150 | 180 | 20 | 1623 |
| O | 280 | 120 | 0 | 0 | 340 | 180 | 20 | 1433 |
| P | 280 | 120 | 0 | 0 | 540 | 180 | 20 | 1233 |
| Q | 460 | 80 | 0 | 0 | 340 | 269 | 0 | 1000 |
| R | 460 | 80 | 0 | 0 | 340 | 269 | 20 | 1000 |
| S | 280 | 120 | 0 | 0 | 200 | 180 | 20 | 1600 |

Results

Mixes containing 340 kg/m$^3$ and above of calcined lime/quicklime (namely, mixes O, P, Q and R) turned out to be poorly workable and, most importantly, exhibited very low surface hardness in the hardened state.

Mix S, containing 200 kg/m$^3$ of quicklime exhibited a fairly good workability in the fresh state but exhibited very low surface hardness in the hardened state.

Mixes (L, M, and N) containing 150 kg/m$^3$ of quicklime or less (90 kg/m$^3$ and 120 kg/m$^3$) exhibited a fairly good workability and a good cohesion in the hardened state, making them theoretically suitable for practical applications.

Figure 15:
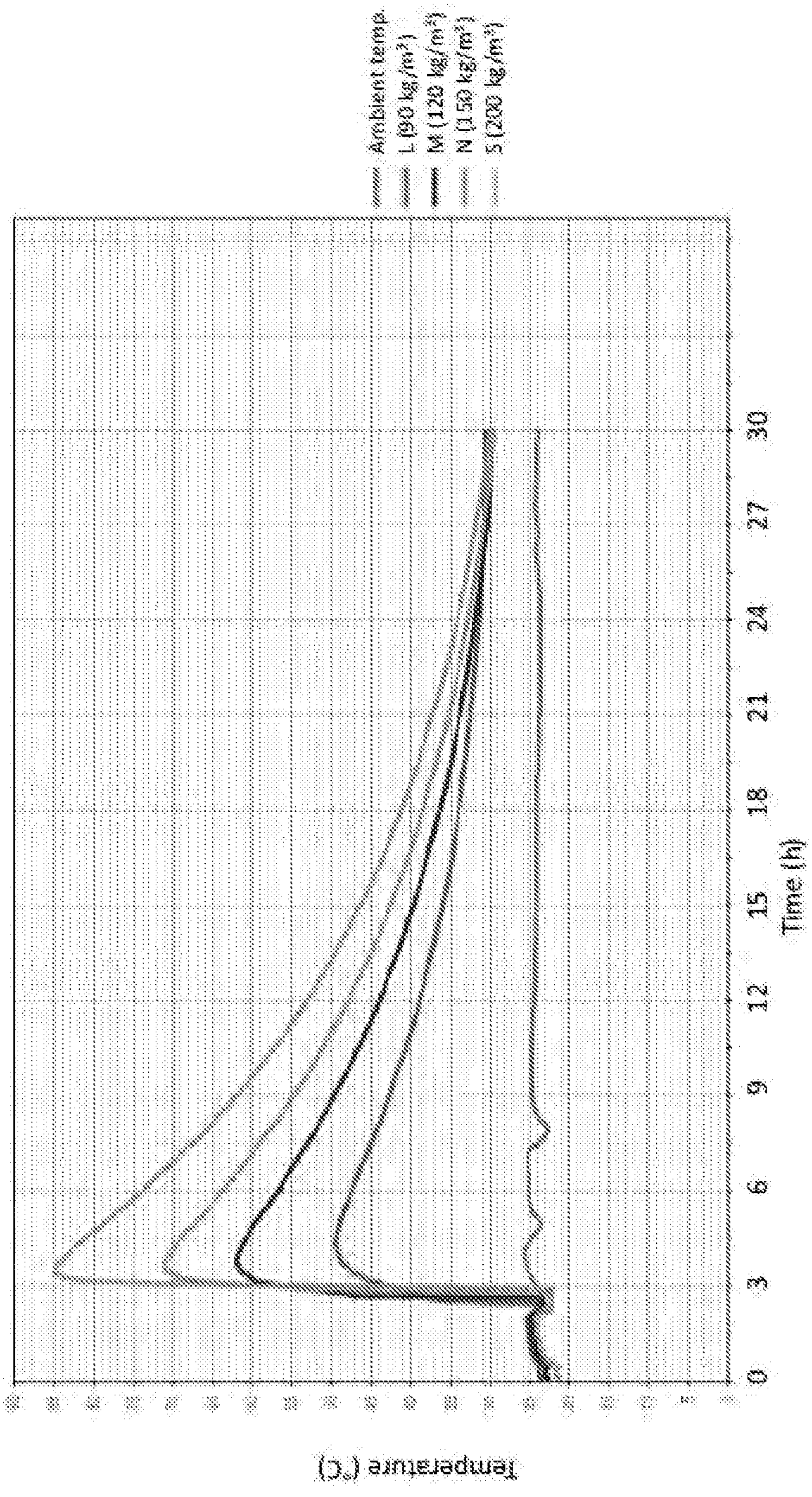
FIG. 15 depicts heat of hydration results. The order of curves, top to bottom, at X-axis point 15:00 h is mix S, mix N, mix M, mix L, and control.

However, heat of hydration tests demonstrated that the peak temperature of mix with 90 kg/m$^3$ lime is 50 °C, corresponding roughly to 27 °C, semi-adiabatic rise (FIG. 15). Given that ordinary concrete is delivered on average at 20-25 °C, this result indicates that a mass concrete structure (such as a foundation, retaining wall, pile, pier, column, etc.) of 1000 mm thickness would achieve not less than 80 °C-85 °C (50 °C, in a 150 mm cube at initial temperature of 23 °C-80 °C, in a 1000 mm member cast with concrete at 23 °C, for instance). The rise of heat of hydration in the first hours is extremely rapid based on the higher the lime content, These results suggest that a useful range of CaO is between 20 kg/m$^3$ and 100 kg/m$^3$, or between 40 kg/m$^3$ and 50 kg/m$^3$, and in combination with PFA as a partial cement replacement for mass concrete, or with 100% OPC for thin members. In some embodiments, the maximum amount of CaO is determined based on the total volume of concrete. In some embodiments, the thin members include up to 300 mm walls and decks, or precast slender elements only. These results also suggest that beyond 100 kg/m$^3$ of lime, peak temperature of real structures of any thickness to be too high, even with the addition of fly ash. Below 20 kg/m$^3$ self healing properties are not fully displayed.

Example 3: Comparison of Self-Healing Properties of Two Concrete Mixes Containing Quicklime This example demonstrates the results of the self-healing tests carried out on two concrete mixes containing quicklime.

All components used in the testing conform to the relevant EN standards, namely:

a) CEM I 42.5 N—conforming to EN 196;
b) Fly ash—conforming to EN 450 with fineness as in FIG. 30;
c) Superplasticizer/Retarder—conforming to EN 934; and
d) Aggregates—conforming to EN 12620.

Quicklime used in the testing has a CaO content of about 96.9% and was reduced to the desired particle size by means of laboratory crushing and sieving.

Sample 11525H (Mix H1)

This example demonstrates the results of the self-healing tests carried out on two concrete mixes containing quicklime.

This mix was made with 280 kg/m$^3$ of Ordinary Portland Cement (OPC), 120 kg/m$^3$ of Fly Ash and 40 kg/m$^3$ of quicklime with particle size ranging from 2.5 to 3.5 mm (Table 11). Quicklime was added to the mix in dry form and mixed together with the other dry ingredients, before adding water and the liquid admixtures.

Sample 11525G (Mix G0)—Discarded

This mix was designed to be made with 280 kg/m$^3$ of Ordinary Portland Cement (OPC), 120 kg/m$^3$ of Fly Ash and 40 kg/m$^3$ of quicklime with particle size ranging from 2.5 to 3.5 mm (Table 11), where:

a) the quicklime is mixed with an excess of water for 10 minutes to form a slurry;
b) the reaction product obtained with step a) is pre-mixed with the Fly Ash; and
c) the premixed product obtained with step b) is mixed with other dry ingredients, before adding the remaining water and the liquid admixtures.

The procedure was aborted, and the mix discarded, at step b) due to an excessive stiffness of the reaction product obtained with step b).

Sample 11525G (Mix G1)

Figure 20:
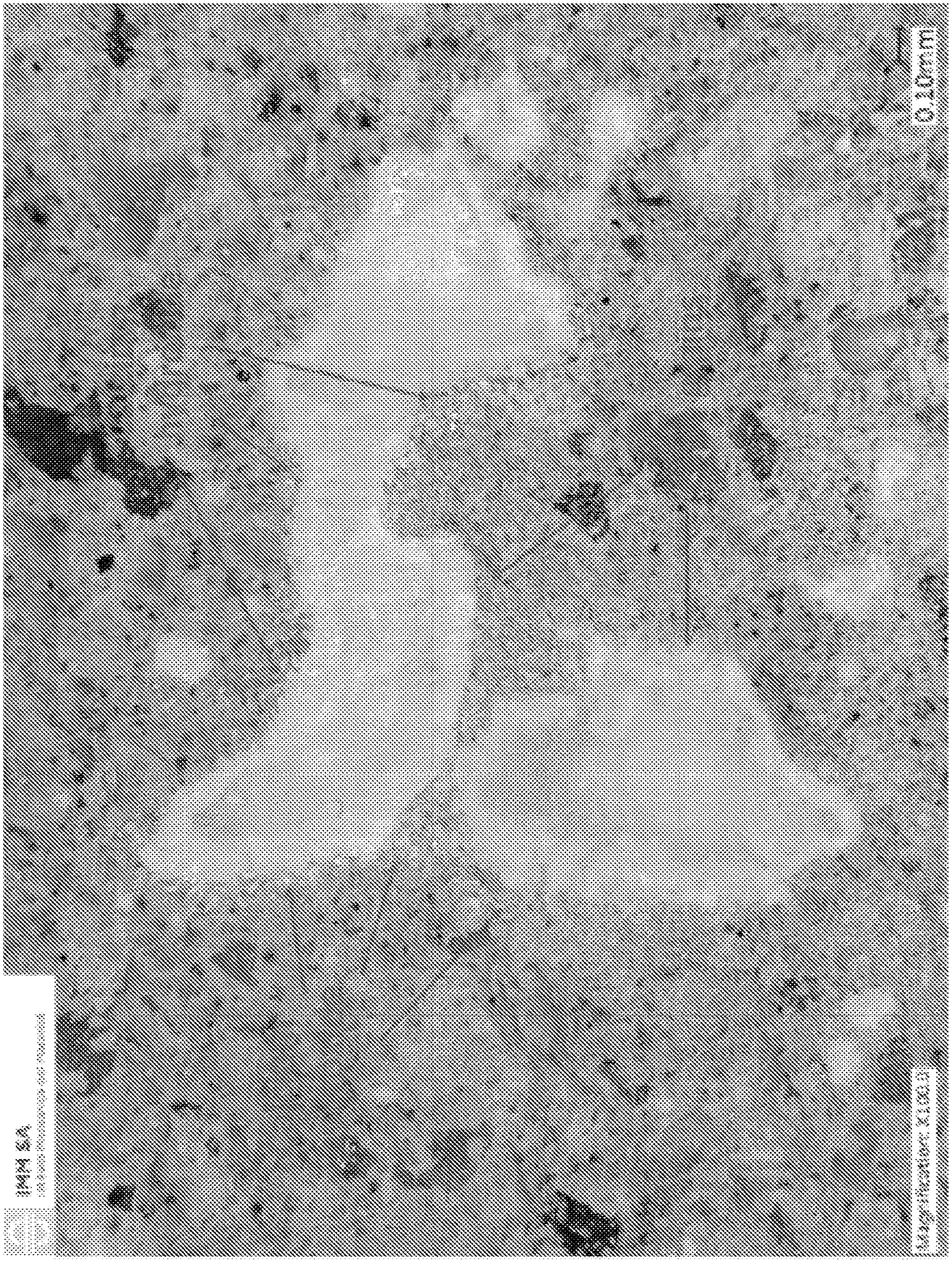
FIG. 20 depicts an image of Mix H1 at 100× magnification observed from the sealed section, and shows an example of quicklime grains with whiter reaction edges and amorphous "micro-globes" of calcium hydroxide.
Figure 21:
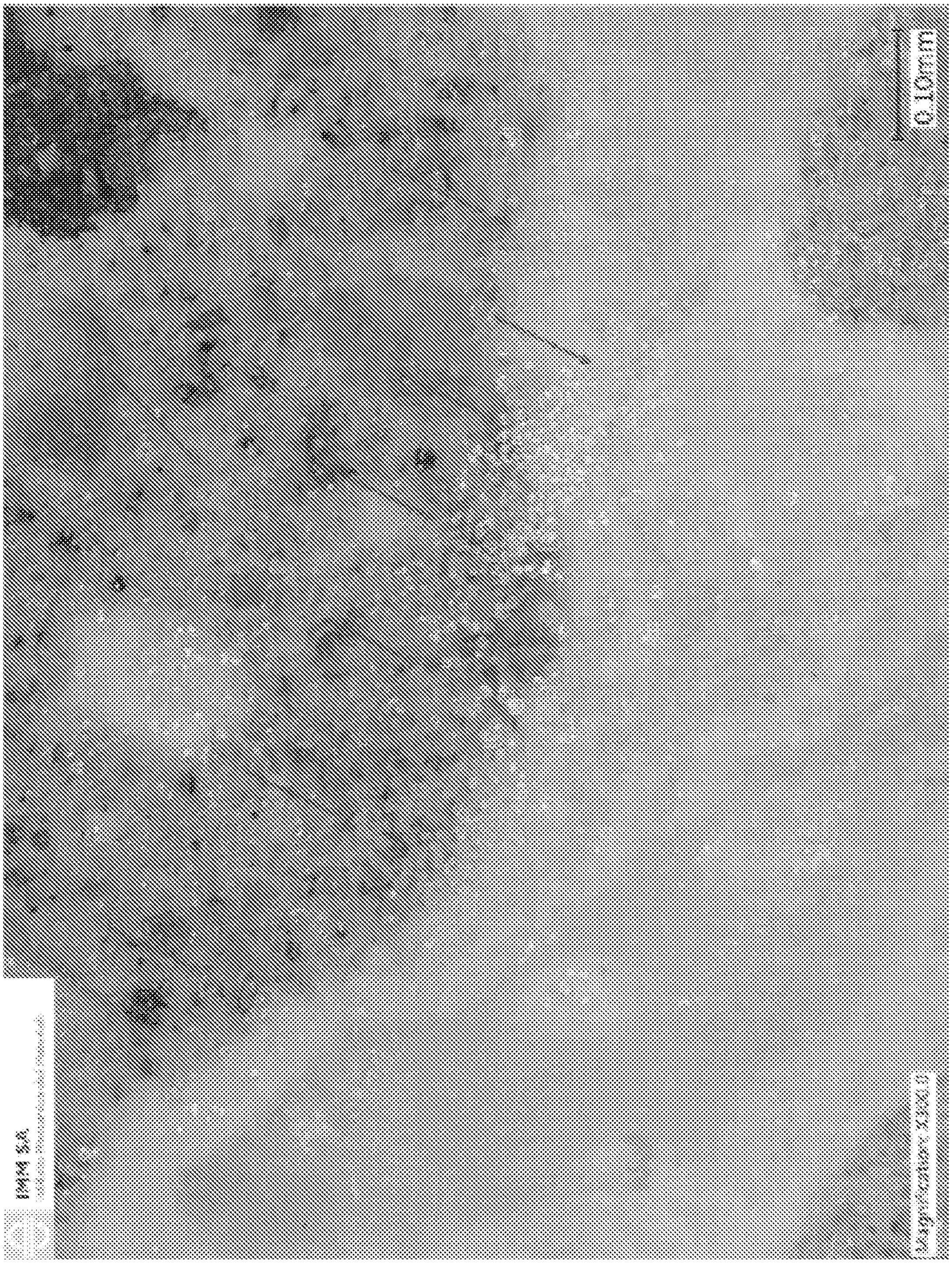
FIG. 21 depicts an image of Mix H1 at 300× magnification observed from the sealed section, and shows an example of amorphous "micro-globes" of calcium hydroxide.
Figure 22:
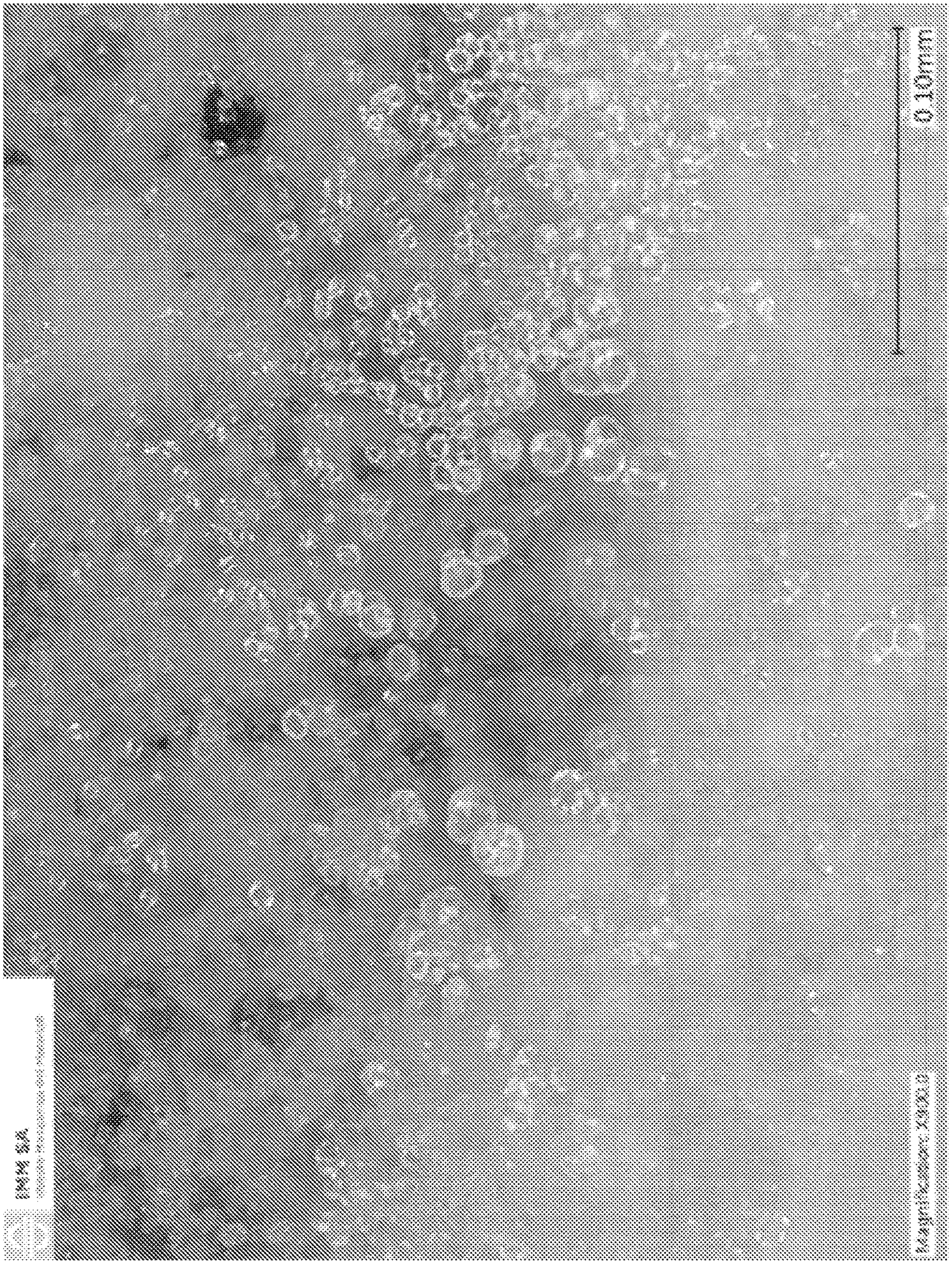
FIG. 22 depicts an image of Mix H1 at 900× magnification observed from the sealed section, and shows an example of amorphous "micro-globes" at very high magnification.

This mix was made with 280 kg/m$^3$ of Ordinary Portland Cement (OPC), 120 kg/m$^3$ of Fly Ash and 40 kg/m$^3$ of quicklime with particle size ranging from 2.5 to 3.5 mm (Table 11). Quicklime was first mixed with an excess of water for 10 minutes to form a slurry. The slurry was mixed with other dry ingredients, before adding the remaining water and the liquid admixtures.

in the grains of quicklime (compared to the darker inside) and calcium hydroxide is visible in the form of translucent amorphous “micro-globes” (dimensions range from 0.01 mm to 0.10 mm) near the edges and in the cement paste (FIGS. 20-22).

Figure 23:
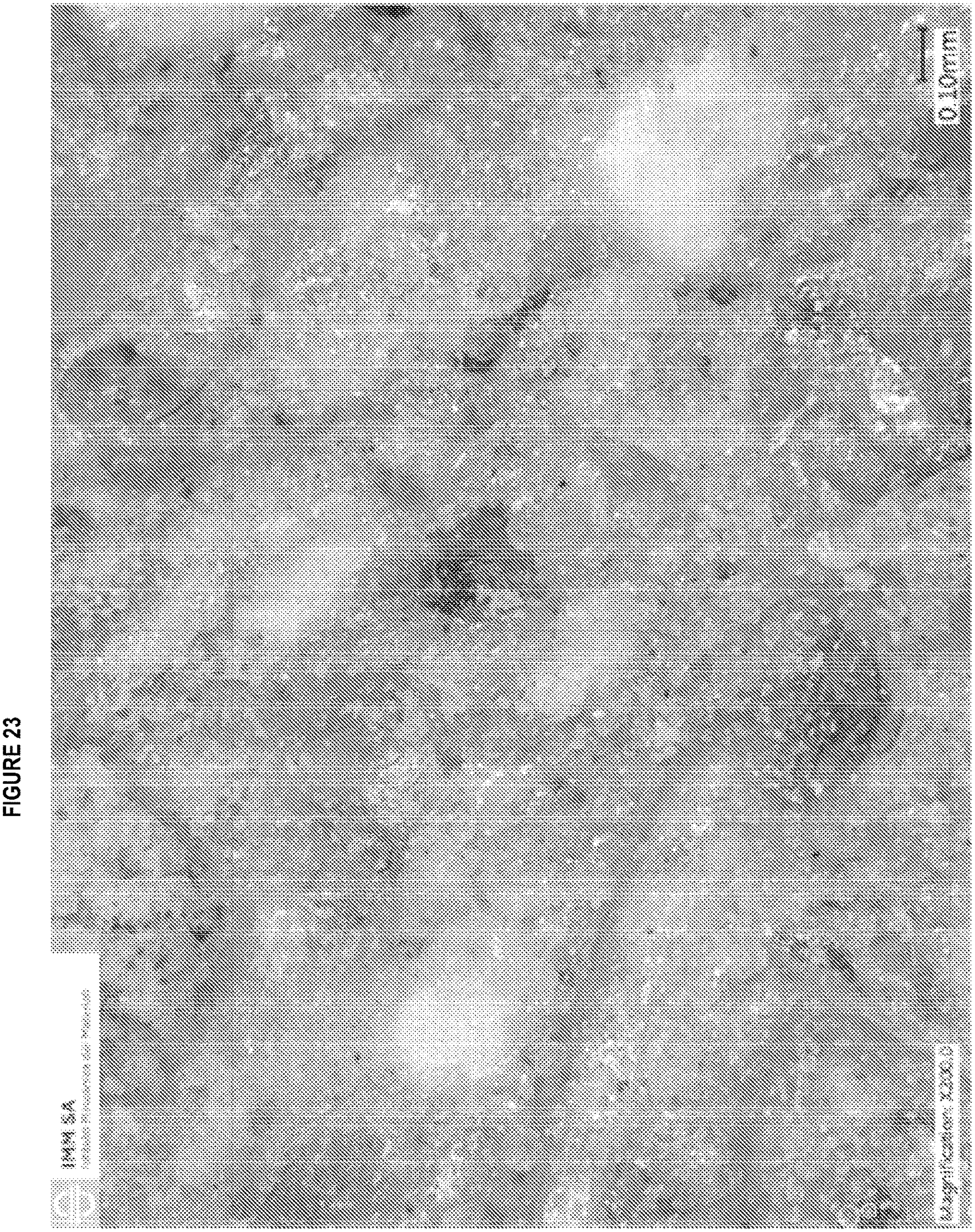
FIG. 23 depicts an image of Mix H1 at 200× magnification observed from the sealed section. The amorphous "micro-globes" covers homogeneously the cement paste.
Figure 24:
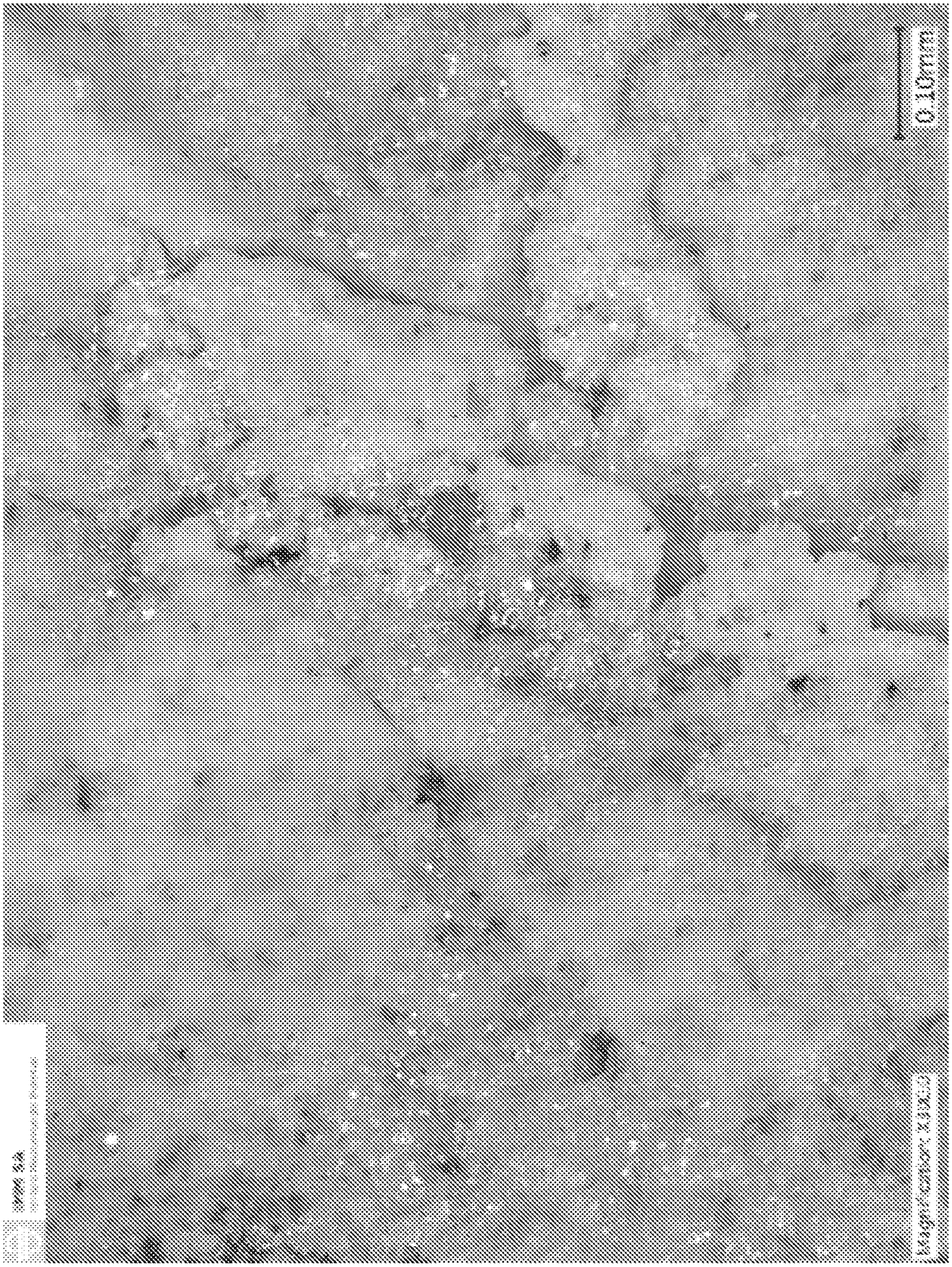
FIG. 24 depicts an image of Mix G1 at 300× magnification observed from the sealed section, showing the white mass covering the cement paste.
Figure 25:
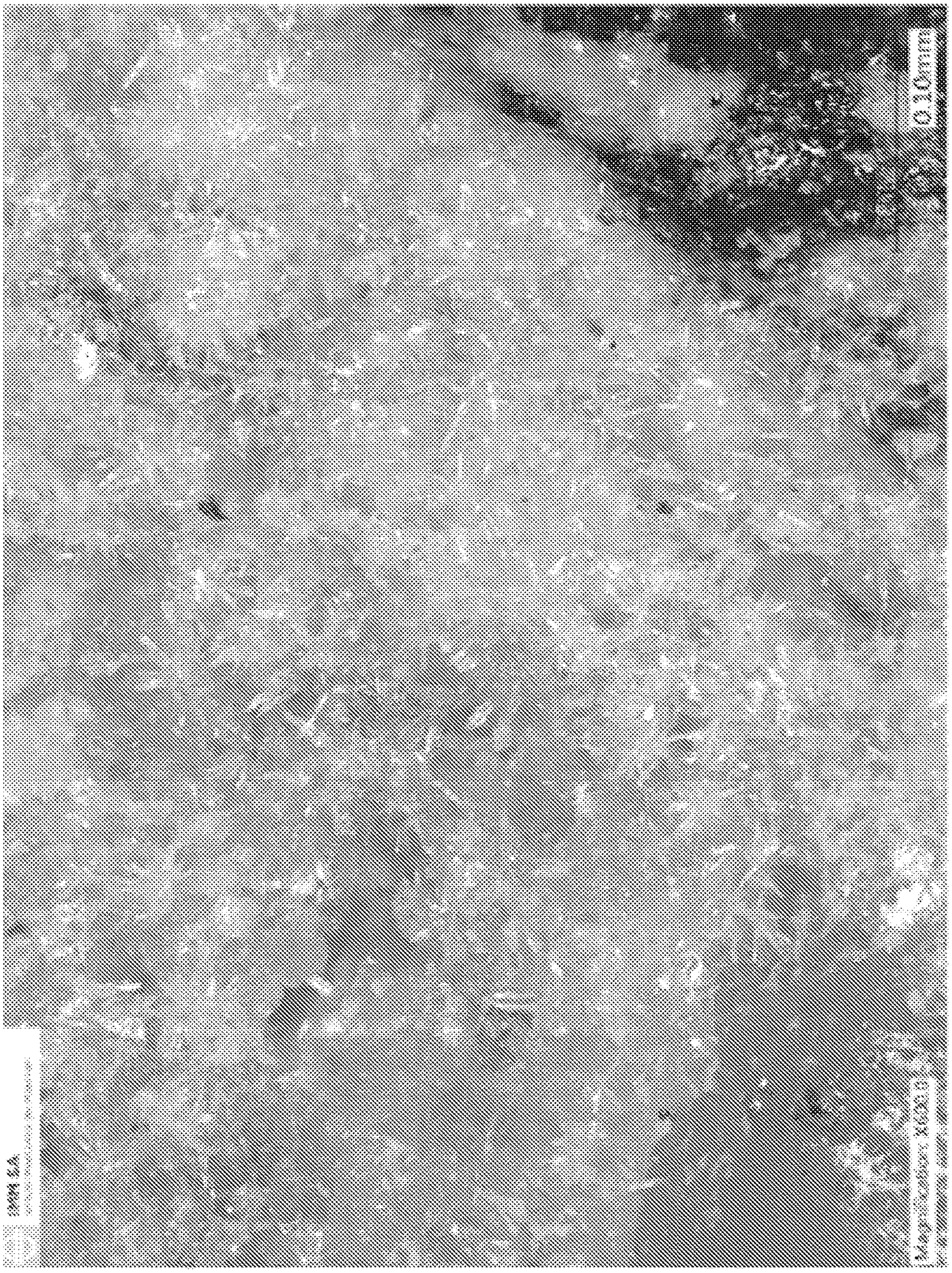
FIG. 25 depicts an image of Mix G1 at 600× magnification observed from the sealed section, showing an example of acicular crystals.
Figure 26:
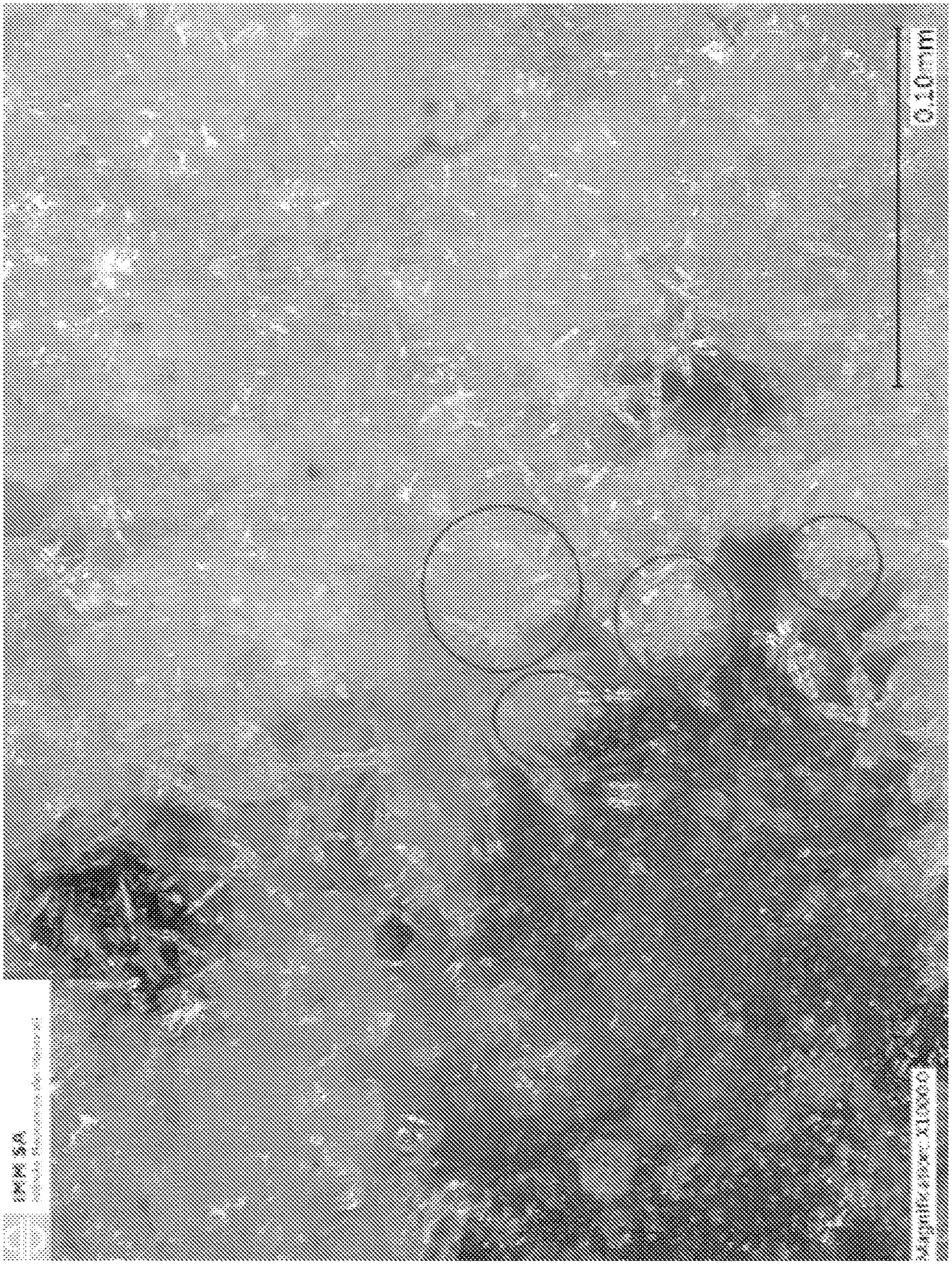
FIG. 26 depicts an image of Mix G1 at 1000× magnification observed from the sealed section. The red circles show "micro-globes" surrounded by acicular crystals.
Figure 27:
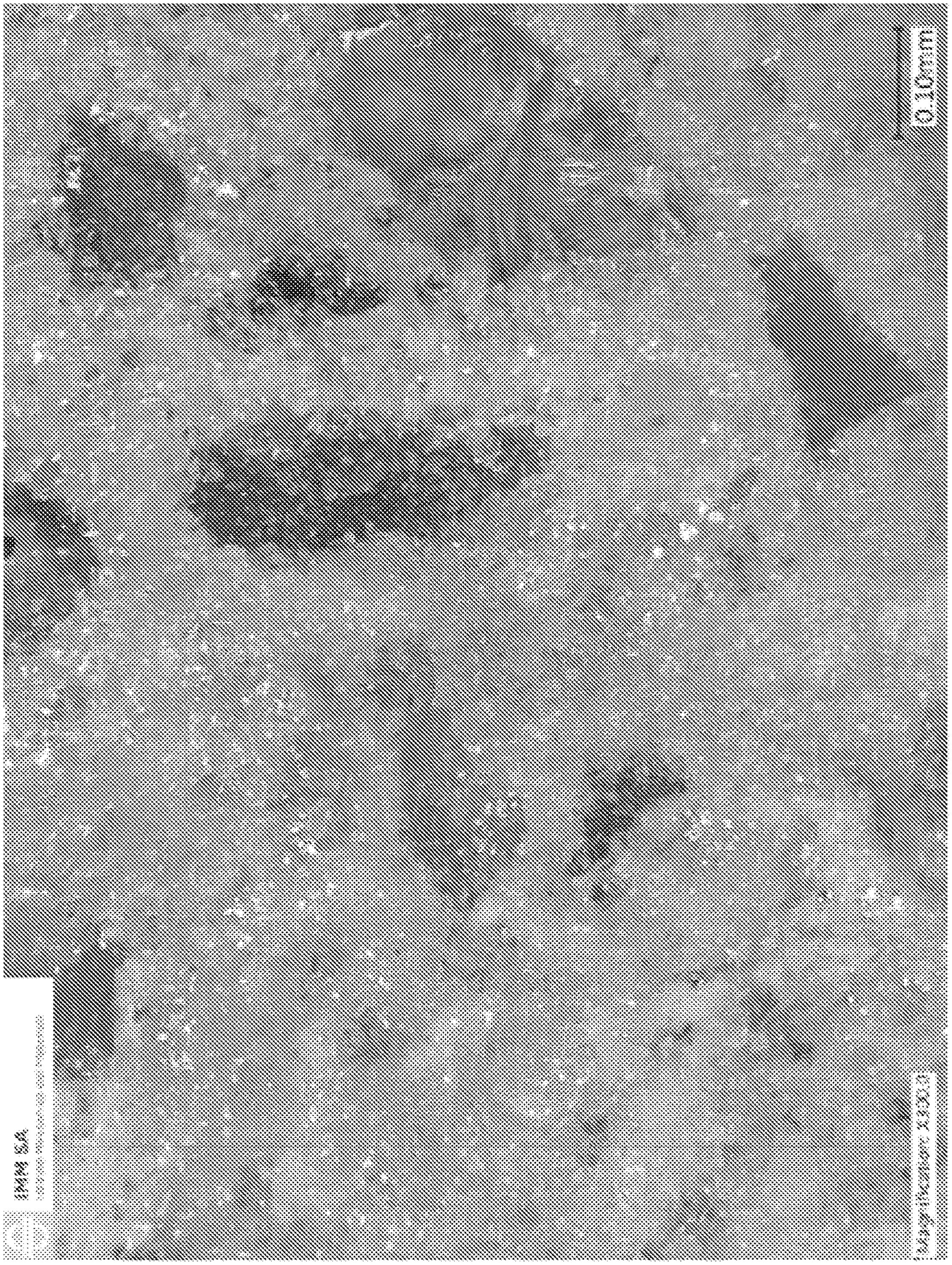
FIG. 27 depicts an image of Mix G1 at 300× magnification, showing cement paste covered homogeneously by reaction product observed from the sealed section.

Sample 11525G (Mix G1): In the slurry mix there are no visible calcined lime/quicklime grains in the cement paste. The reaction products (calcium hydroxide) are acicular translucent crystals, single crystals or united in “micro-globes” (dimensions of crystals range from 0.01 mm to 0.05 mm/“micro-globes” range from 0.02 to 0.06 mm) (FIG. 23). This crystals and “micro-globes” are visible as a white mass covering the cement paste (FIG. 24). In detail and in higher magnifications, the acicular crystals that make up the bottom mass are visible (FIG. 25). At higher magnification, “micro-globes” of acicular crystals are visible (FIG. 26). The reaction product in the form of acicular crystals and “micro-globes” covers the cement paste in a homogeneous and diffused way (FIG. 27).

Comparison Between Mix H1 (Quicklime in Grains) and Mix G1 (Slurry Quicklime Mix)

A comparison between the two mixes shows a clear difference in the crystal shape of the reaction product. The only common characteristic is the translucent colour.

In the mix H1 (dry quicklime), the reaction product is represented by amorphous “micro-globes” without any evidence of single crystals in any form inside it or around it. All these “micro-globes” seem to arise from calcined lime/quicklime crystals that have reacted with water and are forming the reaction product (mostly calcium hydroxide). Although not wishing to be bound by any particular theory, it is hypothesized that the quicklime reaction has not yet completed, and in fact lime crystals in a more advanced state of “reaction” than other crystals are seen.

In the slurry mix (Mix G1) the crystals are very well formed, acicular and only sometimes united in “micro-globes” but with the single shape always visible. It seems that the slurry mix is in a more advanced stage of crystals formation.

TABLE 11

| CONCRETE MIX | CEM I | FLY ASH | CaO (0.5-1.5 mm) | CaO (1.5-2.5 mm) | CaO (2.5-3.5 mm) | WATER | SPL* | RET** | SAND | 4/8 mm | 8/16 mm |
|---|---|---|---|---|---|---|---|---|---|---|---|
| H1 | 280 | 120 | 0 | 0 | 40 | 180 | 4.8 | 3.2 | 777 | 173 | 777 |
| G0 | — | 120 | 0 | 0 | 40 | q.b. | — | — | — | — | — |
| G1 | 280 | 120 | 0 | 0 | 40 | 180 | 4.8 | 3.2 | 777 | 173 | 777 |

Self Healing Tests

Figure 17:
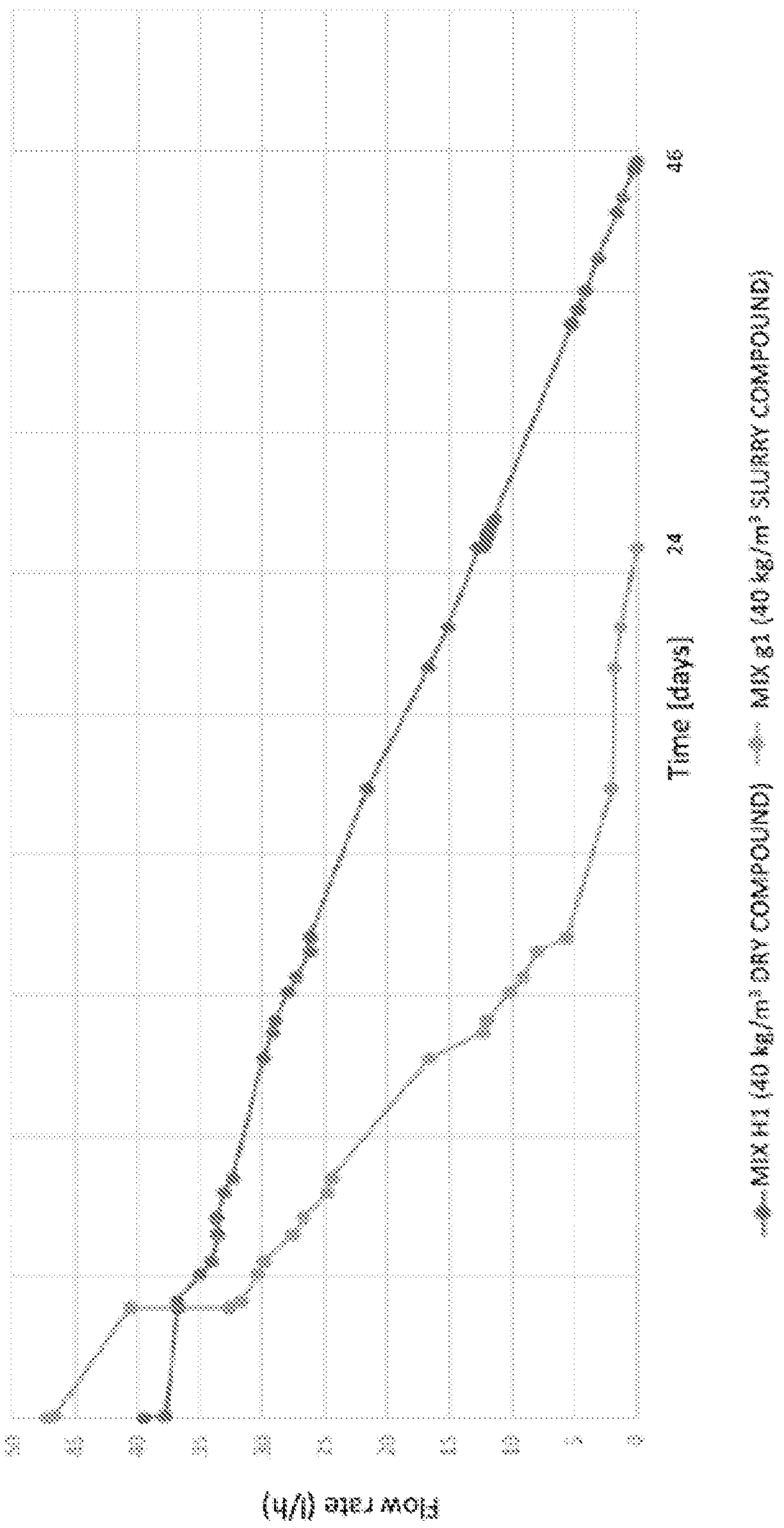
FIG. 17 depicts the flow rate versus time for mixes G1 (over 24 days) and H1 (over 46 days).

The tests consisted of subjecting a pre-cracked cylinder of concrete with diameter=height=100 mm to unidirectional flow of water from a reservoir under the action of gravity only, as described in Example 1. FIG. 17 shows the reduction of flow for the two mixes over time.

Microscope Observations of Mix H1 (Quicklime in Grains) and Mix G1 (Slurry Quicklime Mix)

Figure 18:
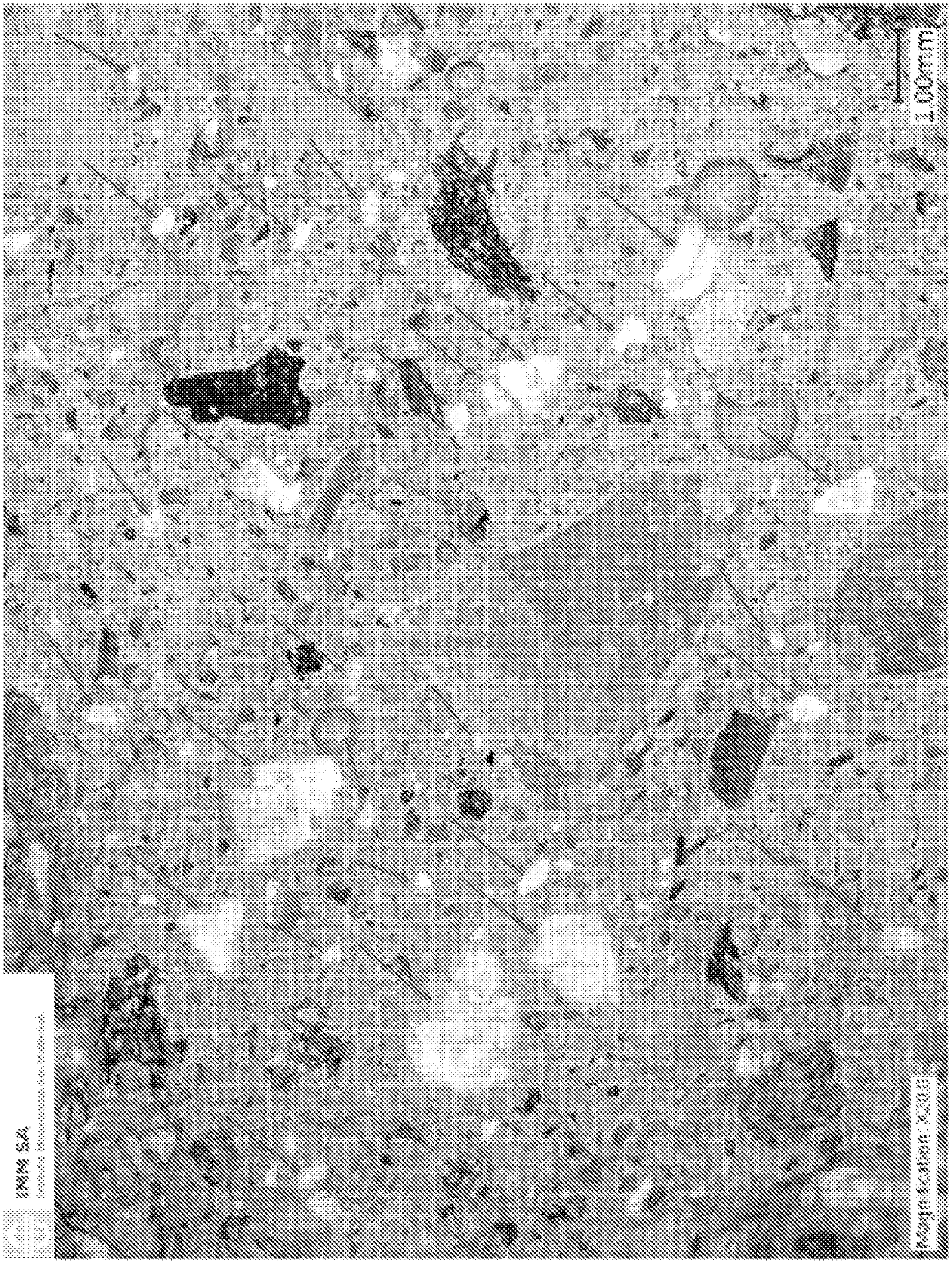
FIG. 18 depicts an image of Mix H1 at 20× magnification observed from the sealed section, and shows examples of quicklime grains (red arrows).
Figure 19:
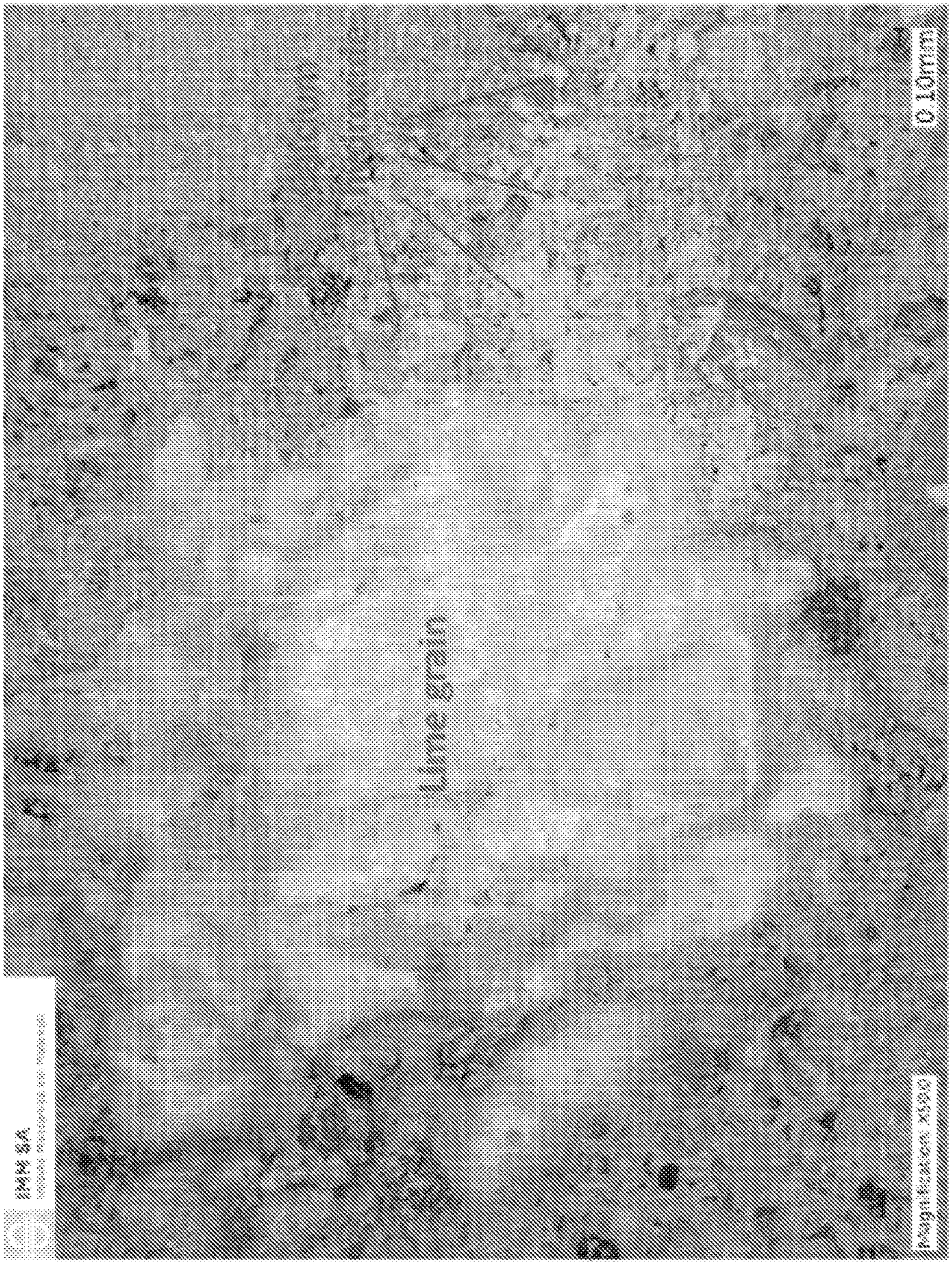
FIG. 19 depicts an image of Mix H1 at 50× magnification observed from the sealed section, and shows an example of quicklime grain which has reacted with water and formation of calcium hydroxide near it.
Figure 28B:
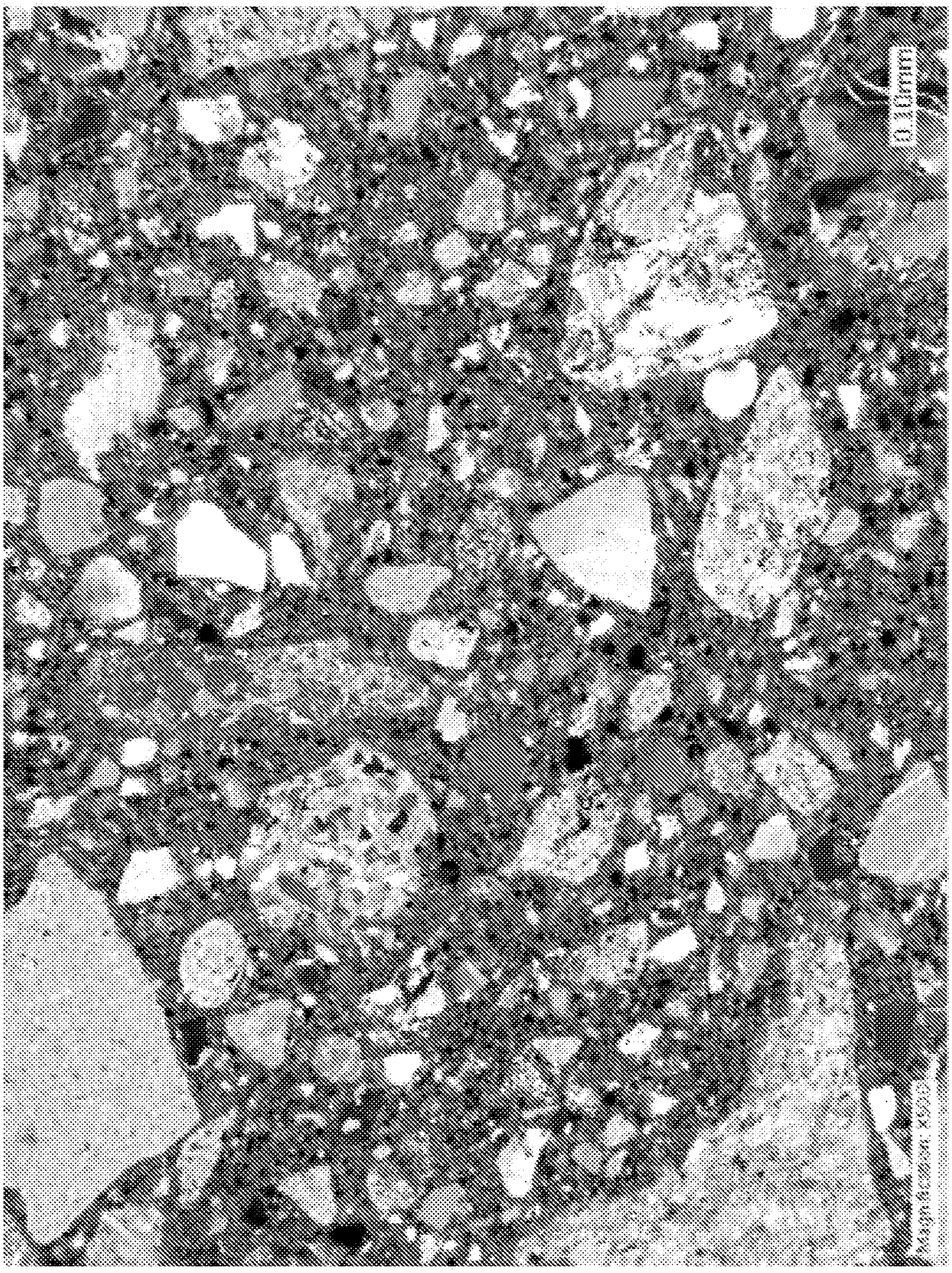
FIG. 28B depicts an image of Mix G1b at 50× magnification observed from a cut section, showing calcium oxide is not visible or absorbed in solid concrete.

Sample 11525H (Mix H1): Mix H1 presents clearly visible quicklime grains in the cement paste. The shape of grains is from sub-rounded to sub-angular and the size is from 2.5 mm to 0.3 mm (FIG. 18). In detail, it can be seen that the quicklime grains react with the mixture water and flow water resulting in the formation of calcium hydroxide. It is visible near the edges of the quicklime grains and in the cement paste (FIG. 19). Reaction edges (whiter) are visible In another comparison, calcium oxide is visible in the solid concrete in Mix H1 (FIG. 28A), but calcium oxide is not visible/absorbed in solid concrete in Mix G1 (FIG. 28B).

The percentage covering of the cement paste by the reaction product is from high to very high for both the slurry mix and the dry mix. In both cases, the self-healing process is chemically dominated.

Crystals from the slurry mix are similar in shape and diffusion to “best in class” products.

Example 4: Compound Dosages

Table 12 below lists concrete and mortar mixes prepared using the methods of the disclosure to highlight the relative dosages of the compound.

TABLE 12

Concrete and Mortar Mixes

| | MIX | Cements OPC kg/m3 | Cements PFA kg/m3 | CaO Size (0.5-1.5 mm) kg/m3 | CaO Size (0.5-1.5 mm) %-mass of (CEM + PFA) | CaO Size (1.5-2.5 mm) kg/m3 | CaO Size (1.5-2.5 mm) %-mass of (CEM + PFA) | CaO Size (2.5-3.5 mm) kg/m3 | CaO Size (2.5-3.5 mm) %-mass of (CEM + PFA) | WATER | Admixtures Plasticizer | Admixtures Retarder | Sand kg/m3 | Coarse Aggregates 4/8 mm kg/m3 | Coarse Aggregates 8/16 mm kg/m3 |
|---|---|---|---|---|---|---|---|---|---|---|---|---|---|---|---|
| Mortar | B | 280 | 120 | 40 | 10% | | | | | 180 | 10 | | 1729 | | |
| | C | 280 | 120 | 60 | 15% | | | | | 180 | 20 | | 1713 | | |
| | D | 280 | 120 | | | 20 | 5% | | | 180 | 20 | | 1745 | | |
| | E | 280 | 120 | | | 40 | 10% | | | 180 | 20 | | 1729 | | |
| | F | 280 | 120 | | | 60 | 15% | | | 180 | 20 | | 1713 | | |
| | G | 280 | 120 | | | | | 20 | 5% | 180 | 20 | | 1745 | | |
| | H | 280 | 120 | | | | | 40 | 10% | 180 | 20 | | 1729 | | |
| | I | 280 | 120 | | | | | 60 | 15% | 180 | 20 | | 1713 | | |
| Concrete | A | 280 | 120 | 20 | 5% | | | | | 180 | 4.8 | | 784 | 174 | 784 |
| | B | 280 | 120 | 40 | 10% | | | | | 180 | 4.8 | 3.2 | 777 | 173 | 777 |
| | D | 280 | 120 | | | 20 | 5% | | | 180 | 4.8 | | 784 | 174 | 784 |
| | H | 280 | 120 | | | | | 40 | 10% | 180 | 4.8 | 3.2 | 777 | 173 | 777 |

OPC: ordinary Portland cement
PFA: pulverized fuel ash
SCM: supplementary cementious material Example 5: Additional Mixes FIG. 29 lists examples of cementitious mixtures comprising quantities of a calcium compound and useful in concrete mixtures, wherein the dosage of the calcium compound is expressed as a percentage of the total binder content of the cementitious mixture. Examples in light green and green are preferred.

Example 6: Additional Testing

This example demonstrates the results of a laboratory study to define the effects of added compound, in different compositions, status, dosages, and grain sizes, on some key properties of concrete including compressive strength, capillary water absorption and drying shrinkage.

Concrete Mixes

Seven concrete mixes (B, H1, K; B1, B2, N,N1) each one including one of six different types of calcium compounds (CP1, CP2, CP4, CP5, CP6, CP7), have been prepared using the methods of the disclosure. One concrete mix (CONTROL) not including the compound was also prepared.

Table 13 below lists concrete mixes of Example 6, where values are expressed in kg/$m^3$ of concrete.

c) Superplasticizer/Retarder—conforming to EN 934; and d) Aggregates—conforming to EN 12620.

Compounds

Below is the list of compounds used in the concrete mixes:

CP1: Quicklime with content of CaO of about 96.9% and grain size comprised between 0.5 mm and 1.5 mm CP2: Quicklime with content of CaO+MgO equal or greater than 90% and with grain size comprised between 1 mm and 3 mm CP4: Quicklime with content of CaO of about 96.9% and grain size comprised between 2.5 mm and 3.5 mm CP5: Quicklime with content of CaO of about 96.9% mixed with an excess of water for 10 minutes to form a slurry CP6: Calcium hydroxide powder with content of $Ca(OH)_2$ greater than 91% and where 99.95% of grain size is lower than 0.2 mm

TABLE 13

Additional testing concrete mixes

| CONCRETE MIX | CEM I | FLY ASH | CP1 | CP2 | CP4 | CP5 | CP6 | CP7 | WATER | SPL* | RET** | SAND | 4/8 mm | 8/16 mm |
|---|---|---|---|---|---|---|---|---|---|---|---|---|---|---|
| CONTROL | 280 | 120 | — | — | — | — | — | — | 180 | 4.8 | 0 | 791 | 176 | 791 |
| B | 280 | 120 | 40 | — | — | — | — | — | 180 | 4.8 | 3.2 | 777 | 173 | 777 |
| H1 | 280 | 120 | — | — | 40 | — | — | — | 180 | 4.8 | 3.2 | 777 | 173 | 777 |
| K | 280 | 120 | — | — | 100 | — | — | — | 180 | 4.8 | 0 | 730 | 162 | 730 |
| B1 | 280 | 120 | — | — | — | 40 | — | — | 180 | 4.8 | 3.2 | 777 | 173 | 777 |
| B2 | 280 | 120 | — | 40 | — | — | — | — | 180 | 4.8 | 3.2 | 777 | 173 | 777 |
| N | 280 | 120 | — | — | — | — | — | 40 | 180 | 4.8 | 0 | 770 | 171 | 770 |
| N1 | 280 | 120 | — | — | — | — | 40 | — | 180 | 4.8 | 0 | 770 | 171 | 770 |

*superplasticizer;
**retarder

Components

All components used in the testing conform to the relevant EN standards, namely:

a) CEM I 42.5 N—conforming to EN 196;

b) Fly ash—conforming to EN 450;

CP7: Calcium hydroxide powder with content of $Ca(OH)_2$ equal or greater than 95% and where 93.6% of grain size is lower than 0.2 mm and 14.6% is lower than 0.063 mm.

Specimens Preparation

Concrete specimens of different concrete mixes were prepared in shape, size and number as per required by relevant SN EN and SIA standards listed in the testing procedures below.

For casting concrete mixes of CONTROL (C) the following procedure was used: dry ingredients were mixed before adding water and the liquid admixtures.

For casting concrete mixes of B, H1, K, B2, N, N1, the following procedure was used: compound was mixed with the other dry ingredients, before adding water and the liquid admixtures.

For casting concrete mixes of B1 the following procedure was used: compound was first mixed with an excess of water for 10 minutes to form a slurry. The slurry was mixed with other dry ingredients, before adding the remaining water and the liquid admixtures.

Testing Procedures

Key proprieties of concrete mixes have been determined by testing concrete specimens according to standard procedures, in particular:

a) compressive strength at 28 days was determined according to SN EN 12390-3, testing 3 samples of cubic specimens of 150 mm×150 mm×150 mm.
b) capillary water absorption was determined according to SIA 262-1/A, testing 5 samples of cylindric specimens with diameter of 50 mm and height of 50 mm where the result is the average.
c) drying shrinkage at 91 days was determined according to SIA 262-1/F, testing 2 samples of specimens in the form of prism of L=360 mm, W=120 mm, H=120 mm where the result is the average.

All standard procedures listed above are intended to be the valid year 2019 edition.

Results

Results of the tests are reported in Table 14 below:

TABLE 14

Additional testing results

| CONCRETE MIX | Compressive strength at 28 days SN EN 12390-3 Sample 1 [MPa] | Sample 2 [MPa] | Sample 3 [MPa] | Average [MPa] | Capillary water absorption SIA 262-1/A Average of 5 samples [g/(m2/h)] | Drying shrinkage SIA 262-1/F at 91 days Average of 2 samples [‰] |
|---|---|---|---|---|---|---|
| CONTROL (C) | 40.5 | 40.5 | 37.0 | 39.3 | 6.7 | 0.331 |
| B | 48.0 | 48.5 | 47.0 | 47.8 | 4.2 | 0.293 |
| H1 | 49.5 | 50.5 | 48.5 | 49.5 | 5.1 | 0.260 |
| K | 33.5 | 35.0 | 31.5 | 33.3 | 11.4 | 0.304 |
| B1 | 51.0 | 49.5 | 47.0 | 49.2 | 4.9 | — |
| B2 | 50.5 | 49.0 | 49.5 | 49.7 | — | — |
| N | 53.5 | 53.0 | 55.0 | 53.8 | 4.3 | — |
| N1 | 50.5 | 50.5 | 51.0 | 50.7 | — | — |

Figure 31:
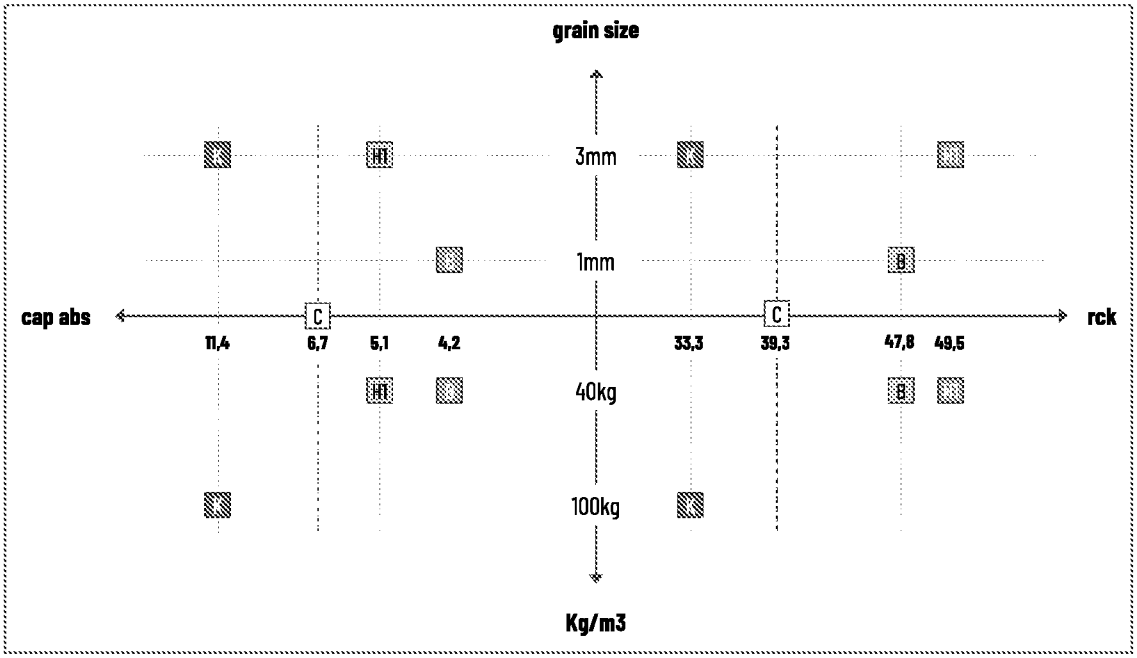
FIG. 31 depicts a chart showing experimental data related to concrete mixes of the disclosure with dry compounds in different grain size and dosage. The chart compares performances of some specimens of the disclosure casted with dry compounds in different grain size and dosage.

FIG. 31 compares some performances of concrete mixes casted with dry compounds in different grain size and dosage.

In particular, FIG. 31 shows performances of concrete mixes casted with dry compounds composed essentially of CaO (B, H1, K), and a concrete mix casted without compound named CONTROL (C), in relation to compressive strength at 28 days (tested according to SN EN 12390-3) and to capillary water absorption (tested according to SIA 262-1/A, with specimens age at exam starting date of 29 days). Concrete mixes including compounds have been casted with different dosage and different grain size of compound.

Concrete mixes H1 and B (both including 40 kg of compound) show augmented compression strengths in comparison to CONTROL (C), with the concrete mix casted with the coarser compound (H1) exhibiting the best performance. Concrete mix K (including 100 kg of compound) shows detrimental effect in comparison to CONTROL (C).

Concrete mixes H1 and B also show a reduced water capillary absorption, desired in ambient exposed to water or high humidity, in comparison to CONTROL (C), where the concrete mix casted with finer compound (B) exhibiting the best performance. Concrete mix K shows a detrimental effect in comparison to CONTROL (C).

Figure 32:
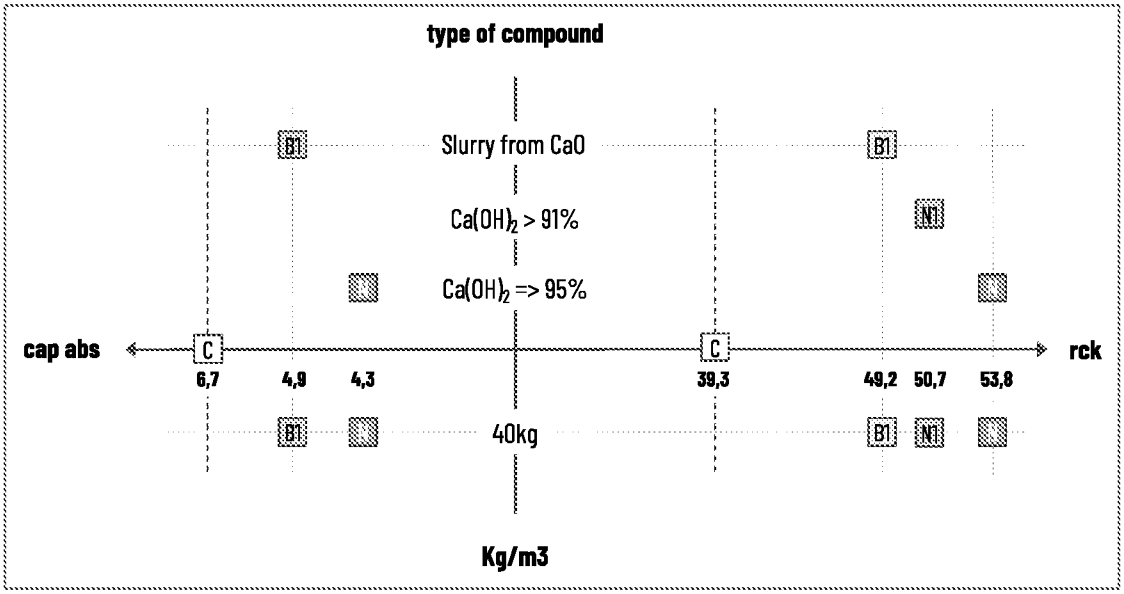
FIG. 32 depicts a chart showing experimental data related to concrete mixes of the disclosure with calcium compounds in different composition and form, at a fixed dosage. The chart compares performances of some specimens of the disclosure casted with compounds of different composition and form, at a fix dosage (40 kg/m$^3$).

FIG. 32 compares the performances of some concrete mixes casted with compounds of different composition and form, at a fix dosage (40 kg/$m^3$).

In particular, FIG. 32 shows the performances of a concrete mix with compound composed essentially of CaO mixed with an excess of water for 10 minutes to form a slurry (B1), of concrete mixes with compounds composed essentially of $CA(OH)_2$ (N,N1) and of a concrete mix casted without compound named CONTROL (C), in relation to compressive strength at 28 days (tested according to SN EN 12390-3).

All concrete mixes including a compound show an augmented compression strength in comparison to CONTROL (C). Concrete mixes including compounds composed essentially of $Ca(OH)_2$ (N,N1) show better performance than the concrete mix including the compound composed essentially of CaO mixed with an excess of water for 10 minutes to form a slurry (B1). Between the concrete mixes including compounds composed essentially of $Ca(OH)_2$, the concrete mix including the higher content of $Ca(OH)_2$ (N) showed the best performance.

FIG. 32 also shows the performances of the concrete mix with compound composed essentially of CaO mixed with an excess of water for 10 minutes to form a slurry (B1), the concrete mix with compounds composed essentially of $CaOH)_2$ at higher grade (N), and of a concrete mix casted without compound named CONTROL (C), in relation to capillary water absorption (tested according to SIA 262-1/A, with specimens age at exam starting date=B1, N of 33 days; C of 29 days).

Both concrete mixes including the compound (B1, N) show a reduced water capillary absorption, desired in ambient exposed to water or humidity, in comparison to CON- TROL (C), with the concrete mix casted with $Ca(OH)_2$ (N) exhibiting the best performance.

Figure 33:
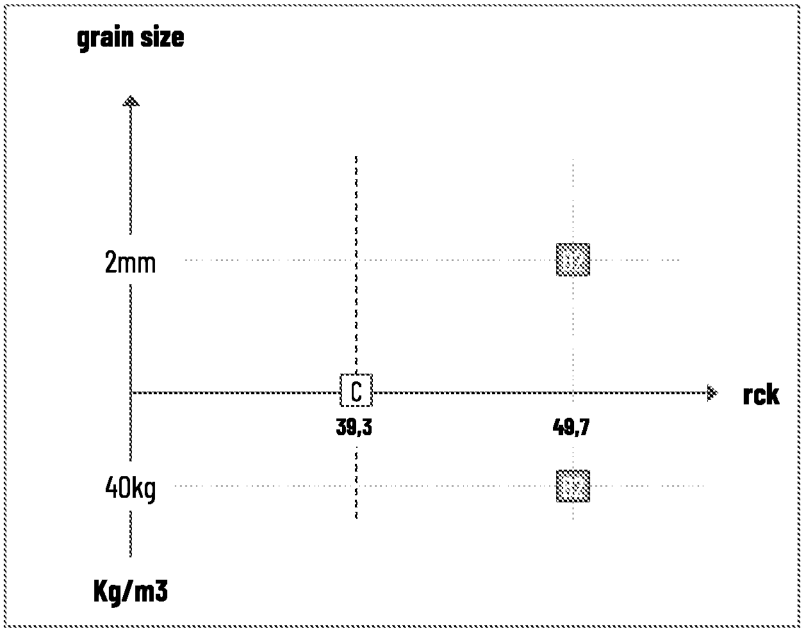
FIG. 33 depicts a chart showing experimental data related to concrete mixes of the disclosure with dry calcium compound containing essentially CaO+MgO. The chart shows the improved performances of specimens of the disclosure with dry compound containing essentially CaO+MgO (B2) compared to a specimen casted without calcium compound (CONTROL (C)), in relation to compressive strength at 28 days (tested according to SN EN 12390-3).

FIG. 33 shows the improved performances of the concrete mix with dry compound consisting essentially of CaO+MgO (B2) compared to the concrete mix casted without compound named CONTROL (C), in relation to compressive strength at 28 days (tested according to SN EN 12390-3).

Figure 34:
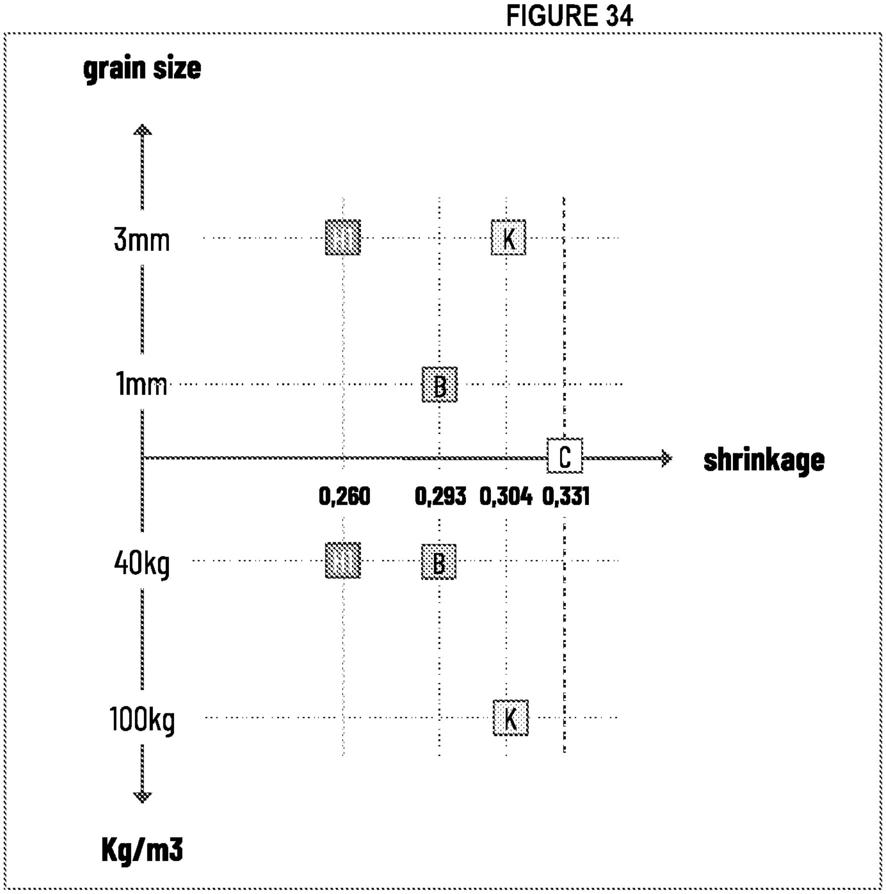
FIG. 34 depicts a chart showing experimental data of additional exams for concrete mixes of the disclosure with dry compounds in different grain size and dosage. The chart compares dry shrinkage performances of some specimens of the disclosure casted with dry compounds in different grain size and dosage.

FIG. 34 compares dry shrinkage performances of some the concrete mixes casted with dry compounds in different grain size and dosage.

In particular, FIG. 34 shows the performances of concrete mixes casted with dry compounds composed essentially of CaO (B, H1, K), and a concrete mix casted without compound named CONTROL (C), in relation to drying shrinkage at 91 days (tested according to SIA 262-1/F).

All concrete mixes including a compound show a reduction, desired to reduce cracks, of dry shrinkage in comparison to CONTROL, with concrete mix H1 exhibiting the best performance.

Example 7: Early-Stage Shrinkage Reduction

This example demonstrates the results of a laboratory study to define the effects of quicklime on early stage drying shrinkage of a cementitious mixture.

Cementitious Mixture

One cementitious mixture (R) including one compound (CP4) was prepared using the methods of the disclosure. One cementitious mixture (CONTROL) not including the compound was also prepared. Table 15 below lists the composition of the cementitious mixtures, where values are expressed in $kg/m^3$.

TABLE 15

Additional cementitious mixes

| MIX | CEM | FLY ASH | CP4 | WATER | SAND |
|---|---|---|---|---|---|
| R | 481 | 85 | 150 | 358 | 1022 |
| CONTROL | 481 | 85 | | 358 | 1342 |

Components

All components used in the testing conform to the relevant EN standards, namely:

e) CEM I 42.5 N—conforming to EN 196;

f) Fly ash—conforming to EN 450; and g) Aggregates (sand)—conforming to EN 12620.

Compound

Below is the compound used in the cementitious mixture:

CP4: Quicklime with content of CaO of about 96.9% and grain size comprised between 2.5 mm and 3.5 mm Specimens Preparations Specimens of different cementitious mixtures were prepared in prisms of L=360 mm, W=120 mm, H=120 mm with method and in numbers as per required by relevant SIA standard listed in the testing procedures below.

For casting CONTROL (C) cementitious mixture the following procedure was used: dry ingredients were mixed before adding water.

For casting R cementitious mixture, the following procedure was used: compound was mixed with the other dry ingredients, before adding water.

Testing Procedures

Shrinkage reduction of cementitious mixtures have been tested by determining:

a) drying shrinkage at 3 days was determined according to SIA 262-1/F b) drying shrinkage at 7 days was determined according to SIA 262-1/F c) drying shrinkage at 14 days was determined according to SIA 262-1/F d) drying shrinkage at 28 days was determined according to SIA 262-1/F As required by the standard, each test was conducted on 2 samples of specimens in the form of prism of L=360 mm, W=120 mm, H=120 mm where the result is the average.

The norm listed above is intended to be the valid year 2019 edition.

As an additional procedure, specimens have been wrapped in wet geotextile for the first 7 days after preparation.

Tested started 23 hours from specimen preparation.

Results

Results of the test are reported in Table 16 below

TABLE 16

Additional cementitious mixtures results

| MIX | Drying shrinkage SIA 262-1/F 3 days Average of 2 samples [‰] | 7 days Average of 2 samples [‰] | 14 days Average of 2 samples [‰] | 28 days Average of 2 samples [‰] |
|---|---|---|---|---|
| R | 0.009 | 0.063 | 0.163 | 0.274 |
| CONTROL | 0.022 | 0.097 | 0.196 | 0.302 |

Figure 35:
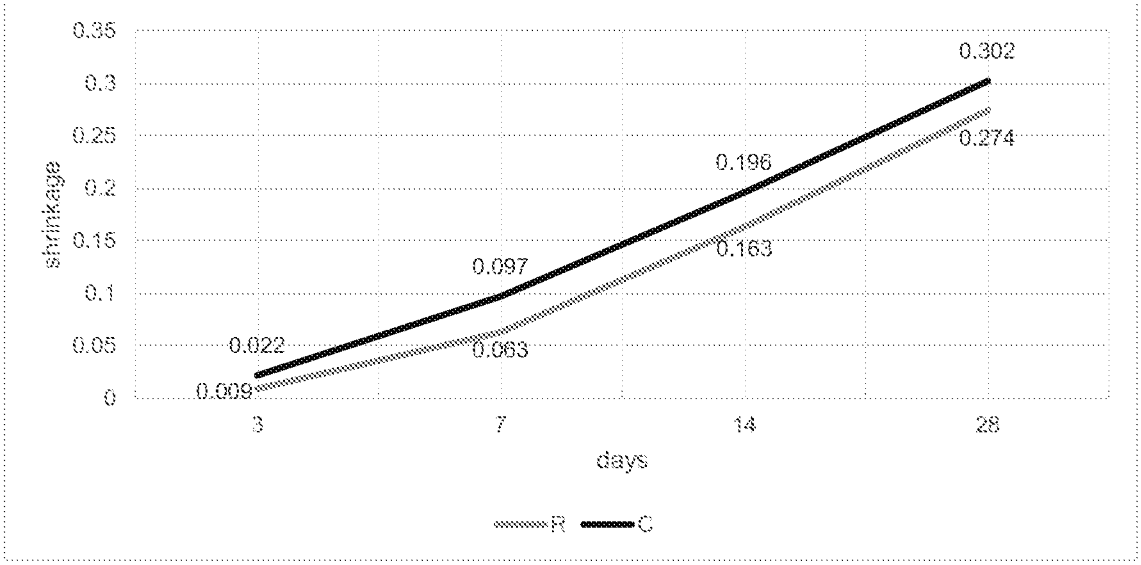
FIG. 35 depicts a graph showing experimental data related to early-stage drying shrinkage.

FIG. 35 compares the early-stage dry shrinkage performances of the cementitious mixtures R and CONTROL (C). The cementitious mixture including the compound show early-stage (at 3, 7, 14 and 28 days) reductions, desired to reduce crack in early stages, of dry shrinkage, in comparison to CONTROL (C).

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

As used herein, all headings are simply for organization and are not intended to limit the disclosure in any manner. The content of any individual section may be equally applicable to all sections.

INCORPORATION BY REFERENCE

All patents and publications referenced herein are hereby incorporated by reference in their entireties.

What is claimed is:

1. A method of making a cementitious mixture for building materials comprising:

(a) obtaining a dry cementitious mixture comprising a calcium compound and ordinary Portland cement (OPC) and optionally supplementary cementitious material (SCM), wherein a dosage of the calcium compound is 6.5% to 15% of a total binder content of the dry cementitious mixture, and wherein the calcium compound is calcium hydroxide ($Ca(OH)_2$); and (b) adding water to the dry cementitious mixture, wherein the dry cementitious mixture has a total binder content of 100 kg/$m^3$ to 200 kg/$m^3$ 200 kg/$m^3$ to 700 kg/$m^3$, 700 kg/$m^3$ to 1300 kg/$m^3$, 800 kg/$m^3$ to 1300 kg/$m^3$, 900 kg/$m^3$ to 1300 kg/$m^3$, 800 kg/$m^3$ to 1200 kg/$m^3$, 900 kg/$m^3$ to 1200 kg/$m^3$, 1000 kg/$m^3$ to 1100 kg/$m^3$, or 1100 kg/$m^3$ to 1300 kg/$m^3$.

2. The method of claim 1, wherein the total binder content of the dry cementitious mixture comprises 60% to 79% OPC and 21% to 40% SCM; 20% to 100% OPC and 0% to 80% SCM; 80% to 99% OPC and 1% to 20% SCM; or 20% to 59% OPC and 41% to 80% SCM.

3. The method of claim 1, wherein the dosage of the calcium compound is 8% to 12% of the total binder content of the dry cementitious mixture.

4. The method of claim 1, wherein the calcium compound has a particle size of 1 mm to 2.5 mm, greater than 0 mm to 0.2 mm, greater than 0 mm to 0.75 mm, 0.002 mm to 0.75 mm, 0.075 mm to 1 mm, 0.075 mm to 1.5 mm, 0.075 mm to 5 mm, 0.075 mm to 0.5 mm, 0.15 mm to 4 mm, 0.5 mm to 3.5 mm, 0.5 mm to 1.5 mm, 1.5 mm to 2.5 mm, 2.5 mm to 3.5 mm, 4 mm to 5 mm, 4 mm to 6 mm, 4 mm to 7 mm, 4 mm to 8 mm, 4 mm to 9 mm, 4 mm to 10 mm, greater than 4 mm to 10 mm, 1 mm to 10 mm, or 6.35 mm to 63 mm.

5. The method of claim 1, wherein the calcium compound comprises one or more of calcium hydrated lime, and dolomitic hydrated lime.

6. The method of claim 1, wherein the SCM comprises one or more materials selected from fly ash, ground granulated blast-furnace slag, metakaolin, microsilica, natural pozzolana, rice husks, palm oil ash (POA), and glass powder (GP).

7. The method of claim 1, wherein step b) occurs after step a), or step a) and step b) occur simultaneously.

8. The method of claim 1, wherein the dry cementitious mixture further comprises one or more of fine aggregates and coarse aggregates.

9. The method of claim 1, wherein the method further comprises adding one or more plasticizers and/or retarders to the dry cementitious mixture.

10. The method of claim 1, wherein the calcium compound has a particle size of 0.002 mm to 0.75 mm.

11. A ceramic material prepared by the method of claim 1, wherein the ceramic material is selected from cement paste, grout, mortar, and concrete, optionally wherein the ceramic material comprises sand, optionally wherein the ceramic material comprises gravel.

12. A concrete admixture prepared by the method of claim 1.

13. A method of making a concrete mixture for building materials comprising:

(a) obtaining a dry cementitious mixture comprising a calcium compound, ordinary Portland cement (OPC), fine aggregates, and coarse aggregates, and optionally supplementary cementitious material (SCM), wherein a dosage of the calcium compound is 6.5% to 15% of a total binder content of the dry cementitious mixture, and wherein the calcium compound is calcium hydroxide ($Ca(OH)_2$); and (b) adding water to the dry cementitious mixture, wherein the dry cementitious mixture has a total binder content of 100 kg/$m^3$ to 200 kg/$m^3$ 200 kg/$m^3$ to 700 kg/$m^3$, 700 kg/$m^3$ to 1300 kg/$m^3$, 800 kg/$m^3$ to 1300 kg/$m^3$, 900 kg/$m^3$ to 1300 kg/$m^3$, 800 kg/$m^3$ to 1200 kg/$m^3$, 900 kg/$m^3$ to 1200 kg/$m^3$, 1000 kg/$m^3$ to 1100 kg/$m^3$, or 1100 kg/$m^3$ to 1300 kg/$m^3$.

14. The method of claim 13, wherein the fine aggregates comprise one or more of sand, crushed stone, silt, stone dust, and clay.

15. A method of making a mortar for building materials comprising:

(a) obtaining a dry cementitious mixture comprising a calcium compound, ordinary Portland cement (OPC), fine aggregates, and coarse aggregates, and optionally supplementary cementitious material (SCM), wherein a dosage of the calcium compound is 6.5% to 15% of a total binder content of the dry cementitious mixture, and wherein the calcium compound is calcium hydroxide ($Ca(OH)_2$); and (b) adding water to the dry cementitious mixture, wherein the dry cementitious mixture has a total binder content of 100 kg/$m^3$ to 200 kg/$m^3$, 200 kg/$m^3$ to 700 kg/$m^3$, 700 kg/$m^3$ to 1300 kg/$m^3$, 800 kg/$m^3$ to 1300 kg/$m^3$, 900 kg/$m^3$ to 1300 kg/$m^3$, 800 kg/$m^3$ to 1200 kg/$m^3$, 900 kg/$m^3$ to 1200 kg/$m^3$, 1000 kg/$m^3$ to 1100 kg/$m^3$, or 1100 kg/$m^3$ to 1300 kg/$m^3$.

16. The method of claim 15, wherein the total binder content of the dry cementitious mixture comprises 60% to 79% OPC and 21% to 40% SCM; 20% to 100% OPC and 0% to 80% SCM; 80% to 99% OPC and 1% to 20% SCM; or 20% to 59% OPC and 41% to 80% SCM.

17. The method of claim 15, wherein the dosage of the calcium compound is 8% to 12% of the total binder content of the dry cementitious mixture.

18. The method of claim 15, wherein the calcium compound has a particle size of 1 mm to 2.5 mm, greater than 0 mm to 0.2 mm, greater than 0 mm to 0.75 mm, 0.002 mm to 0.75 mm, 0.075 mm to 1 mm, 0.075 mm to 1.5 mm, 0.075 mm to 5 mm, 0.075 mm to 0.5 mm, 0.15 mm to 4 mm, 0.5 mm to 3.5 mm, 0.5 mm to 1.5 mm, 1.5 mm to 2.5 mm, 2.5 mm to 3.5 mm, 4 mm to 5 mm, 4 mm to 6 mm, 4 mm to 7 mm, 4 mm to 8 mm, 4 mm to 9 mm, 4 mm to 10 mm, greater than 4 mm to 10 mm, 1 mm to 10 mm, or 6.35 mm to 63 mm.

19. The method of claim 15, wherein the calcium compound comprises one or more of calcium hydrated lime, and dolomitic hydrated lime.

20. The method of claim 15, wherein the SCM comprises one or more materials selected from fly ash, ground granulated blast-furnace slag, metakaolin, microsilica, natural pozzolana, rice husks, palm oil ash (POA), and glass powder (GP).

21. The method of claim 15, wherein step b) occurs after step a), or step a) and step b) occur simultaneously.

22. A concrete admixture prepared by the method of claim 15.

* * * * *